US009140342B2

(12) United States Patent
Hoebel et al.

(10) Patent No.: US 9,140,342 B2
(45) Date of Patent: Sep. 22, 2015

(54) GEAR, MOTOR-GEAR UNIT, VEHICLE, GENERATOR WITH A GEAR, AND FORCE TRANSMITTING ELEMENT

(71) Applicant: TQ-Systems Gmbh, Seefeld (DE)

(72) Inventors: Rudi Hoebel, Unterhaching (DE); Antonius Georg Rossberger, Sindelsdorf (DE)

(73) Assignee: TQ-Systems GMBH (DE)

( * ) Notice: Subject to any disclaimer, the term of this patent is extended or adjusted under 35 U.S.C. 154(b) by 126 days.

(21) Appl. No.: 13/857,277

(22) Filed: Apr. 5, 2013

(65) Prior Publication Data

US 2013/0276575 A1     Oct. 24, 2013

Related U.S. Application Data

(63) Continuation of application No. PCT/IB2011/054431, filed on Oct. 7, 2011.

(30) Foreign Application Priority Data

Oct. 7, 2010    (WO) .................. PCT/IB2010/054535

(51) Int. Cl.
| | |
|---|---|
| F16H 35/00 | (2006.01) |
| B62M 6/55 | (2010.01) |
| F16H 49/00 | (2006.01) |
| F16H 25/06 | (2006.01) |

(52) U.S. Cl.
CPC ................ F16H 35/00 (2013.01); B62M 6/55 (2013.01); F16H 49/001 (2013.01); F16H 2025/066 (2013.01); Y10T 74/19 (2015.01)

(58) Field of Classification Search
CPC ..................................................... F16H 49/001
USPC ............................................................. 74/640
See application file for complete search history.

(56) References Cited

U.S. PATENT DOCUMENTS

| 499,694 A | 6/1893 | Wright |
|---|---|---|
| 541,713 A | 6/1895 | Bolton |

(Continued)

FOREIGN PATENT DOCUMENTS

| AT | 372767 | 11/1983 |
|---|---|---|
| CN | 102365474 | 2/2012 |

(Continued)

OTHER PUBLICATIONS

Hoebel, Rudi; International Search Report and Written Opinion for PCT/IB2011/054431, filed Oct. 7, 2011, mailed Jun. 8, 2012, 11 pgs.

(Continued)

*Primary Examiner* — Ha D Ho
(74) *Attorney, Agent, or Firm* — Taylor English Duma LLP

(57) ABSTRACT

The application discloses a harmonic pin drive which comprises at least one outer ring gear with inner teeth that are adapted to the shape of pins of a pin ring, a transmitter for connecting to a rotor of an electric motor, a ball bearing that is supported on the transmitter and an arrangement of flexible means. The flexible means are distributed essentially on the circumference of a radius and the flexible means are provided for attachment to a casing. Furthermore, the flexible means comprise openings for inserting pins of the pin ring. Furthermore, an output shaft is provided for receiving a rotation of the outer ring gear.

17 Claims, 64 Drawing Sheets

(56) References Cited

U.S. PATENT DOCUMENTS

| | | | |
|---|---|---|---|
| 550,474 | A | 11/1895 | Bolton |
| 573,230 | A | 12/1896 | Monkiewicz |
| 618,190 | A | 1/1899 | Sturgess |
| 1,423,028 | A | 7/1922 | Ernest |
| 1,670,144 | A | 5/1928 | Ewart |
| 1,877,338 | A | 9/1932 | Kottlowski |
| 2,210,240 | A | 8/1940 | Herrick |
| 2,326,235 | A | 8/1943 | Fritz |
| 2,852,954 | A | 9/1958 | Hobbs |
| 2,941,421 | A * | 6/1960 | Plotti ............................ 475/182 |
| 3,148,560 | A | 9/1964 | Woodward, Jr. |
| 3,893,532 | A | 7/1975 | Perlowin |
| 4,023,440 | A | 5/1977 | Kennington et al. |
| 4,223,757 | A | 9/1980 | Olander |
| 4,471,672 | A * | 9/1984 | Butterfield et al. ............ 475/168 |
| 4,567,790 | A * | 2/1986 | Butterfield et al. ............ 475/168 |
| 4,583,962 | A | 4/1986 | Bytzek et al. |
| 4,729,756 | A | 3/1988 | Zimmer |
| 5,286,237 | A * | 2/1994 | Minegishi ..................... 475/178 |
| 5,445,572 | A | 8/1995 | Parker |
| 5,678,671 | A | 10/1997 | Leimbach et al. |
| 5,954,611 | A | 9/1999 | Mills et al. |
| 5,970,822 | A | 10/1999 | Jung et al. |
| 6,026,711 | A | 2/2000 | Tortora et al. |
| 6,148,684 | A | 11/2000 | Gardiner |
| 6,152,249 | A | 11/2000 | Li et al. |
| 6,998,730 | B2 | 2/2006 | Tharp |
| 7,249,534 | B1 | 7/2007 | Gardiner |
| 9,017,198 | B2 | 4/2015 | Hoebel |
| 2006/0027201 | A1 | 2/2006 | Ryou |
| 2008/0161142 | A1 | 7/2008 | Shiozaki et al. |
| 2008/0251302 | A1 | 10/2008 | Lynn |
| 2008/0254929 | A1 | 10/2008 | Wesling et al. |
| 2012/0046140 | A1 | 2/2012 | Shelef et al. |

FOREIGN PATENT DOCUMENTS

| | | |
|---|---|---|
| DE | 8513367 | 6/1986 |
| DE | 102009003695.4 | 3/2009 |
| DE | 102009033790.3 | 7/2009 |
| DE | 202009011082.6 | 9/2009 |
| DE | 102010000318.0 | 3/2010 |
| EP | 0316713 | 5/1989 |
| JP | 48-031368 | 4/1972 |
| JP | 1261537 | 10/1989 |
| JP | 11-079627 | 3/1999 |
| JP | 11-227665 | 8/1999 |
| JP | 2005330990 | 12/2005 |
| WO | 9937017 | 7/1999 |
| WO | 2004088166 | 10/2004 |
| WO | 2010113115 | 10/2010 |

OTHER PUBLICATIONS

Hoebel, Rudi; International Preliminary Report on Patentability for PCT/IB2011/054431, filed Oct. 7, 2011, mailed Apr. 9, 2013, 7 pgs.

Hoebel, Rudi; Australian Patent Examination Report for serial No. 2010231573, filed Mar. 30, 2010, mailed Apr. 24, 2014, 5 pgs.

Hoebel, Rudi; Chinese Office Action for serial No. 201080015450, filed Mar. 30, 2010, mailed Apr. 2, 2014, 7 pgs.

Hoebel, Rudi; European Search Report for serial No. 10758136, published on Feb. 8, 2012, mailed on Jul. 30, 2012, 20 pgs.

Hoebel, Rudi; International Preliminary Report on Patentability for PCT/IB2010/051383, filed Mar. 30, 2010, mailed Oct. 4, 2011, 5 pgs.

Hoebel, Rudi; International Search Report and Written Opinion for PCT/IB2010/051383, filed Mar. 30, 2010, mailed Feb. 1, 2011, 6 pgs.

Hoebel, Rudi; Non-Final Office Action for U.S. Appl. No. 13/260,917, filed Jul. 4, 2012, mailed Aug. 12, 2014, 13 pgs.

Hoebel, Rudi; U.S. Patent Application entitled: Gear, motor-gear unit, vehicle and generator with a gear and force transmitting element, having U.S. Appl. No. 13/260,917, filed Jul. 4, 2012, 107 pgs.

Hoebel, Rudi, Australian Patent Examination Report for serial No. 2011311151, filed Oct. 7, 2011, mailed Jun. 6, 2014, 2 pgs.

Hoebel, Rudi; Chinese Office Action for serial No. 201080015450, filed Mar. 30, 2010, mailed Sep. 25, 2014, 8 pgs.

Hoebel, Rudi; Japanese Office Action for serial No. 2012502862, published Sep. 20, 2012, mailed Jan. 16, 2014, 5 pgs.

Hoebel, Rudi; Corrected Notice of Allowability for U.S. Appl. No. 13/260,917, filed Jul. 4, 2012, mailed Jan. 8, 2015, 13 pgs.

Hoebel, Rudi; Notice of Allowance for U.S. Appl. No. 13/260,917, filed Jul. 4, 2012, mailed Dec. 24, 2014, 16 pgs.

Hoebel, Rudi; Chinese Office Action for serial No. 201180057084.7, filed Oct. 7, 2010, mailed Mar. 30, 2015, 8 pgs.

Hoebel, Rudi; Issue Notification for U.S. Appl. No. 13/260,917, filed Jul. 4, 2012, mailed Apr. 8, 2015, 1 pg.

Hoebel, Rudi; Patent Application entitled: Gear, Motor-Gear Unit, Vehicle and Generator With a Gear and Force Transmitting Element having U.S. Appl. No. 14/666,968, filed Mar. 24, 2015, 104 pgs.

* cited by examiner

GEAR, MOTOR-GEAR UNIT, VEHICLE, GENERATOR WITH A GEAR, AND FORCE TRANSMITTING ELEMENT

REFERENCE TO RELATED APPLICATIONS

This application is a continuation of International Application No. PCT/IB2011/054431 filed Oct. 7, 2011, which claims priority to International Application No. PCT/IB2010/054535, filed Oct. 7, 2010, both of which are hereby specifically incorporated by referenced herein in their entireties.

BRIEF DESCRIPTION OF THE DRAWINGS

The embodiments of the application are explained in further detail with reference to the following figures, in which.

DETAILED DESCRIPTION

Figure 1:
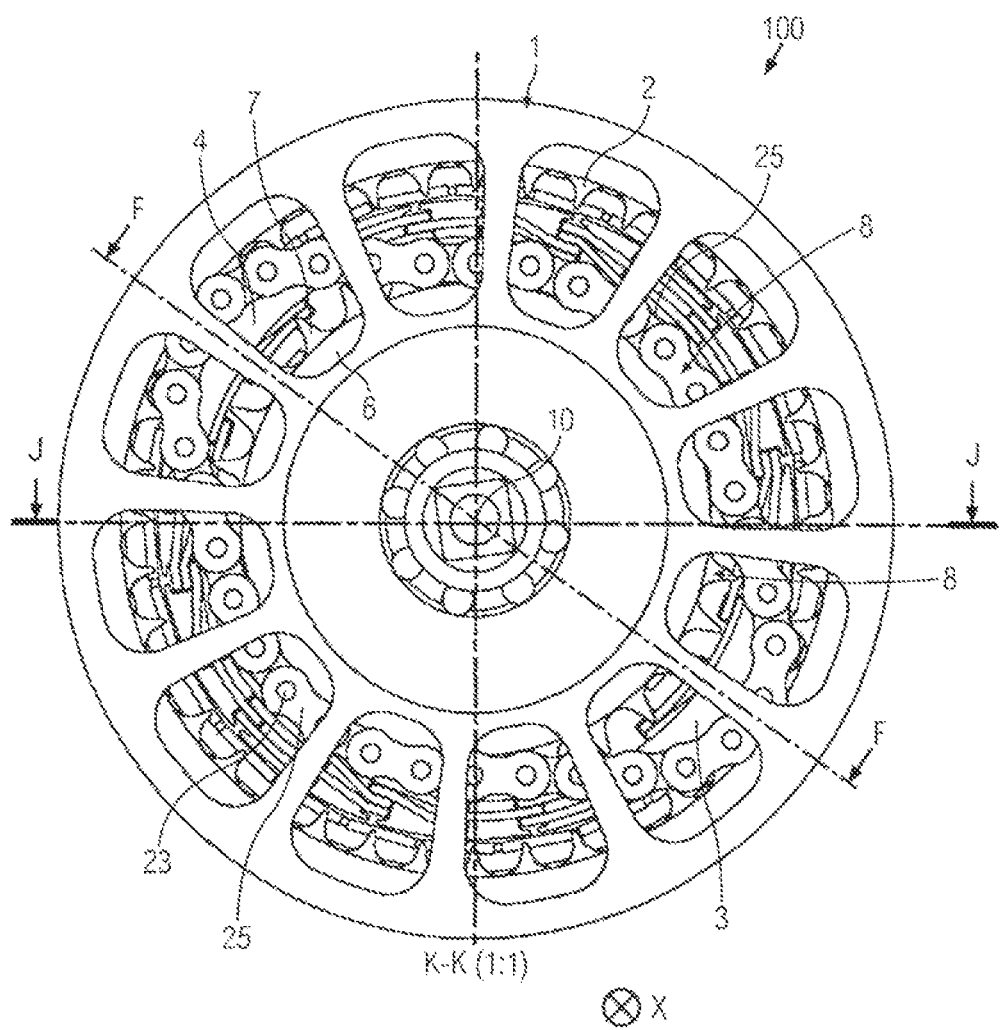
FIG. 1 shows a front view of a motor-gear unit as disclosed in the application.

The present application relates to a gear having an input shaft and an output shaft. More particularly, the present application relates to a motor-gear unit with such a gear and to a motor vehicle with such a motor-gear unit. The present application also relates to an electric generator with a drive unit such as an internal combustion engine or such as a propeller for water or wind, further having a generator unit for generating electricity and having a gear in accordance with the application.

The present application provides an improved gear, motor-gear unit, vehicle, generator with a gear, and force-transmitting element.

The gear has an input shaft and an output shaft and also an outer wheel and an inner wheel which is positioned concentrically in relation to the outer wheel and often inside the outer wheel. There is also a ring-shaped or cylindrical or elliptic traction provided that extends between the outer wheel and the inner wheel. A revolving transmitter lifts or drags the traction means away from the outer periphery of the inner wheel and pushes it onto the inner periphery of the outer wheel. This is a simple and reliable setup for a gearbox, which can provide high gear ratios.

There are many ways for connecting the input shaft and the output shaft to the gear. It is especially advantageous to connect the input shaft to the transmitter and to connect the output shaft is to the inner wheel or to the outer wheel. The wheel, which is not connected to the output shaft needs then to be kept steady or connected with a housing of the gear.

Alternatively, one can also connect the input shaft with the outer wheel or the inner wheel, while the output shaft is connected to the transmitter. The wheel, which is not connected to the input shaft, needs then to be kept steady or connected with a housing of the gear. This arrangement needs to be carefully designed in order to avoid self-locking of the transmitter but this is especially useful for converting high input torques from slow power sources into high rotational frequencies as often needed by electrical generators.

The traction means can be provided as a closed chain of rotatably interconnected links such as a bolt chain or a roller chain.

It is not only possible to provide the chain as a single chain nut also as a double or triple chain. One advantage of such a double chain or triple chain is that the transmitter can be provided in an axial plane that is different from the axial planes of the inner wheel or outer wheel. Higher gear ratios can then be provided.

The gear can be provided as a one row gear design wherein the traction means has one single radial section that is provided both for the contact with the outer wheel and for the inner wheel. In the one row gear design, the transmitter often contacts the traction means from within the gap between the inner wheel and the outer wheel. The transmitter, the inner wheel, the outer wheel as well as the traction means respectively the pressure means are located essentially in the same axial plane, which makes the design axially symmetric.

In an axially asymmetric two row gear design, the inner wheel and the outer wheel are often located in different axial planes, wherein the transmitter is either located in the axial plane of the inner wheel or in the axial plane of the outer wheel. The traction means then extends axially between the axial planes of the inner wheel and the outer wheel, contacting both the inner wheel and the outer wheel at different sections of their respective circumferences.

In a three row gear design, the two pairs of an inner wheel and an outer wheel are often located in different axial planes, wherein the transmitter is located in a third axial plane between the two pairs of an inner wheel and an outer wheel. One can also think of a three row gear design with two inner wheels and one outer wheel or—alternatively—also with two outer wheels and one inner wheel. In a further alternative, it is also possible to provide a double row transmitter with two transmitter sections, wherein each transmitter section is provided in an axial plane, which is different from the axial plane of the inner wheel. The traction means then extends axially between the axial planes of the outer wheels and the inner wheel, contacting both the inner wheel and the outer wheels at different sections of their respective circumferences.

It is also possible to provide an axially symmetric three row gear design with two outer wheels and one inner wheel, that are located in different axial planes, wherein the transmitter is located in the axial plane of the inner wheel. It is then also possible to provide a double row transmitter with two transmitter sections, wherein each transmitter section is provided in the axial plane of each outer wheel. The traction means then extends axially between the axial planes of the inner wheels and the outer wheel, contacting both the inner wheels and the outer wheel at different sections of their respective circumferences.

The traction means may also comprise at least one continuous elliptic traction element that can also be a deformable circular ring or cylinder. Such a traction means is easy to manufacture, especially if the traction element is provided in the form of a flexible belt, possibly with teeth. Such a traction element is often made from plastic or rubber, which provided on a metal meshing or a woven or non-woven fabric.

In a very advantageous form, the traction element comprises a thin and flexible spline element, that is possibly provided with teeth and it can also be made from plastic. The flexible spline element may comprise a multitude of pins that stand proud of or protrude from at least one axial surface of the spline element and that are coaxially arranged with the flexible spline element. With such a traction element, extremely high gear ratios can be achieved because the difference between the diameter of the outer wheel and the diameter of the inner wheel can be made almost as small as the diameter of the pins.

The transmitter or the transmitters may be positioned on a rotatable transmitter carrier by mounting them concentrically in relation to the outer wheel and the inner wheel. As said before, the transmitter carrier is preferably connected to the input shaft or to the output shaft for achieving high transmission ratios.

The transmitters can be each mounted on a shaft such that they are able to rotate while the shafts are provided on the transmitter carrier. Alternatively, the transmitter may be fixed to the transmitter carrier, wherein the traction means comprises a multitude of rotatable contact elements such as rollers on chain bolts.

It also possible to provide the transmitters eccentrically from the rotation axis of the transmitter carrier such that the rotation axis of the transmitter is positioned off the rotation axis of the transmitter carrier. This provides for new shapes of the outer surface of the transmitters that are easy to manufacture.

Alternatively, the rotation axis of the transmitter may essentially coincide with the rotation axis of the transmitter carrier, wherein a contact surface of the transmitter facing towards the traction means is provided with an essentially elliptic shape. Providing an essentially elliptic shape includes that a non-circular flat surface is provided which is round such that a bearing or a number of balls can be arranged between the contact surface and the traction means.

In one possible use of the gear, an electric motor is provided, a rotor of the electric motor being connected to the input shaft of the gear. For lightweight vehicles, often a DC brushless motor with a radial gap is provided, but other types of motors and also internal combustion engines apply as well, as described below with the embodiments. The DC brushless motor is easy to provide with the gear of the application because the gear housing can be the motor housing at the same time.

A vehicle, in particular a two- or three-wheeled vehicle, can be equipped with such a motor-gear unit, wherein at least one driven wheel of the vehicle is connected to the output shaft of the gear.

The gear may also be used for an electric generator with a drive unit such as an internal combustion engine or a propeller for water or wind and with a generator unit for generating electricity. An input shaft of the gear is then connected to the drive unit and an output shaft of the gear being connected to an input shaft of the generator.

An advantageous transmitter assembly for contacting a traction means in a gear comprises one or more first transmitter elements and one or more a second transmitter elements that are provided on a rotatable transmitter carrier that is mounted concentrically in relation to the outer wheel and the inner wheel and that is preferably being connected to the input shaft or to the output shaft for achieving high transmission ratios. The transmitter elements are each mounted on a shaft such that they can rotate on the transmitter carrier. The first transmitter element and the second transmitter element are provided eccentrically from the rotation axis of the transmitter carrier. Such an arrangement allows for new shapes of the transmitter, which provides some extra degrees of freedom for the design of a gear.

It is then possible to tighten or tension the transmitter with the two transmitter elements by shifting them with respect to each other. A guide for shifting the first transmitter element with respect to the second transmitter element may therefore be provided, as well as transmitter adjustment slits with a guiding element, the guiding elements being either provided in carrier adjustment slits in the transmitter carrier or the guiding elements being taken up by guiding slits in adjacent transmitter elements.

In an alternative form, the gear of the application is provided with an input shaft and with an output shaft, wherein the at least one revolving transmitter pushes the pressure means away from the inner periphery of the outer wheel and pushes the pressure means onto the outer periphery the inner wheel. This gear is very similar to the other alternative where the transmitter shifts the traction means away from the outer periphery of the inner wheel into the inner periphery the outer wheel. Most of the design elements of the other gear can be used for the gear with the pressure means, except that the pressure means needs to be able to transmit compressive forces. This is why many chains with movable links cannot be used as a pressure means.

The application also provides a thin and flexible spline element for a gear, the spline element comprising a multitude of pins that stand proud of or protrude from at least one axial surface of the spline element and that are coaxially arranged with the flexible spline element. The multitude of pins may also stand proud of both axial surfaces of the spline element. A flexible spline element in which the multitude of pins are provided in a multitude of axial cylindrical orifices is easy to manufacture. It has turned out that it is advantageous to make the pins from steel, that is later hardened, and the spline element from aluminium.

The application further discloses a harmonic pin drive. The harmonic pin drive comprises at least one outer ring gear with inner teeth that are adapted to the shape of pins of a pin ring, a transmitter for connecting to a rotor of an electric motor, a ball bearing that is supported on the transmitter and an arrangement of flexible means. The flexible means is distributed essentially on the circumference of a radius and is provided for attachment to a casing. The flexible means comprise openings for inserting pins of the pin ring, and an output shaft for receiving a rotation of the outer ring gear via further transmission elements such as freewheels and rotating elements.

In this embodiment, a high reduction ratio can be achieved. Unlike in some of the other embodiments, an inner wheel is not needed. Thereby, weight and space is saved. The reaction force of the outer ring is taken up by the flexible means. In addition, the flexible means with which the pins are connected allow for a radial motion of the pins of the pin ring. The radial motion is caused by the motion of the transmitter part which is driven by the rotor of the motor.

A pin ring is used that can be lightweight and robust. The pin ring is advantageous over a chain in that it comprises less moving parts and needs less lubrication.

According to one alternative, the transmitter which drags the pin ring into the outer ring gear comprises an oval shaped portion on which the ball bearing is supported. This is advantageous in that the shape of the oval can be adapted to have a small gap between pin ring and outer gear, for example.

According to a second alternative, the transmitter comprises a circular portion that is eccentrically supported with respect to a rotation axis of the rotor. This is advantageous in that the ball bearing does not need to be a flexible ball bearing.

Specifically, the harmonic pin drive may comprise two outer ring gears in which the pin ring engage to provide a more even force distribution than with just one outer ring gear.

Similarly, the application also discloses a harmonic pin gear comprising. The harmonic pin gear comprises at least one outer ring gear with inner teeth, a transmitter for connecting to an input shaft, a ball bearing that is supported on the transmitter, an arrangement of flexible means. The flexible means are distributed essentially on the circumference of a radius and the flexible means are provided for attachment to a casing of the harmonic pin drive. Furthermore, the pin gear comprises a pin ring with pins, wherein the pins of the pin ring are connected to the flexible means and at least one of the pins engages into an inner tooth of the outer ring gear. Furthermore, the pin gear comprises an output shaft for receiving a rotation of the outer ring gear via further transmission elements such as freewheels and rotating elements.

The pins and the resilient means may be made of one piece or the resilient means may comprise openings in which the pins of the pin ring are inserted. In the first case, a robust connection is achieved whereas in the second case the pin ring can be manufactured separately.

Similarly to the harmonic pin drive the transmitter of the harmonic pin gear may comprise an oval shaped portion or it may also comprise a circular portion that is eccentrically supported with respect to a rotation axis of the rotor.

Similarly to the harmonic pin drive, the harmonic pin gear may also comprise two outer ring gears.

The application further discloses a multi-layer pin ring for a harmonic pin drive. The multi-layer pin ring comprises an outer steel ring and a reception ring which is fixed to the outer steel ring. The reception ring is arranged radially inwards to the outer steel ring, wherein the reception ring comprises round openings which are adapted to take up pins.

By using the two layer structure, the inner layer can be adapted for good flexibility while the inner layer can be adapted to take up the pins. The inner layer can be made of a cheaper material such as plastic as the outer layer already provides stability. The multi-layer pin ring can be used advantageously in the harmonic pin gear or the harmonic pin drive, for example.

Furthermore, the multi-layer pin ring may be designed as three layer pin ring with an inner layer. The inner layer is designed as an outer bearing surface for guiding balls of a ball bearing, wherein the outer bearing surface is arranged radially inwards to the reception ring and is fixed to the reception ring. Thereby, the ball bearing can be provided as a lightweight incomplete ball bearing without outer ring.

In particular the round openings for taking up the pins may be distributed at essentially equal distances along a circumference.

Furthermore pins may be provided in the openings of the reception ring which protrude from the reception ring on two opposite sides. Thereby, the protruding portions of the pins can be used to engage into respective pin rings of a harmonic pin ring gear.

Furthermore, the round openings of the multi-layer pin ring according to the application may form an insertion slit on an inner side of the reception ring. Thereby it is easy to insert or to remove the pins from the inside.

Moreover the application provides a motor-gear unit with a harmonic pin drive or a harmonic pin gear according to the application. Therein, an electric motor is provided and a rotor of the electric motor is connected to the transmitter of the harmonic pin drive or the harmonic pin gear via an input shaft. The high reduction ration of the harmonic pin drive is advantageous to drive the electric motor in a regime with a high revolution and outputting a lower output frequency, for example for an electric bicycle or for obtaining a high torque.

In particular, the electric motor may be designed as a DC brushless motor with a radial gap.

The application furthermore discloses a motor-gear unit with a harmonic pin gear of harmonic pin drive wherein an internal combustion engine is provided and an output shaft of the engine is connected to the transmitter via an input shaft of the harmonic pin gear.

Furthermore the application discloses a vehicle which comprises a motor-gear unit according to the application in which at least one driven wheel of the vehicle is connected to the output shaft of the harmonic pin gear.

Moreover, the application also discloses an electric generator with a drive unit, with a generator unit and with a harmonic pin drive or a harmonic pin gear according to the application. The transmitter of the harmonic pin drive or of the harmonic pin gear is connected to the drive unit via an input shaft and an output shaft of the harmonic pin drive is connected to an input shaft of the generator. Especially in a wind powered generator, the conversion from a low to a high revolution rate which is done by the harmonic pin drive, is advantageous for power generation.

In the following description, details are provided to describe embodiments of the application. It shall be apparent to one skilled in the art, however, that the embodiments may be practiced without such details.

Some parts of the embodiments, which are shown in the Figs. below, have similar parts. The similar parts may have the same names or the similar part numbers. The description of such similar parts also applies by reference to other similar parts, where appropriate, thereby reducing repetition of text without limiting the disclosure.

FIGS. 1 to 15 show a first motor-gear unit 100 as disclosed in this application.

Figure 2:
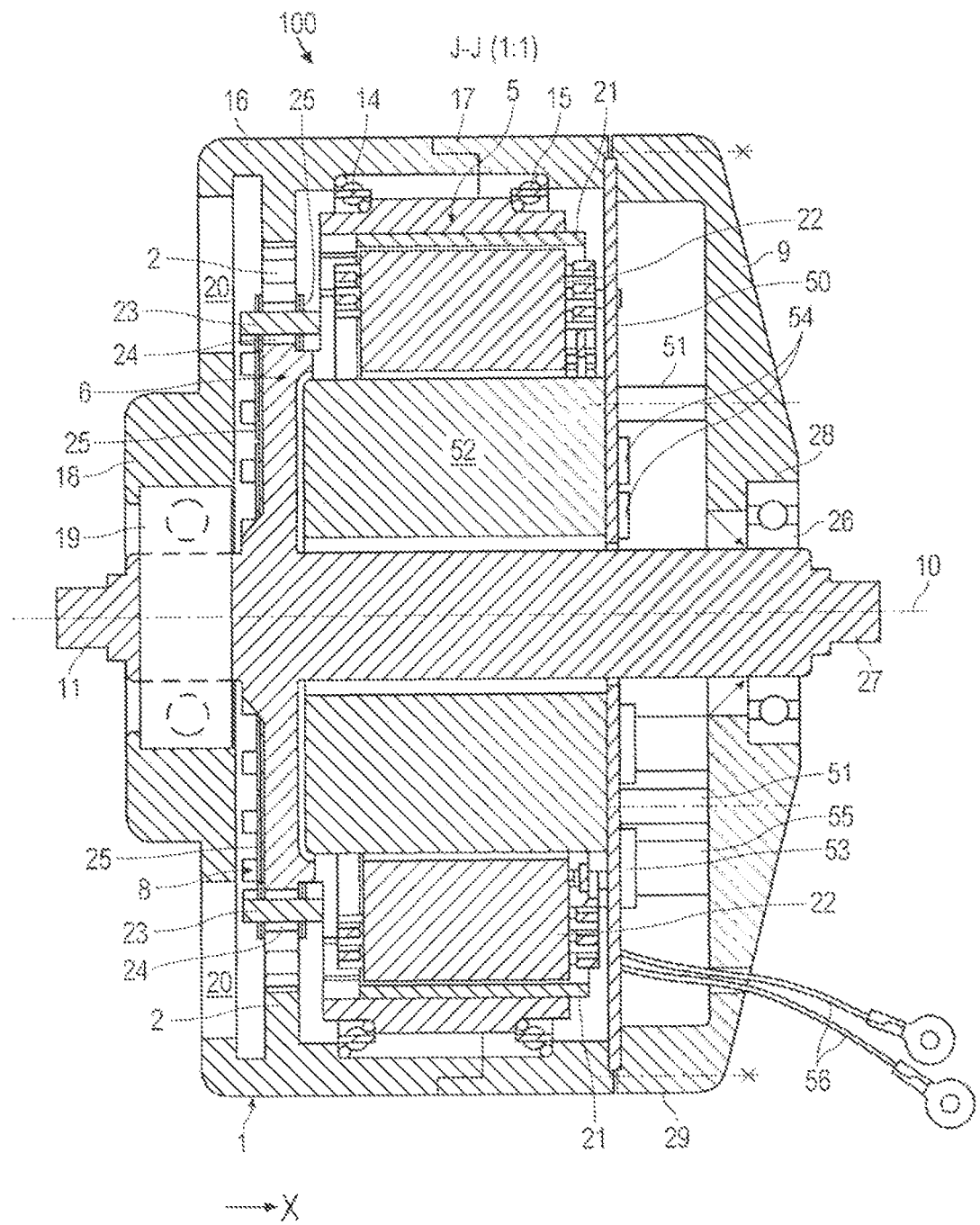
FIG. 2 shows a section through the motor-gear unit illustrated in FIG. 1 along the line of intersection marked J-J in FIG. 1.

As is shown most clearly in FIG. 2, which shows a cross-section through the motor-gear unit 100 disclosed in this application along the line of intersection marked J-J in FIG. 1, said motor-gear unit 100 is divided into a cup-shaped housing 1, an inner wheel 6 which is provided in this case in one piece on an output shaft 11 mounted in the housing 1 such that it is able to rotate, and a roller chain 8 which is guided between the housing 1 and the inner wheel 6 by a transmitter carrier 5 which is mounted in the housing 1 such that it is able to rotate.

As can clearly be seen in FIG. 1, the housing 1 has on its inside radially inward facing outer wheel toothing 2, while the inner wheel 6 has radially outward facing inner wheel toothing 7. The roller chain 8 is designed such that it engages in a form-fitting connection with both the outer wheel toothing 2 and the inner wheel toothing 7.

Figure 3:
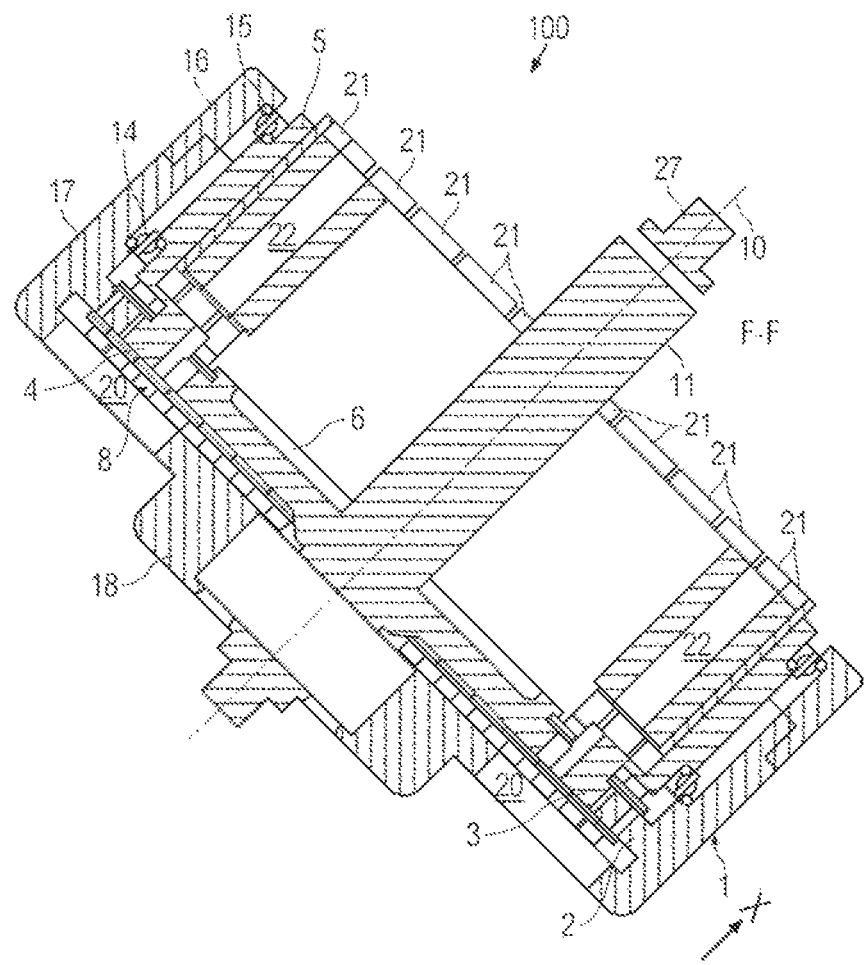
FIG. 3 shows a section through the motor-gear unit illustrated in FIG. 1 along the line of intersection marked F-F in FIG. 1.

The transmitter carrier 5 itself is most clearly illustrated in FIG. 3, which shows a further cross-section through the motor-gear unit 100 along the line of intersection marked F-F in FIG. 1.

The first transmitter 3 and the second transmitter 4 which are positioned between the outer wheel toothing 2 and the inner wheel toothing 7 and rotate peripherally with the transmitter carrier 5, each drag a section of the roller chain 8 into the outer wheel toothing 2, the roller chain 8 being lifted off the first 3 and second transmitters 4 by the inner wheel toothing.

Figure 4:
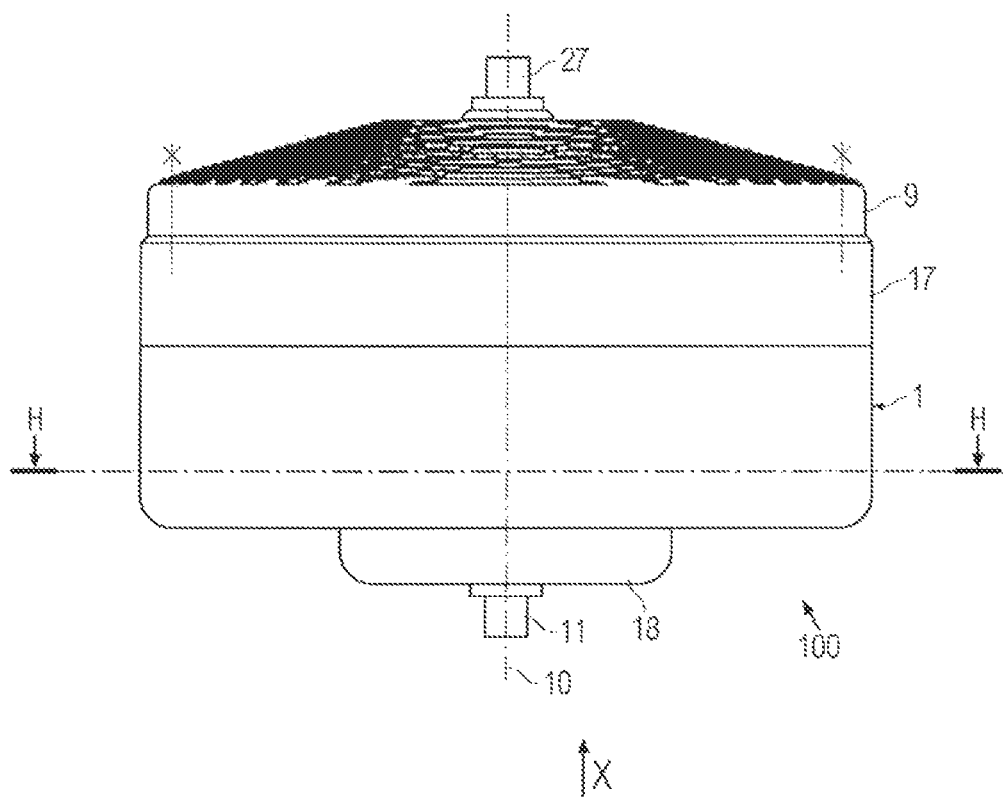
FIG. 4 shows a top view of the motor-gear unit illustrated in FIG. 1.
Figure 5:
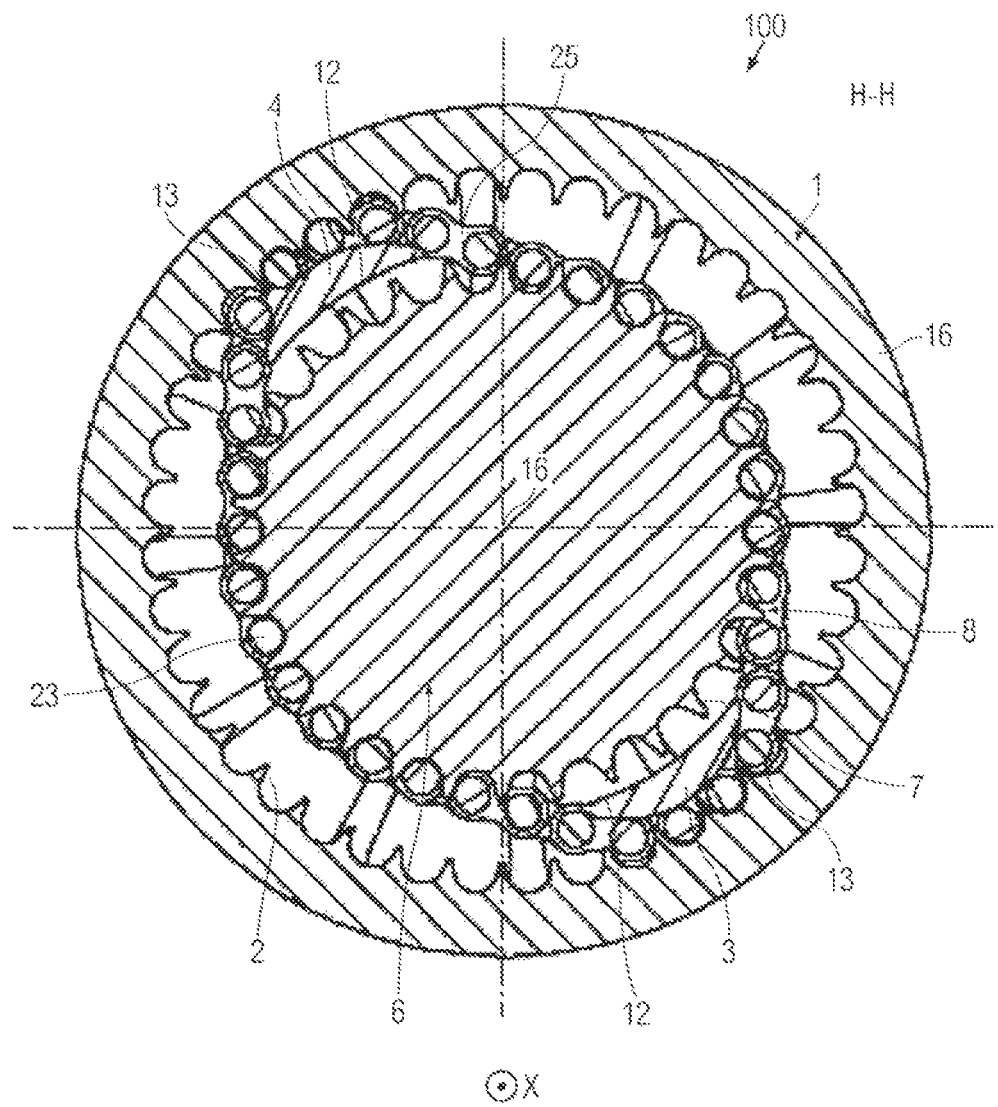
FIG. 5 shows a section through the motor-gear unit illustrated in FIG. 4 along the line of intersection H-H.

The dragging or lifting of the roller chain 8 by the first 3 and second transmitters 4 is illustrated in FIG. 5 which shows a cross-section along the line of intersection marked H-H in FIG. 4. For this purpose the first transmitter 3 and the second transmitter 4 each have a curved sickle-shaped inner face 12 facing the inner wheel toothing 7 and a convex outer face 13 which slides along on the roller chain 8.

The transmitter carrier 5 is designed as a cylindrical body, which is mounted in the housing 1 on a front radial bearing 14 and a rear radial bearing 15, such that it is able to rotate about an axis of symmetry 10 of the motor-gear unit 100. In this arrangement, the transmitter carrier 5 is designed as one piece with the first 3 and second transmitters 4 as is illustrated most clearly in FIG. 3.

To simplify the assembly of the bearing of the transmitter carrier 5, the housing 1 is made of two parts: a cup-shaped front housing section 16 and a cylindrical central housing section 17 which mate radially with one another. In this arrangement the front housing section 16 has a forwards extending bearing support 18 in which is positioned a front output shaft bearing 19. Holes 20 in the region between the radial outer part of the front housing section 16 and the bearing support 18 are shown most clearly in FIG. 6. A total of 12 such holes 20 is provided. They are sealed with transparent plastic panels (not illustrated) against oil leakage. These transparent panels provide a view of the oil level in the housing and can be used to monitor the operation of the motor-gear unit 100.

The side of the housing 1 axially opposite the front housing section 16 is closed by a cup-shaped rear housing section 9 which has a receiving opening 28 for a rear output shaft bearing 26 in which the output shaft 11 is mounted such that it is able to rotate.

A disc-shaped stator plate 50 is clamped in an axially centred position between the rear housing section 9 and the central housing section 17, where it is screwed to the rear housing section 9 with fixing bolts 51 such that it is unable to rotate. The stator plate 50 has around its periphery a plurality of armatures 22, which lie opposite the inner casing surface of the transmitter carrier 5. In this arrangement, the stators/armatures 22 are surrounded by coil windings (not shown in this view) through which an electrical current flows when the motor-gear unit 1 is in operation. In addition, several intermediate circuit annular capacitors 52 with capacitor connectors 54 are provided as energy accumulators for the inverter components 53, which are also provided on the stator plate 50. Cooling bodies 55 extending between the inverter components 53 and the inner wall of the rear housing section 9 are responsible for heat dissipation. In this arrangement, the rear housing section 9 is provided with cooling fins which are shown most clearly in FIG. 4.

The stator plate 50 is provided with electrical power via supply cables 56 which run out through the rear housing section 9.

Positioned on the inside or on the inner casing surface of the cylindrical transmitter carrier 5—and distributed around the periphery of the transmitter carrier 5—is a plurality of permanent magnets 21. These permanent magnets 21 are shown most clearly in FIG. 3, which illustrates a section through the motor-gear unit 100 shown in FIG. 1 along the line of intersection F-F. The rear housing section 9 and other components of the motor-gear unit 100 are removed in FIG. 3. In this arrangement, the permanent magnets 21 are designed as parts of the casing surface of an imagined cylinder, such that they lie flush with the inner casing surface of the transmitter carrier 5. Due to the presence of these permanent magnets 21 the transmitter carrier becomes the rotor of an electric motor.

Figure 9:
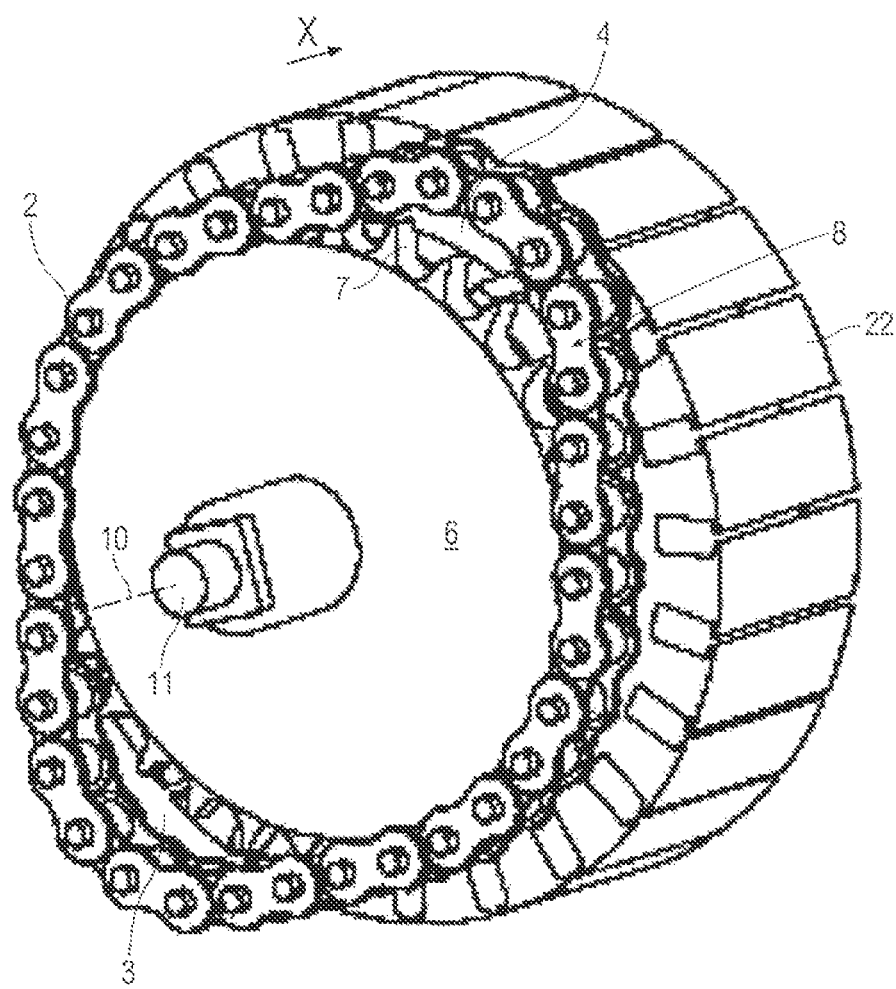
FIG. 9 shows a stator with an inner wheel carrier and inner wheel of the motor-gear unit as illustrated in FIG. 6, FIG. 10 a top view of the stator with inner wheel carrier and inner wheel illustrated in FIG. 9 with the transmitter carrier in place, FIG. 11 a top view of the stator with inner wheel carrier and inner wheel illustrated in FIG. 9 with the transmitter carrier in place.

Lying radially opposite the permanent magnets 21 is a number of armatures 22, which are shown most clearly in FIG. 9. The armatures 22 are positioned radially around the inside of the cylindrical casing of the inner wheel 6, such that they are able to rotate about the axis of symmetry 10 together with the inner wheel 6. In this arrangement, the armatures 22 are surrounded by a coil winding (not shown in this view) to which an electronic control unit (similarly not shown) applies electrical power. This generates an alternating magnetic field, which interacts with the permanent magnet 21.

As is shown particularly clearly in FIG. 3, the permanent magnets 21 extend a little beyond the lower edge of the transmitter carrier 5. Fitted to the stator plate in the vicinity of the peripheral position of the permanent magnets 21 are sensors which allow the position of the transmitter carrier to be identified. In this arrangement it is possible to not only use the standard sensors such as Hall sensors, but also inexpensive optical sensors or simple induction coils in which the permanent magnets 21 generate characteristic induction currents for changes in the position of the transmitter carrier as they move past.

As shown particularly clearly in FIG. 2, the roller chain 8 has a number of bolts 23 on which are positioned rollers 24 and plates 25, which together with the bolts 23, form a plurality of chain links. In this arrangement the external diameter of the rollers 24, the geometry of the outer wheel toothing 2 and the geometry of the inner wheel toothing 7 are designed so as to create a chain drive between the housing 1 and the inner wheel 6.

In this arrangement a seal (not illustrated here) between the housing 1 and the transmitter carrier 5 ensures that the roller chain 8 as well as the sliding contact between the transmitters 3, 4 and the roller chain 8 and the bearings 14, 15, 19 receives lubrication without oil reaching the region of the stator 22, the stator plate 50 and the magnets 21.

To give a better understanding of the structure of the motor-gear unit 100 FIGS. 6 to 15 show it in various stages of disassembly.

Figure 6:
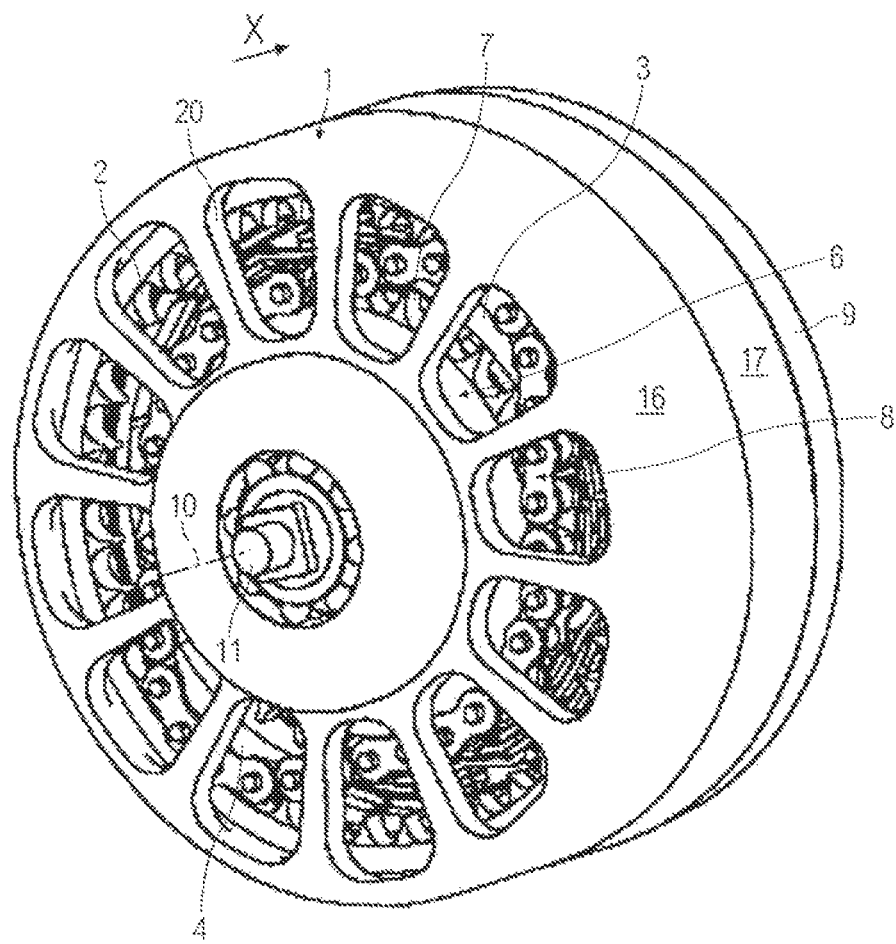
FIG. 6 shows an angled front view of the motor-gear unit illustrated in FIG. 1.

FIG. 6 shows an angled front view of the motor-gear unit 100 in its fully assembled state. There is a clear view through the viewing panels in the holes 20 of the manner in which the gear unit complete with outer wheel toothing 2, roller chain 8, inner wheel toothing 7 and the two transmitters 3, 4 operates.

Figure 7:
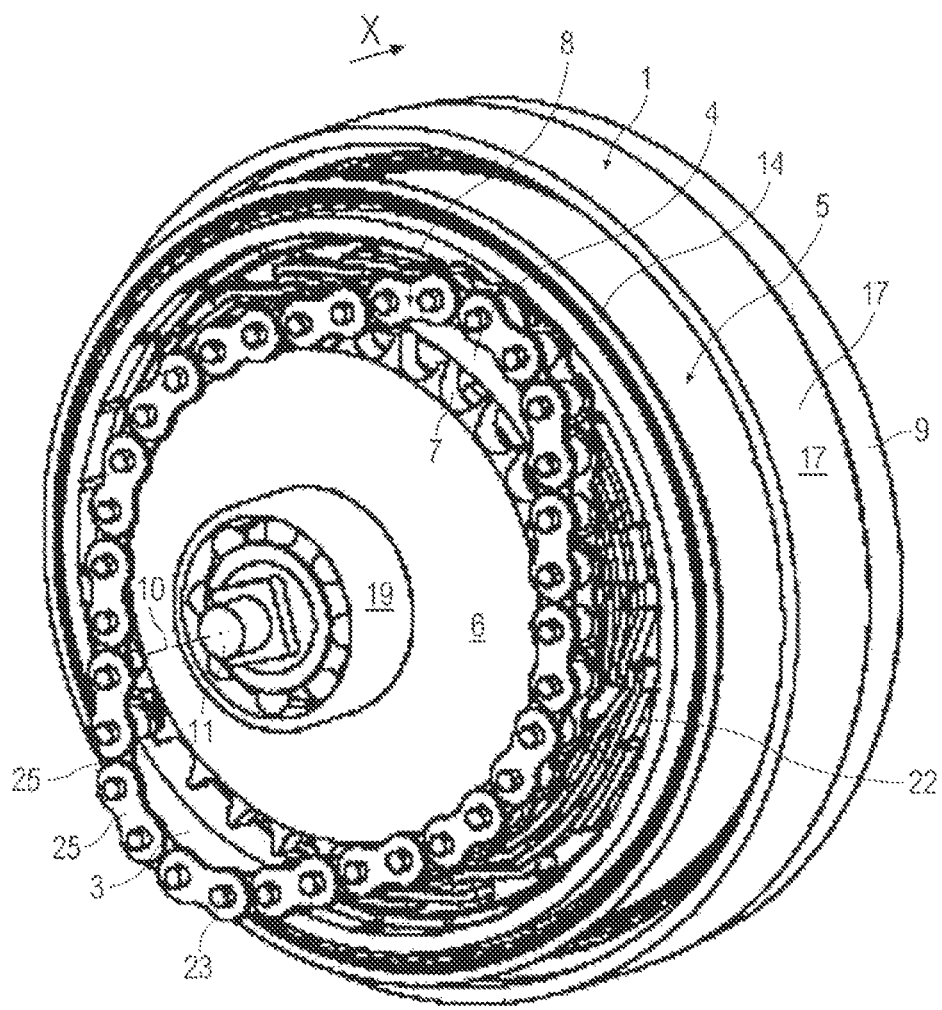
FIG. 7 shows a view of the motor-gear unit illustrated in FIG. 6 with the outer wheel cover removed.

FIG. 7 shows a view of the motor-gear unit disclosed in FIG. 6 with the front housing section 16 removed. The inner wheel 6 with the inner wheel toothing 6 is clearly visible. The oil seal on the transmitter carrier 5 in the region between the two transmitters 4, 5 has been removed in FIG. 7 giving a view of the armature stampings of the stators 22.

Figure 8:
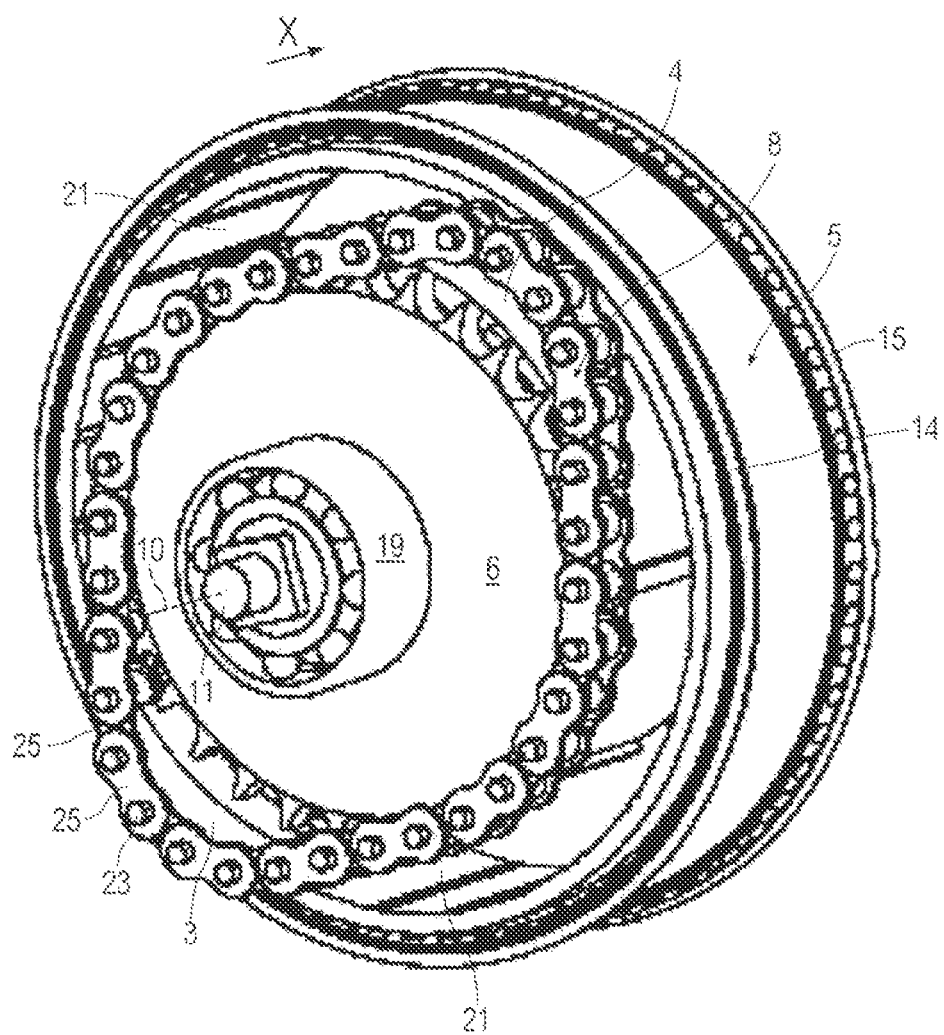
FIG. 8 shows a further view of the motor-gear unit illustrated in FIG. 6.

FIG. 8 shows a view of the motor-gear unit 100 illustrated in FIG. 6 with the stator plate 50 removed. The stators 22, which are still visible in FIG. 7, are therefore no longer visible in FIG. 8. As a result, the permanent magnets 21 are clearly visible on the inside of the transmitter carrier 5.

Figure 10:
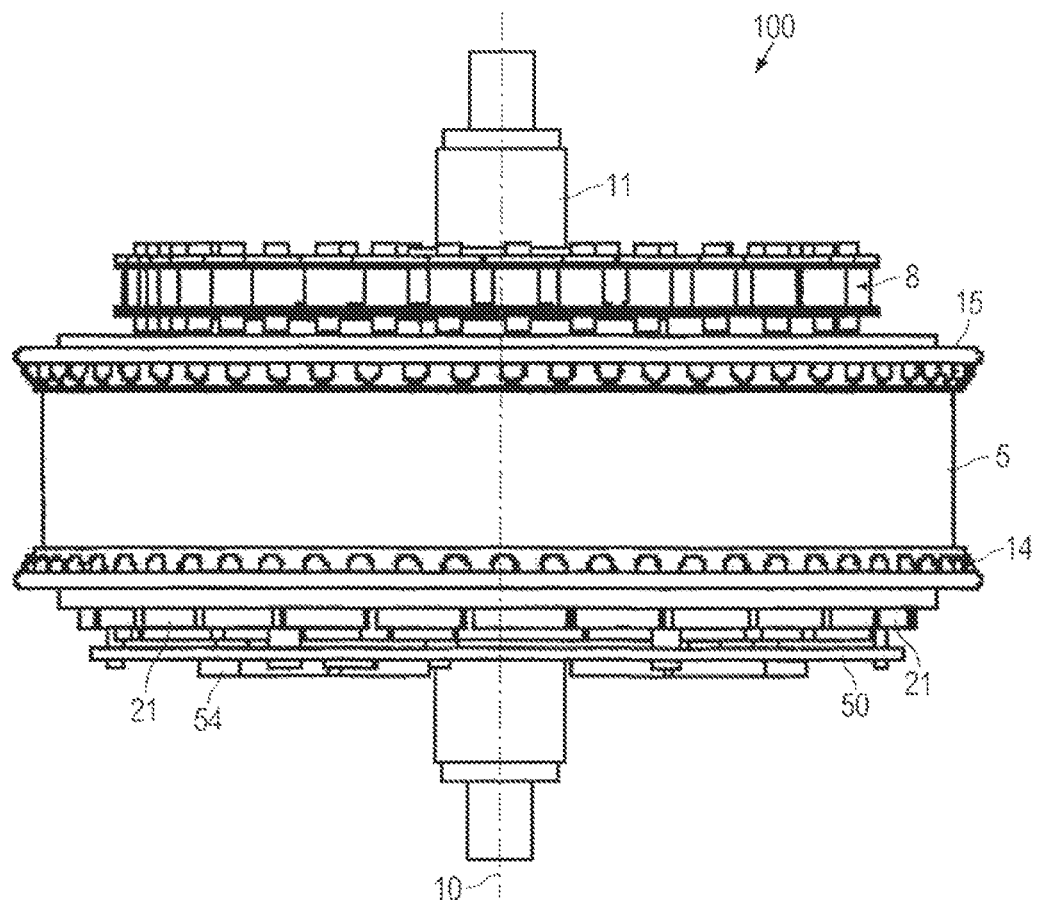

FIG. 9 shows the stator 22 removed in FIG. 8 with the inner wheel 6 and the output shaft 11, and FIG. 10 shows a top view of the stator with the inner wheel 6 as illustrated in FIG. 9, with the transmitter carrier 5 in place and the two bearings 14, 15 and the stator plate 50 and the capacitor connectors 54.

Figure 11:
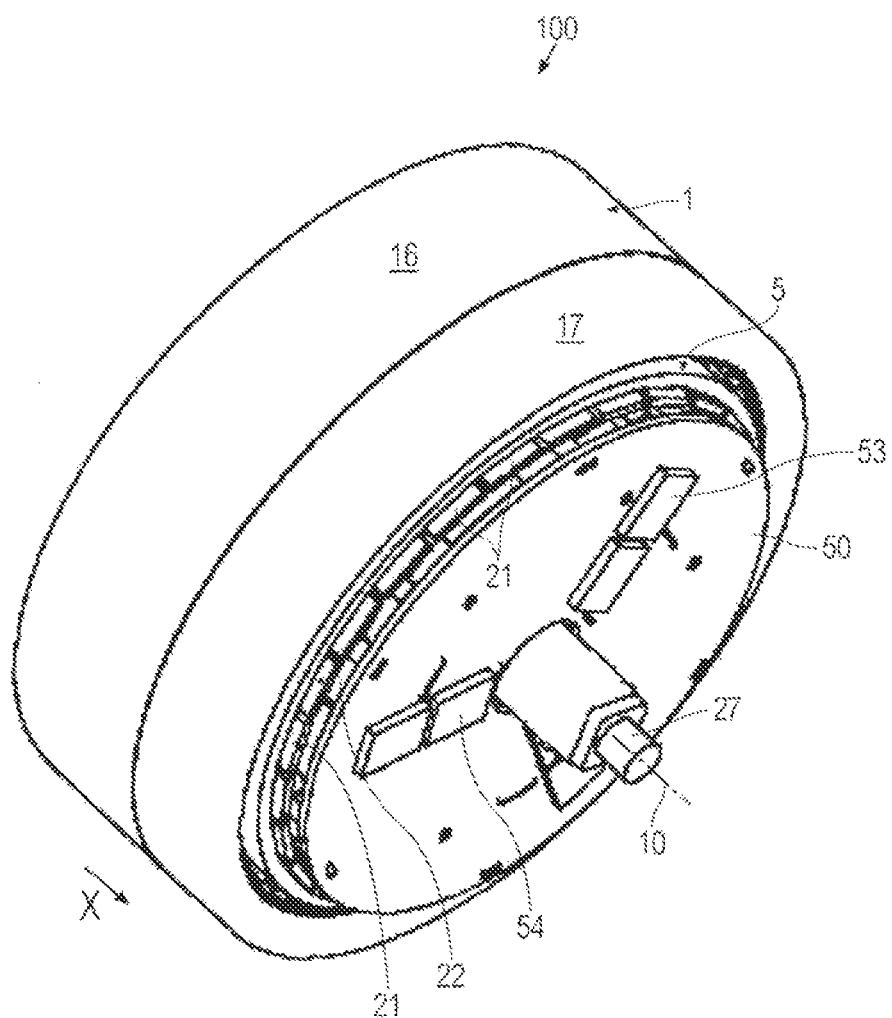
Figure 12:
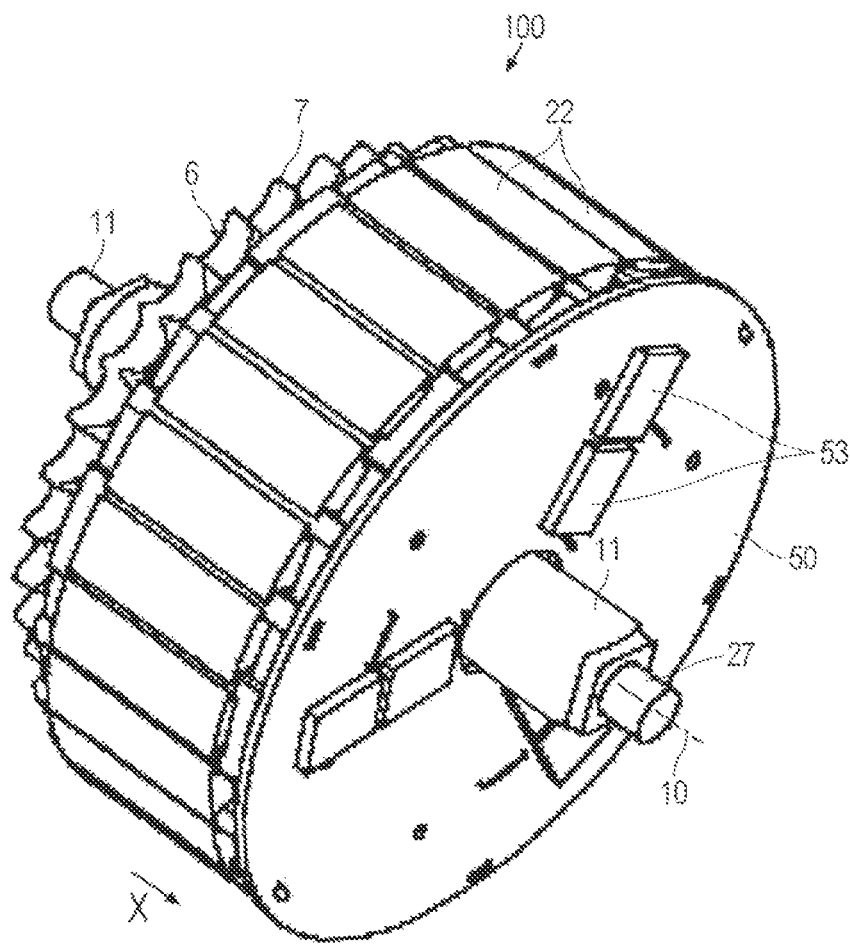
FIG. 12 shows a view of the motor-gear unit illustrated in FIG. 11 with the outer wheel removed.

FIG. 11 shows an angled rear view of the motor-gear unit illustrated in FIG. 1 but with the rear housing section 9 removed. The transmitter carrier 5 with the projecting permanent magnets 21, which pass flush by the stator plate, is clearly visible. The stator 22 is visible between the permanent magnets 21 and the stator plate 50. This stator 22 is shown particularly clearly in FIG. 12 in which the front housing section 16, the central housing section 17, and the transmitter carrier 5 have also been removed.

Figure 13:
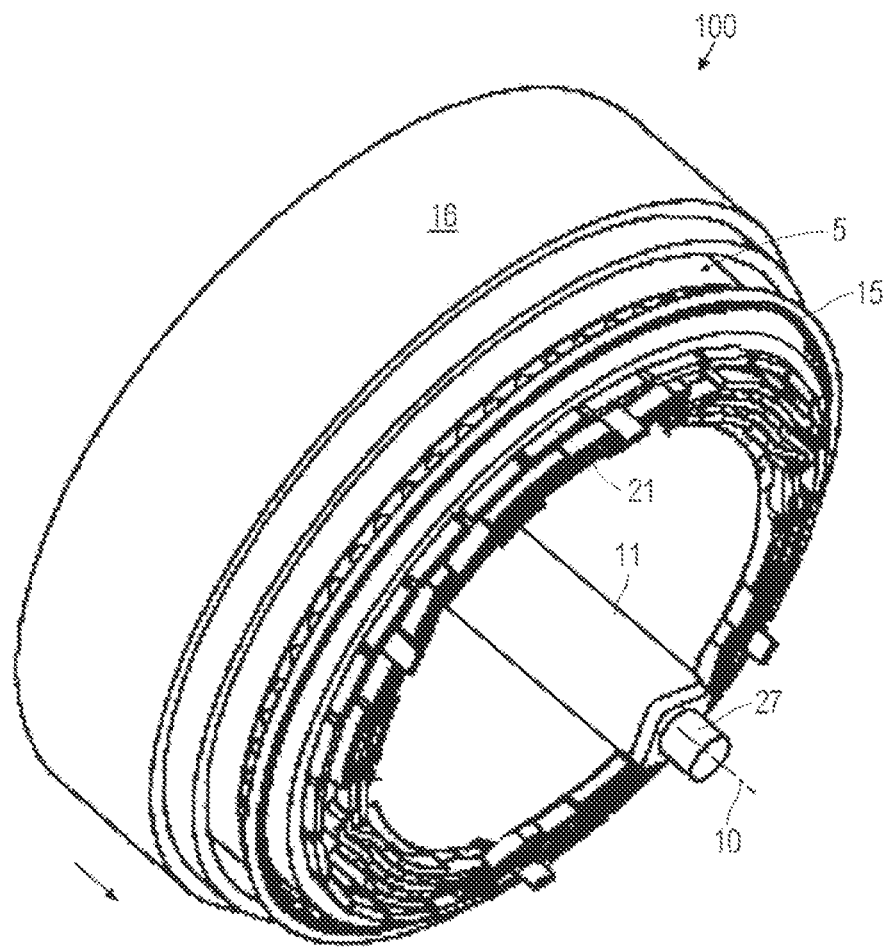
FIG. 13 shows a further view of the motor-gear unit illustrated in FIG. 11.

FIG. 13 shows a view of the motor-gear unit 100 as illustrated in FIG. 11 with the central housing section 17 and stator plate 50 removed.

Figure 14:
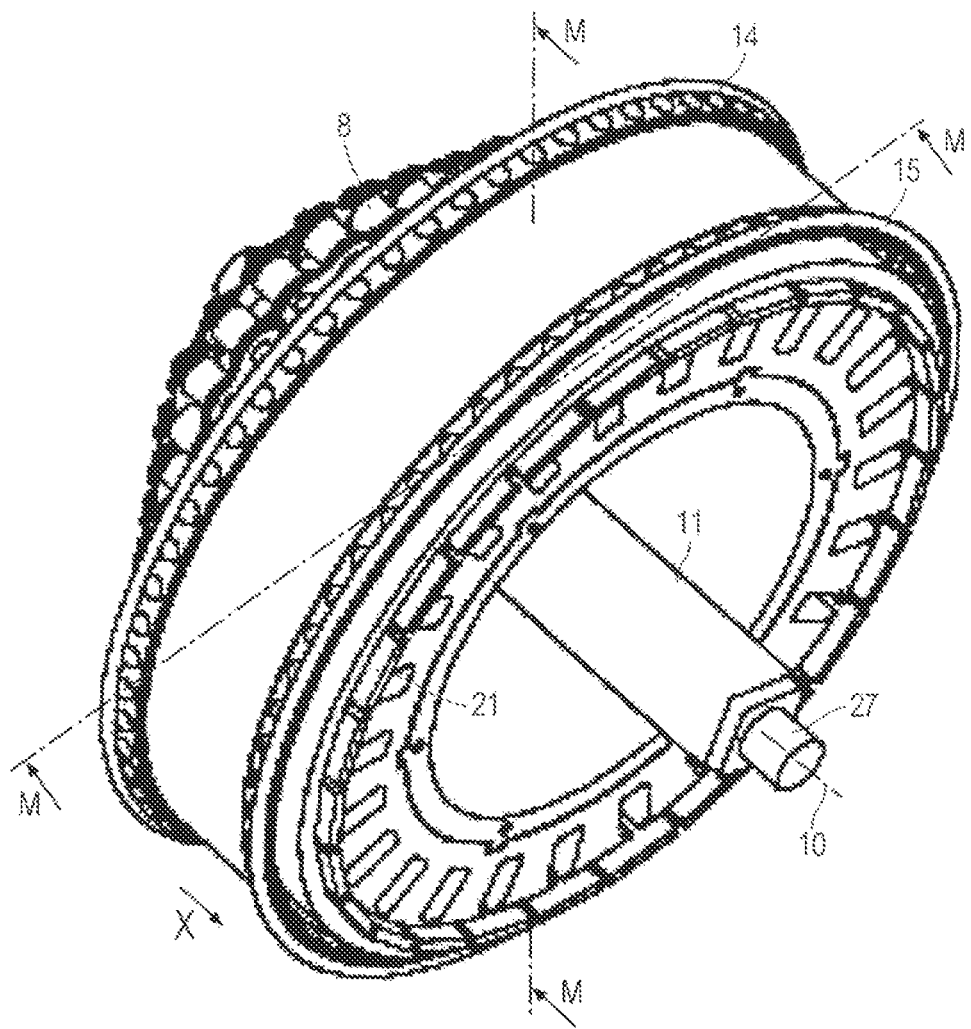
FIG. 14 shows a view of the motor-gear unit disclosed in FIG. 11 with the outer wheel removed.

FIG. 14 shows another view of the motor-gear unit 100 in the state illustrated in FIG. 10.

Figure 15:
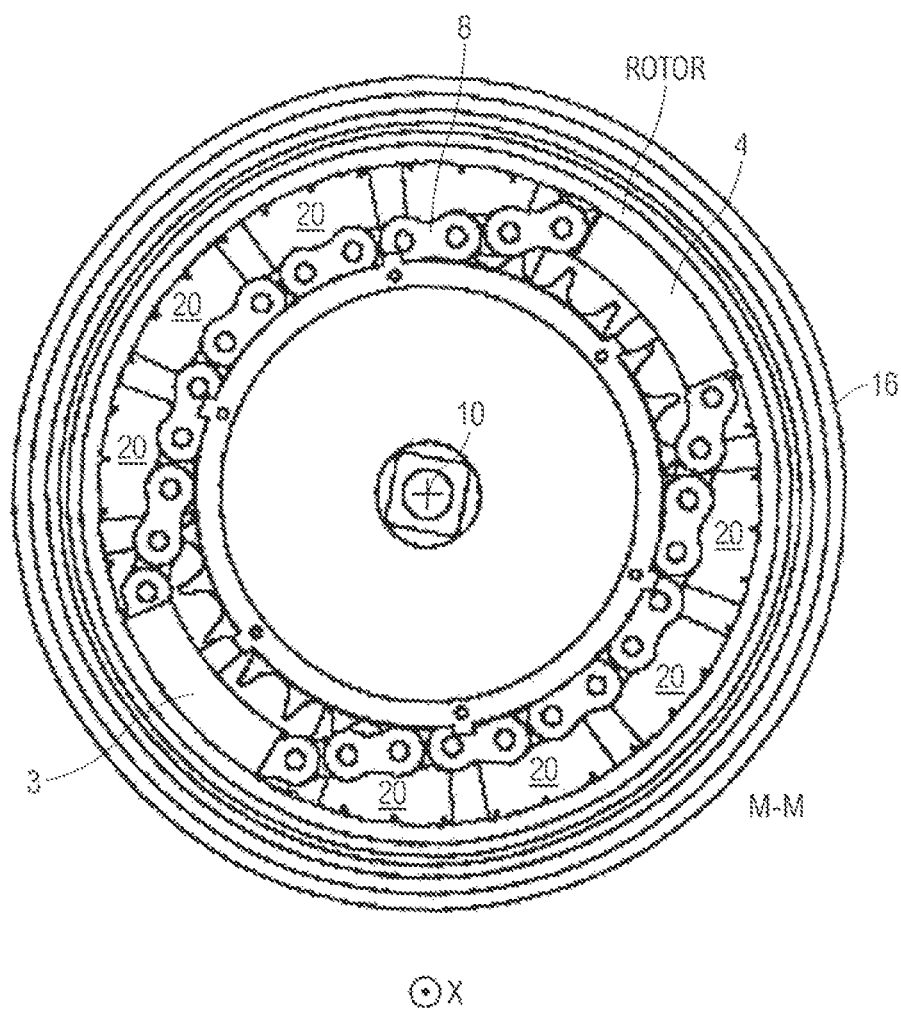
FIG. 15 shows a section through the motor-gear unit illustrated in FIG. 14 along a plane of intersection M-M.

FIG. 15 shows a section through the motor-gear unit as illustrated in FIG. 14 along the line of intersection M-M. The transmitter carrier 5 with the two transmitters 3, 4 is clearly visible. The spaces between the transmitters 3, 4 are sealed against oil leakage with plastic inspection glass (not shown here).

When the motor-gear unit 100 illustrated in FIGS. 1 to 15 is in operation the chain drive with the housing 1, the inner wheel 6 and the roller chain 8 is actuated as follows. An alternating voltage is applied in an appropriate manner to the coil windings (not shown here) around the armatures 22 so as to create an alternating electromagnetic field which cooperates with the permanent magnets 21. In this arrangement an electronic control device (of which the inverter components and the intermediate circuit annular capacitors are shown here) ensures that the alternating electromagnetic field sets the transmitter carrier 5 in rotation about the axis of symmetry 10. The first 3 and second transmitters 4 move together with the transmitter carrier 5 in a circular direction about the axis of symmetry 10.

As is seen most clearly in FIG. 5, in this arrangement links in the roller chain 8 are pushed consecutively peripherally towards the outer wheel toothing 2. In the process, the subsequent chain-strand in the peripheral direction of the transmitter carrier 5 pulls the inner wheel after it. In these circumstances the difference in radius between the outer wheel toothing 2 and the inner wheel toothing 7 results in a predetermined transmission ratio.

In the above-described embodiment, a gear unit is combined with an electric motor. The gear unit, comprising the housing 1 with the outer wheel toothing 2, the inner wheel 6 with the inner wheel toothing 7 and with the output shaft 11, the roller chain 8, the transmitter carrier 5 with the first 3 and second transmitters 4 can also be used with another type of motor that is adapted to drive the transmitter carrier 5. It is in principle also possible to drive the output shaft 11 while securing either the transmitter carrier 5 or the housing 1. The output torque can then be tapped either from the housing 1 or from the transmitter carrier 5.

Figure 16:
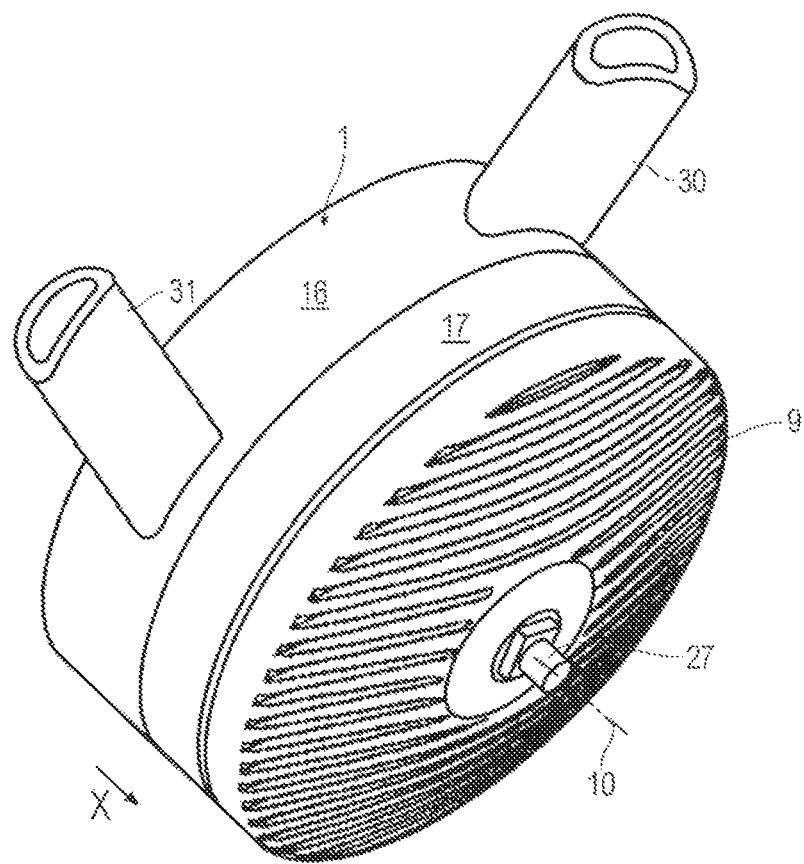
FIG. 16 shows an angled rear view of a further motor-gear unit as disclosed in the application which is integrated in a vehicle frame.

FIG. 16 shows an angled top view of a further motor-gear unit 100 as disclosed in this application. The motor-gear unit 100 in FIG. 16 is substantially the same as the motor-gear unit 100 shown in FIGS. 1 to 15. Identical parts are given the same reference numerals. In this arrangement, a first frame tube 30 and a second frame tube 3 are welded to the periphery of the front housing section 16, forming a frame of a two-wheeled vehicle (not illustrated here). The output shaft 11 drives a rear wheel of the vehicle (not shown here).

Figure 17:
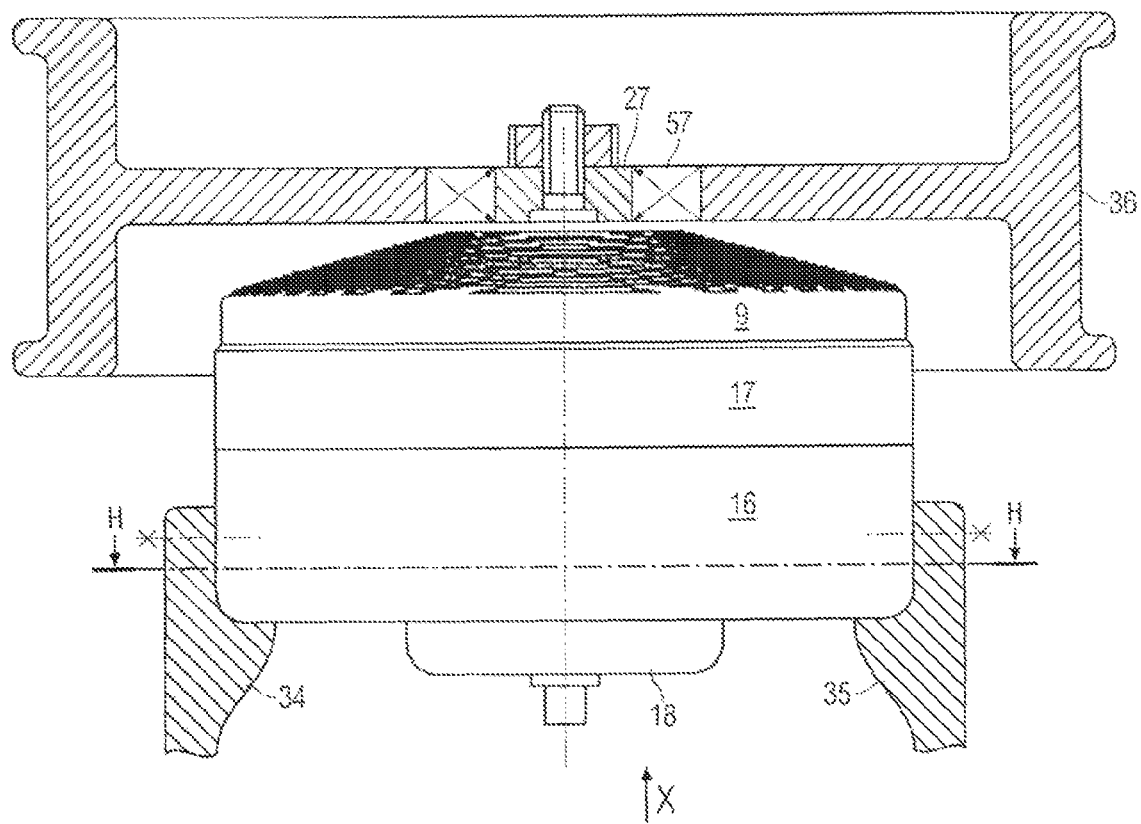
FIG. 17 shows a view of a further motor-gear unit.

FIG. 17 shows a view of a further motor-gear unit, which has substantially the same parts as the motor-gear unit shown in the previous figures. Identical parts are given the same reference numerals.

In this arrangement a trailing or driven wheel 33 intended to take a tyre of a two-wheeled vehicle is screwed to the output shaft 11. The trailing wheel 33 is provided with a free-wheeling device or free-wheel 57.

As is shown particularly clearly in FIG. 17, a first transverse link 34 and a second transverse link 35a) are fixed to the front housing section 16.

Figure 18:
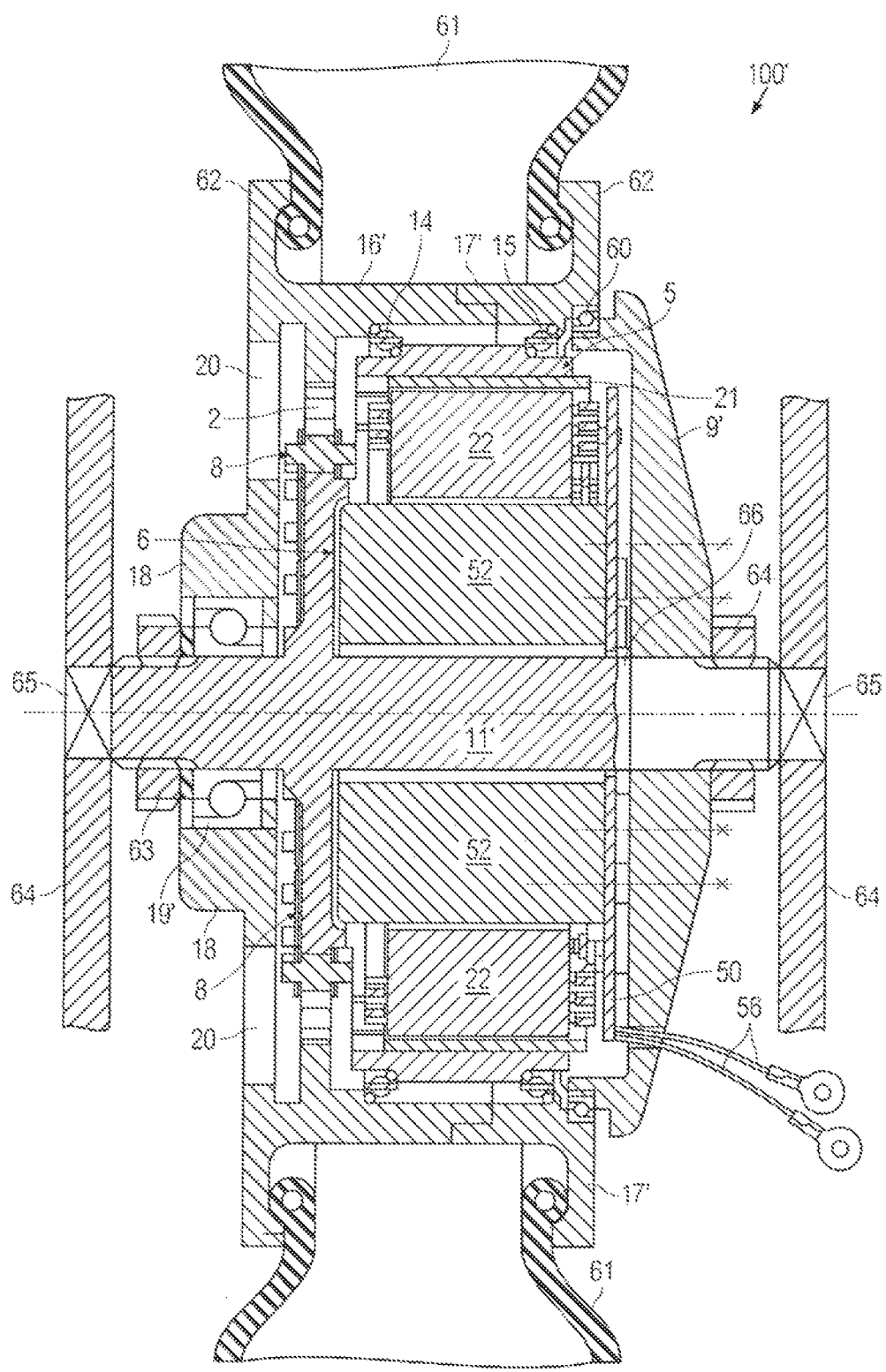
FIG. 18 shows a top view of a further motor-gear unit with a chain pinion fitted.

FIG. 18 shows a further motor-gear unit 100 which is designed as a wheel hub motor of a vehicle not shown here in full. Parts, which are the same as those in the motor-gear unit 100 shown in FIGS. 1 to 17, have the same reference numerals or the same reference numerals followed by an apostrophe in the case of parts with the same function but a different form.

In contrast to the preceding embodiments, the output shaft 11' is fixed. It is mounted on two square ends 65 in wishbone tubes of a vehicle (not illustrated here). A rear shaft nut 64 tightens the rear housing section 9' onto a shaft projection 66 on the output shaft 11'. On the opposite side of the output shaft 11', a front shaft nut 63 sets the play of the bearing 19', 60 by means of which the front housing section 16' and the central housing section 17' are mounted such that they are able to rotate on the output shaft 11' or the rear housing section 9'.

In this arrangement, the front housing section 16' and the central housing section 17' are each provided with a rim flange 62, thereby forming a rim upon which the tyre 61 is placed.

The tyre 61 is therefore driven via the front housing section 16' and the central housing section 17' while the output shaft 11' is fixed in the wishbone tubes 64.

FIGS. 19 to FIG. 22 illustrate the function of the harmonic chain gear disclosed in the application. In this arrangement links in the roller chain 8 are dragged or lifted successively peripherally by the first 4 and second transmitters 4 into the outer wheel toothing 2.

In this case, the front housing section 16 is fixed to the outer wheel toothing 2. This is indicated by the letter "B" marked on the top of the front housing section 16, which is fixed in FIGS. 19 to 22.

Figure 19:
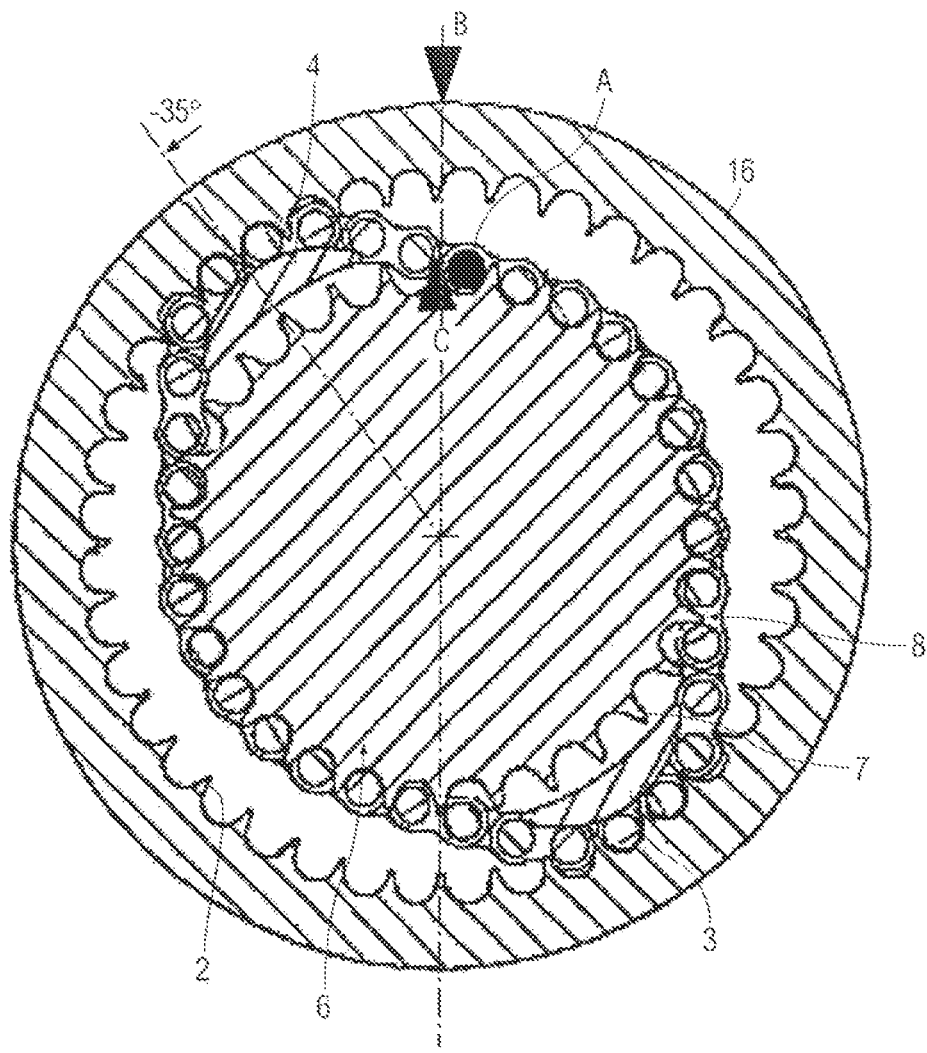
FIG. 19 to FIG. 22 illustrate the function of the harmonic chain gear disclosed in the invention.
Figure 20:
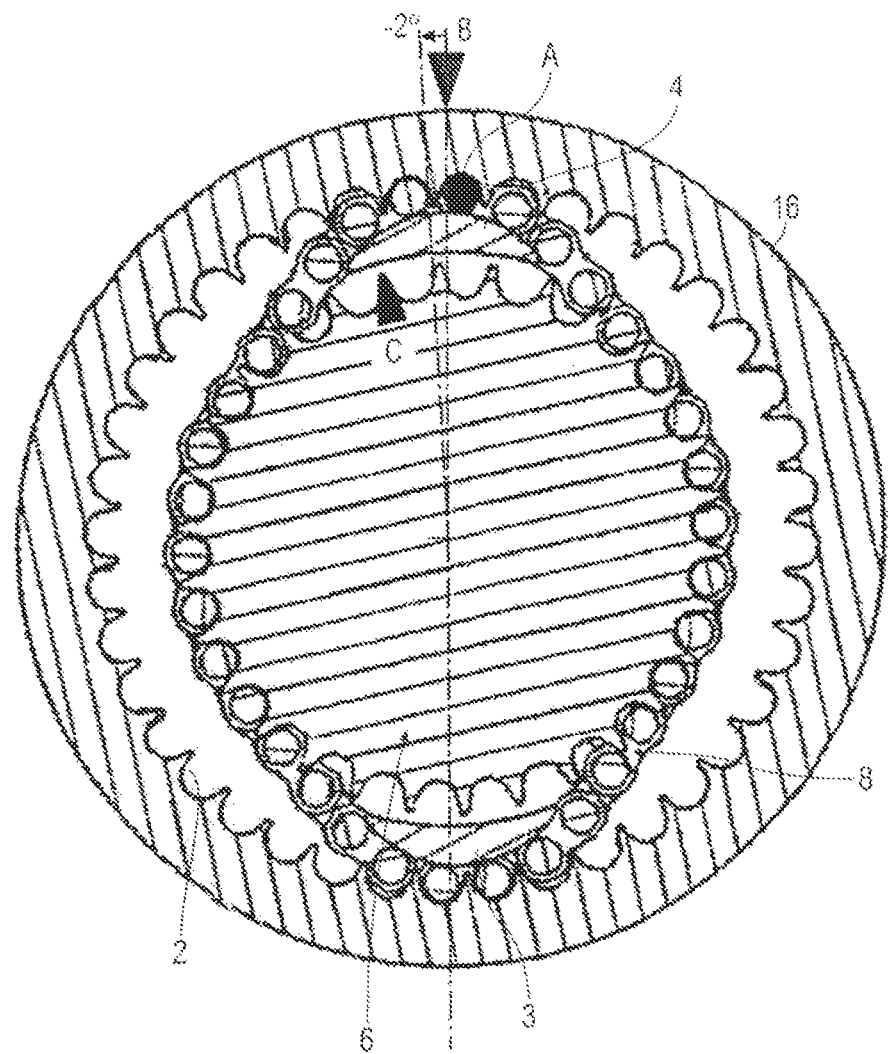
Figure 21:
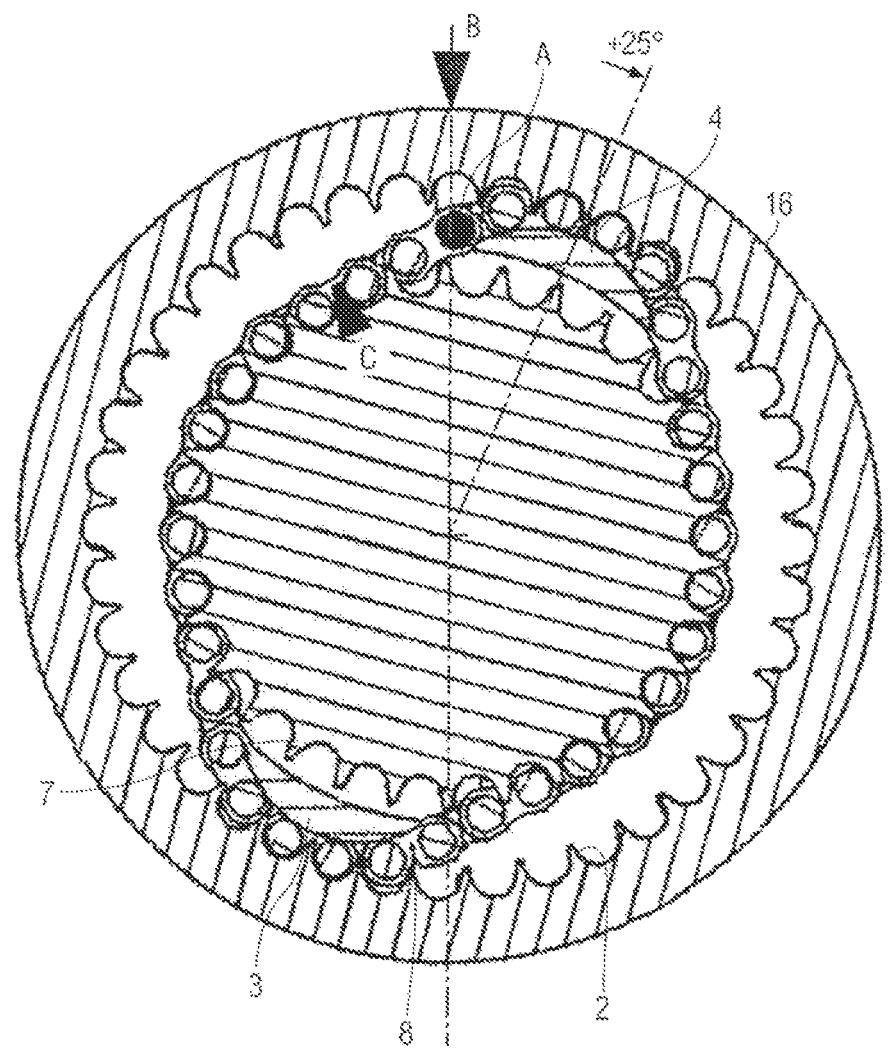

The transmitters 3, 4 revolve with the transmitter carrier 5, which rotates clockwise. In FIG. 19 the second transmitter 4 stands at a position of −35° (degrees), in FIG. 20 the second transmitter 4 stands at a position of 2° (degrees), in FIG. 21 the second transmitter 4 stands at a position of +25° (degrees) and in FIG. 22 the second transmitter 4 stands at a position of +53° (degrees).

In the process the chain strand of the roller chain 8 following the second transmitter 4 in the peripheral direction of the transmitter carrier 5 pulls the inner wheel 6 with it. This is indicated by means of the letter "C" marked on the inner wheel 6 and the letter "A" marked on the roller chain 8.

Figure 22:
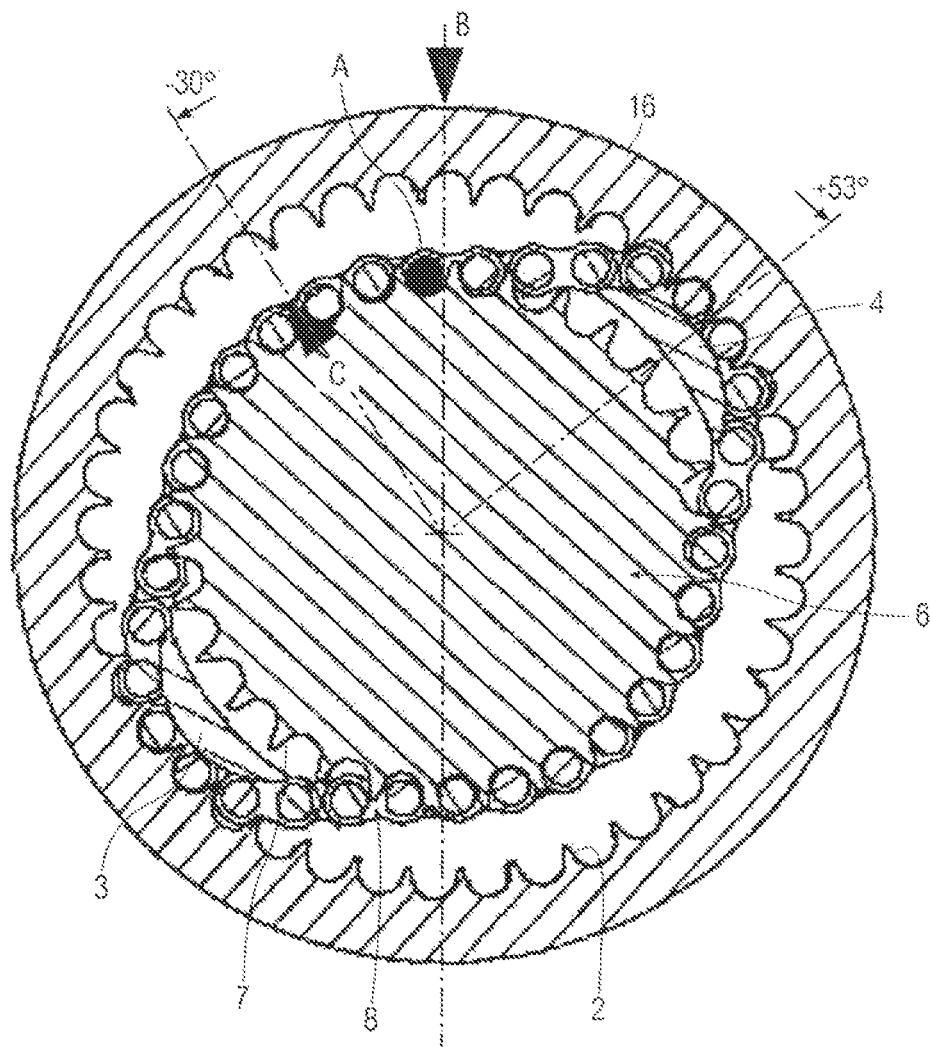

When the second transmitter 4 moves clockwise from a position of −35° (degrees) in FIG. 19 to a position of +53° (degrees) in FIG. 22, the inner wheel 6 moves by an angle of approx. 30° (degrees) anticlockwise.

In these circumstances, the difference in radius between the outer wheel toothing 2 and the inner wheel toothing 7 results in a predetermined transmission ratio of approx. 3:1.

In the application, output can be achieved in several manners. Firstly, the outer wheel 1 can be fixed as is the case in the embodiments illustrated in FIGS. 1 to 17. Here output is via the inner wheel 6 when the electric motor is driving the transmitter carrier 5. Alternatively, the inner wheel 6 can be fixed as in the embodiment illustrated in FIG. 18. In this case, output is via the outer wheel 1 when the electric motor is driving the transmitter carrier 5.

Alternatively, it is also conceivable for the inner wheel 6 to be driven by the electric motor and to fix either the transmitter carrier 5 or the outer wheel 1. When the outer wheel 1 is fixed, output is via the transmitter carrier 5. Conversely, if the transmitter carrier 5 is fixed, output is via the outer wheel 1. In these designs, it is necessary to pay particular attention to the friction characteristics in the region of the roller chain 8 to avoid self-inhibiting. Self-inhibiting or self-locking can be avoided by means of the appropriate design of the sliding surfaces of the roller chain 8, and also by means of friction-reducing measures such as lubrication or additional bearings in the transmitters 3, 4, for example.

Accordingly, the electric motor can also drive the outer wheel 1 with output being via either the transmitter carrier 5 or the inner wheel 6, depending on whether the inner wheel 6 or the transmitter carrier 5 is fixed.

The roller chain 8 can be replaced by other traction or pressure means, for example by a toothed belt, which can also be provided with teeth on both sides. A similar design will be illustrated with respect to FIGS. 47-49. Instead of a form-fit as in the embodiments, whereby teeth on the wheels engage in gaps in the roller chain, a form-fit with teeth in the traction or pressure means engaging in gaps in the inner wheel or outer wheels is possible. Finally, it is also conceivable to use a friction connection between the corresponding wheels and the traction or pressure means.

Figure 23:
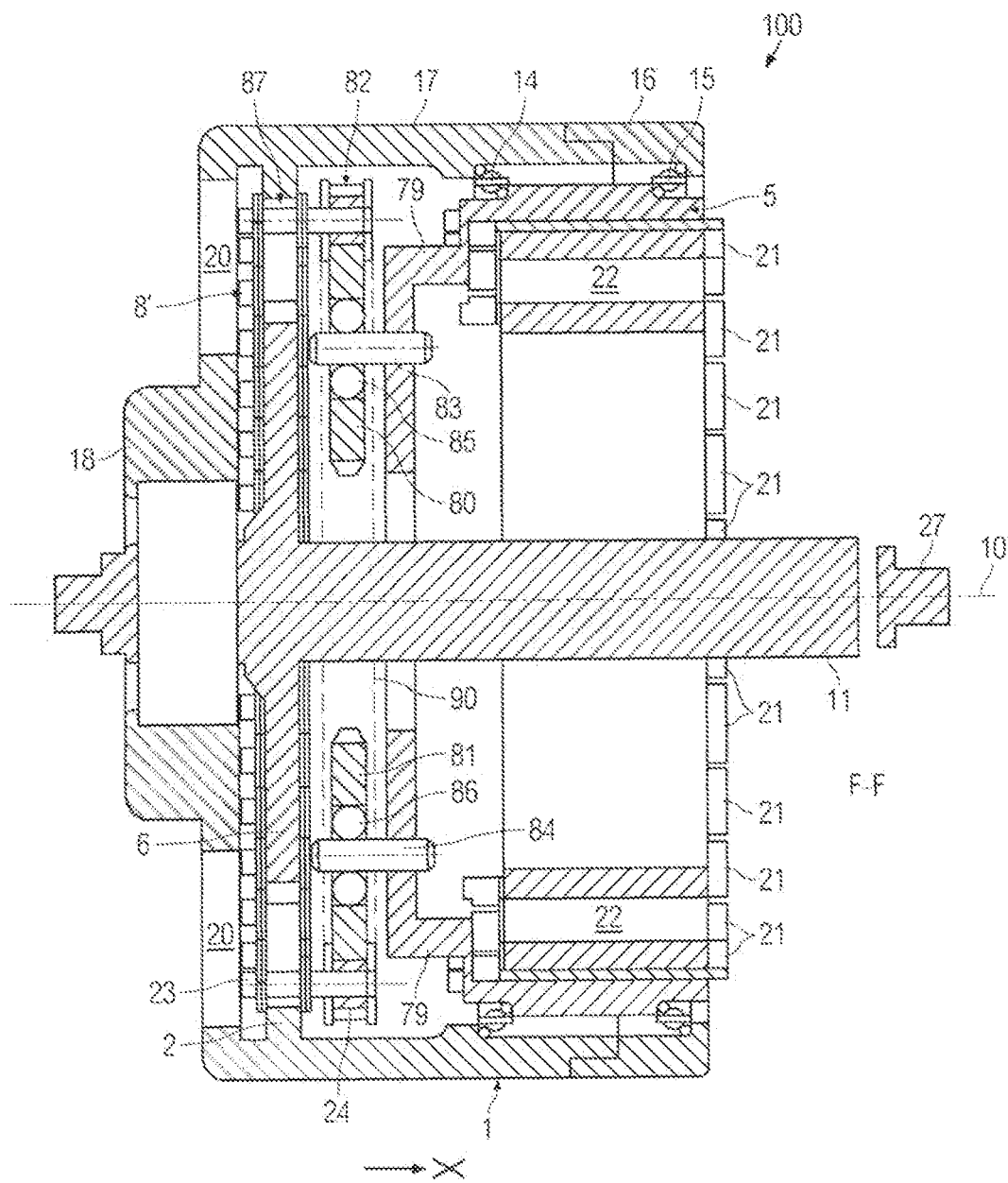
FIG. 23 shows a harmonic chain gear as disclosed in one embodiment with a double chain.

FIG. 23 shows a cross-section F-F of a further motor-gear unit 100, which is designed as a wheel hub motor of a vehicle (not illustrated in full). Parts, which correspond to parts in the previous FIGS. 1 to 22, have the same reference numerals. The section is labelled F-F since the orientation of the cross-section is the same as in FIG. 3 in which the chain 8 is lifted off the inner wheel 6.

In comparison to FIG. 3, the transmitter carrier 5 is extended by a cup-shaped region 79 on the side of the inner wheel 6. Provided on the cup-shaped region 79 are two shafts 83, 84, which are positioned parallel to the axis of symmetry 10. Two gear wheels 80, 81 are mounted on ball bearings 85, 86 on the shafts 83, 84. The gear wheels 80, 81 correspond to the transmitters 3, 4 shown in FIG. 3. The gear wheels 80, 81 are engaged in the inside of a second chain 82 of a double chain 8'. The second chain 82 is indicated by means of a broken line 90. The two shafts 83, 84 are positioned opposite one another in relation to the axis of symmetry 10 and are the same distance from the axis of symmetry 10. In the embodiment illustrated in FIG. 23 this distance is smaller than the radius of the inner wheel 6.

As described above, in operation the transmitter carrier 5 is set in rotation by forces acting on the permanent magnets 21. The outside of a first chain 87 of the double chain 8' is thus drawn into the outer wheel toothing 2 by means of the gear wheels 80, 81. The inside of the first chain 87 of the double chain 8' is engaged with the inner wheel toothing 7 and the inner wheel 6 and, thus, the output shaft 11 are therefore driven in the manner previously shown in FIGS. 19 to 22.

The use of a double chain 8' allows the gear wheels 80, 81 to rotate in a plane parallel to the inner wheel 6. Thus, the optimum size can be chosen for the gear wheels 80, 81. Using larger gear wheels 80, 81 increases the contact surface between the gear wheels 80, 81 and the chain 8' and between the chain 8' and the outer wheel toothing 2. The forces occurring are thus more evenly distributed and the load on the chain 8' and the outer wheel toothing 2 reduced. In addition, it is possible to make the distance between the inner wheel toothing 7 and the outer wheel toothing 2 smaller. This means that it is possible to achieve higher speed-reduction at a given tooth size.

Instead of the gear wheels 80, 81 it is also possible to use rollers, which push the inside of the second chain 82 outwards. The rollers and, in particular, the gear wheels 80, 81 are able to deflect the forces, which occur along the periphery of the chain 8'. This leads to lower friction losses when the chain 8' is drawn into the external teeth 2.

Figure 24:
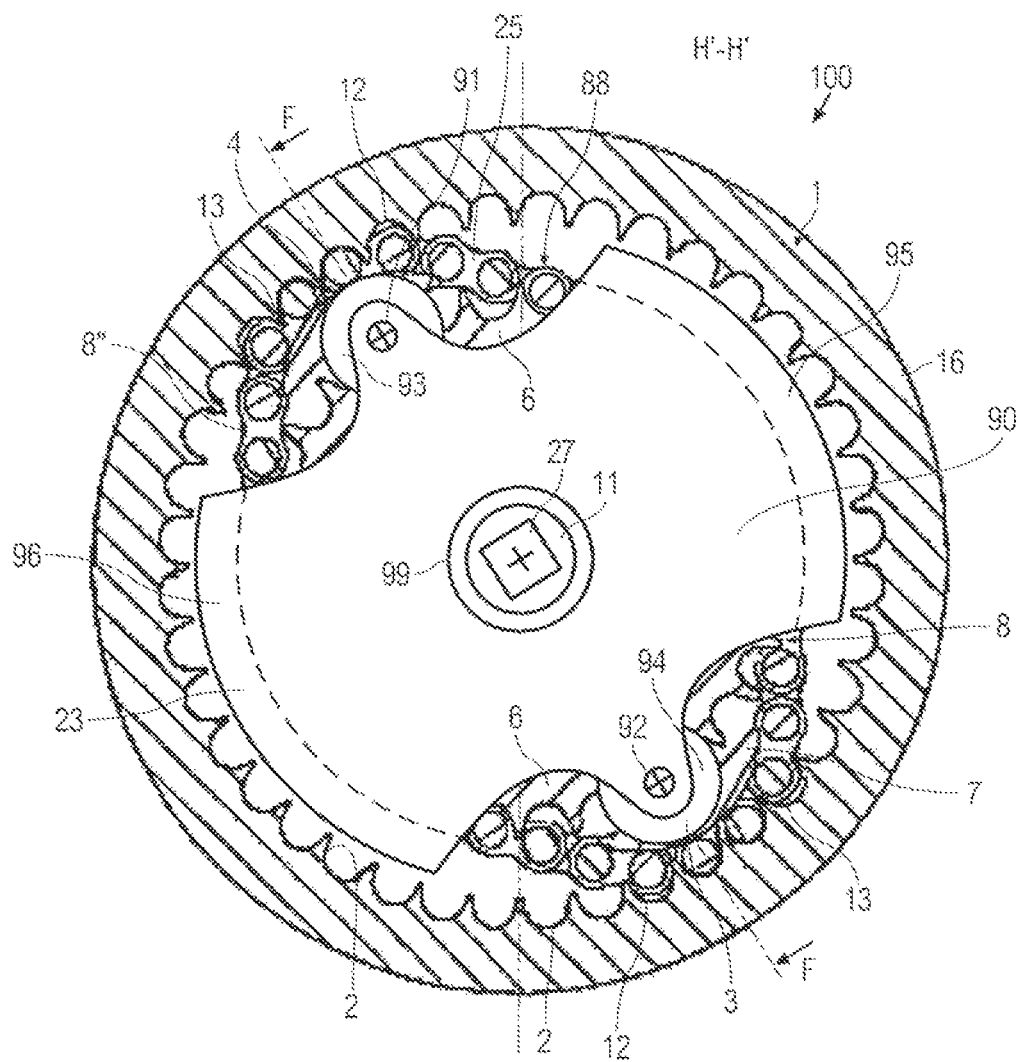
FIG. 24 shows a view of a harmonic chain gear as disclosed in an embodiment with a triple chain.
Figure 35:
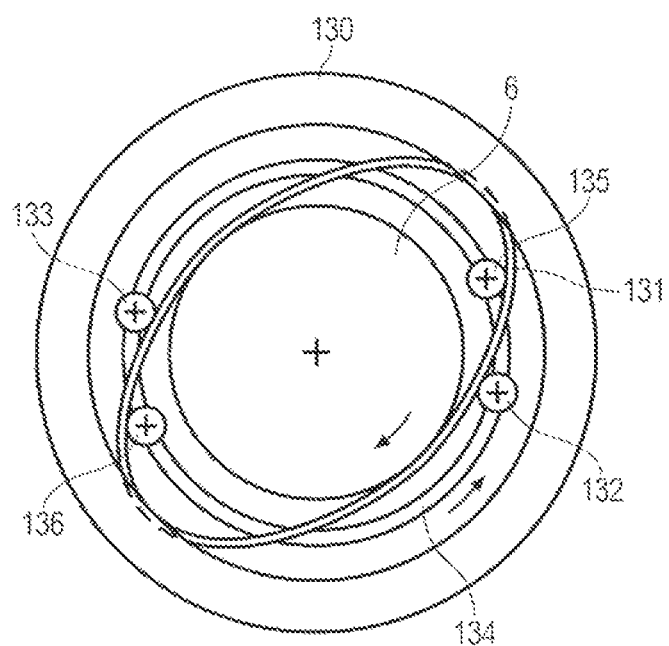
FIG. 35 shows a version of the previous embodiments with a pressure means.

FIGS. 24 and 35 show a further embodiment in which a triple chain 8" is provided in place of the double chain 8' as shown in FIG. 23. Elements already shown in FIG. 23 are not reiterated. The sectional plane H'-H' shown in FIG. 24 is positioned parallel to the corresponding sectional plane H-H shown in FIG. 4 and offset towards the output shaft 11.

A transmitter disc 90 is mounted on the output shaft 11 such that it is able to rotate freely. Provided in the transmitter disc 90 are two shafts 91, 92 on each of which a gear wheel 93, 94 is positioned. The gear wheels 93, 94 are located on opposing sides in relation to the axis of symmetry 10 and engage in a third chain 88 of the triple chain 8" from within. The transmitter disc 90 is cut out in the area of the shafts 91, 92 in such a manner that the region in which the triple chain is lifted off the inner wheel 6 remains free. In the centre of the transmitter disc 90, a circular opening is left free around the output shaft. Two outer regions 95, 96 of the transmitter disc 90 are located outside the periphery of the inner wheel toothing 7 and are connected rigidly to the transmitter carrier 5 by two fixings (not illustrated). The fixings pass through the space between the inner wheel 6 and the outer wheel toothing 2.

Figure 25:
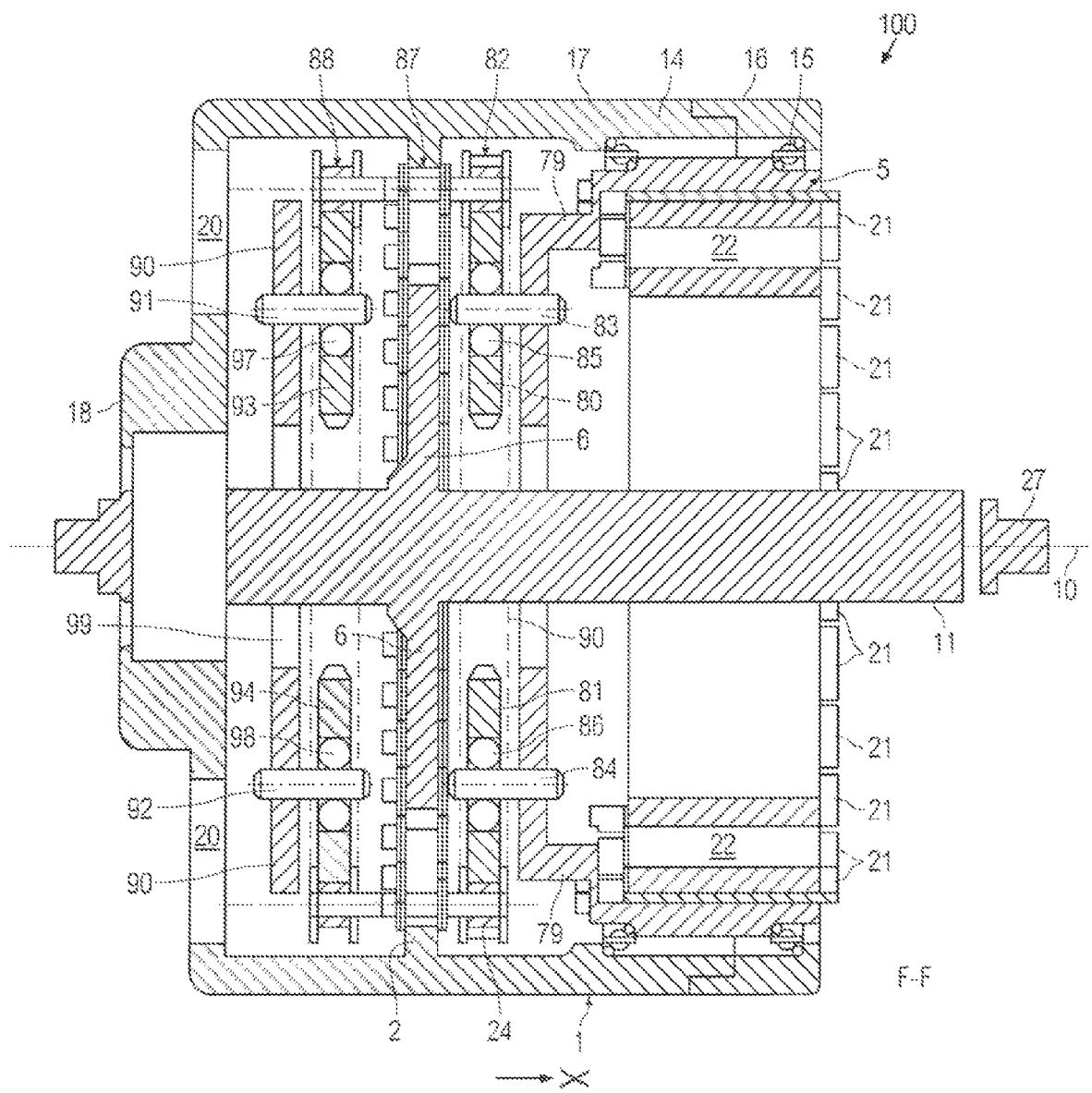
FIG. 25 shows the harmonic chain gear illustrated in FIG. 24 along the cross-section marked F-F in FIG. 24.

FIG. 25 shows a section along the line of intersection marked F-F in FIG. 24, which corresponds to the section shown in FIG. 23. As shown best in FIG. 25, the gear wheels 93, 94 are positioned opposite gear wheels 80, 81, which engage in the second chain 82 of the triple chain 8" from within. Like gear wheels 80, 81, gear wheels 93, 94 are also mounted on ball bearings 97, 98. For reasons of clarity in FIG. 25, the second chain 82 and the third chain 88 are indicated by means of broken lines and only the uppermost and lowermost chain bolts are drawn in full.

Due to the axially symmetrical arrangement of the triple chain 8" in relation to the inner wheel 6 shown in FIG. 25, the load on the triple chain 8" is more uniform than for the double chain 8' shown in FIG. 23.

The transmitter disc 90 can be supported by an additional bearing on the output shaft 11. Instead of a cup-shaped region 79, the transmitter carrier 5 can also be of another suitable shape. In addition, the embodiments shown in FIGS. 23 to 25 can also be combined with the other output variants specified above. Further, it is possible to provide transmitters, which are fixed to the transmitter carrier instead of the gear wheels or rollers. This results in a simpler design.

Figure 26:
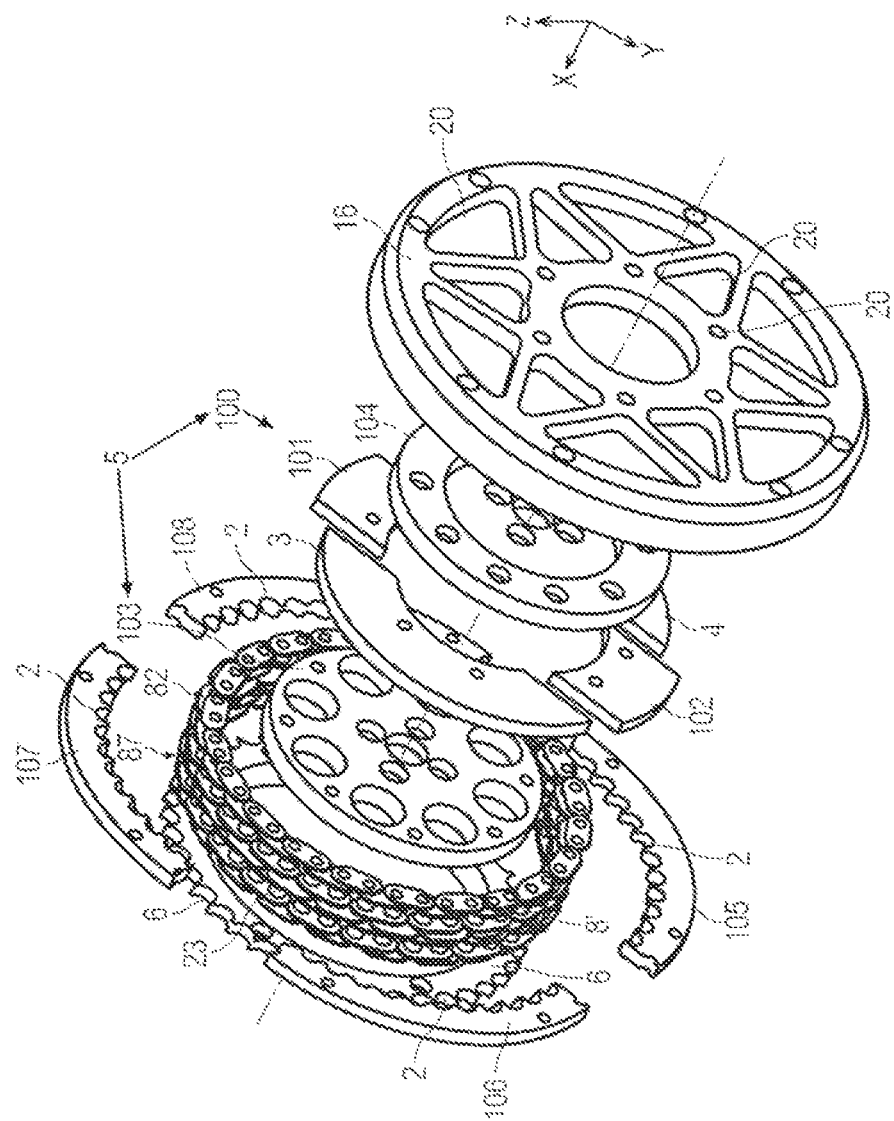
FIG. 26 shows an exploded drawing of a further embodiment of a harmonic chain gear with a double chain.

FIG. 26 shows an exploded drawing of a further embodiment of a harmonic chain gear. It is viewed from the side opposite the input. Parts located behind the inner wheel 6 in direction x are not shown. As in FIG. 23, FIG. 26 also shows a double chain 8' with a first chain 87 on the input side and a second chain 82, the first chain 87 and the second chain 82 being integrated into one integral double chain. The first chain 87 is also called first chain row and the second chain 82 is also called second chain row. Unlike in FIG. 23, a chain slide 100 for dragging the first chain 87 of the double chain 8' into the outer wheel toothing 2 is provided in the axial plane of the second chain 82. The outer wheel, which contains the outer wheel toothing 2, comprises four parts, being made up of four identically shaped quarter rings 105, 106, 107, 108. The length of the double chain 8' is dimensioned such that the double chain 8' lies adjacent to the periphery of the chain slide 100. An inner wheel 6 is located in the plane of the input-side chain 87 of the double chain 8' and is designed as a ring with external toothing. A transmitter carrier 5 passes through the inside of the inner wheel 6.

The chain slide consists of four plates 3, 4, 101, 102 located in the plane of the chain 82. In the region of the plates 3, 4, the double chain 8' is lifted off the inner wheel 6. The plates 3, 4, 101, 102 thus serve as transmitters 3, 4, 101, 102 for transmitting the torque between the toothing of the inner wheel 6 and the outer wheel toothing 2. The plates 3, 4, 101, 102 of the chain slide 100 are screwed in position between a round centring plate 104 and a disc-shaped slide chain holder 103. The centring plate 104 and the chain slide holder 103 thus form components of the transmitter carrier 5.

Screw holes are provided in the quarter rings 105, 106, 107, 108 of the inner wheel 6, in the chain slide holder 103, in the plates of the chain slide 100, in the centring plate 104 and in the front housing section 16 for assembly from the front. If input is to be via the outer wheel and output via the transmitter carrier 5, assembly is carried out as follows. The outer wheel is screwed to a hollow cylinder, which is connected to a rotor of the drive motor. The inner wheel 6 is screwed to a further hollow cylinder, which is connected to the stator 22. In addition, the chain slide holder 103, the chain slide 100, and the centring plate 104 are screwed to the output shaft 11 by means of screw holes positioned one above the other.

In an alternative embodiment to FIG. 26 the chain slide of the transmitter carrier can also be designed as one part and the inner wheel can consist of a different number of parts. The transmitter carrier 5 can also be designed such that rollers or gear wheels—as shown in FIG. 23—are fitted to it, which drag or lift the double chain 8' into the outer wheel toothing 2.

Due to the use of a double chain 8', the pressure force of the transmitter 3, 4, 101, 102 does not act directly on the outer wheel 105, 106, 107, 108. Any running noise can be compensated for by the double chain 8'. In particular, the outer wheel can be made from a plurality of parts and is thus easier to manufacture.

In the above-described embodiment, a gear unit is often combined with an electric motor. The gear unit comprising the double chain 8', the chain slide 100, the outer wheel toothing 2, the inner wheel 6, and the transmitter carrier 5 with the transmitters 3, 4, 101, 102 can be combined with any type of motor, engine or turbine. It is in principle possible to drive the outer wheel 105, 106, 107, 108, the inner wheel 6 or the transmitter carrier 5. If the outer wheel 105, 106, 107, 108 is driven, one can then secure either the transmitter carrier 5 and tap the output torque from the inner wheel 6 or one secures the inner wheel 6 and taps the output torque from the transmitter carrier 5. If the inner wheel 6 is driven, one can then either secure the transmitter carrier 5 as well as tap the output torque from the outer wheel 105, 106, 107, 108, or one can secure the outer wheel 105, 106, 107, 108 and tap the output torque from the transmitter carrier 5. If the transmitter carrier 5 is driven, one can then either secure the inner wheel 6 and tap the output torque from the outer wheel 105, 106, 107, 108, or one can secure the outer wheel 105, 106, 107, 108 and tap the output torque from the inner wheel 6.

Figure 27:
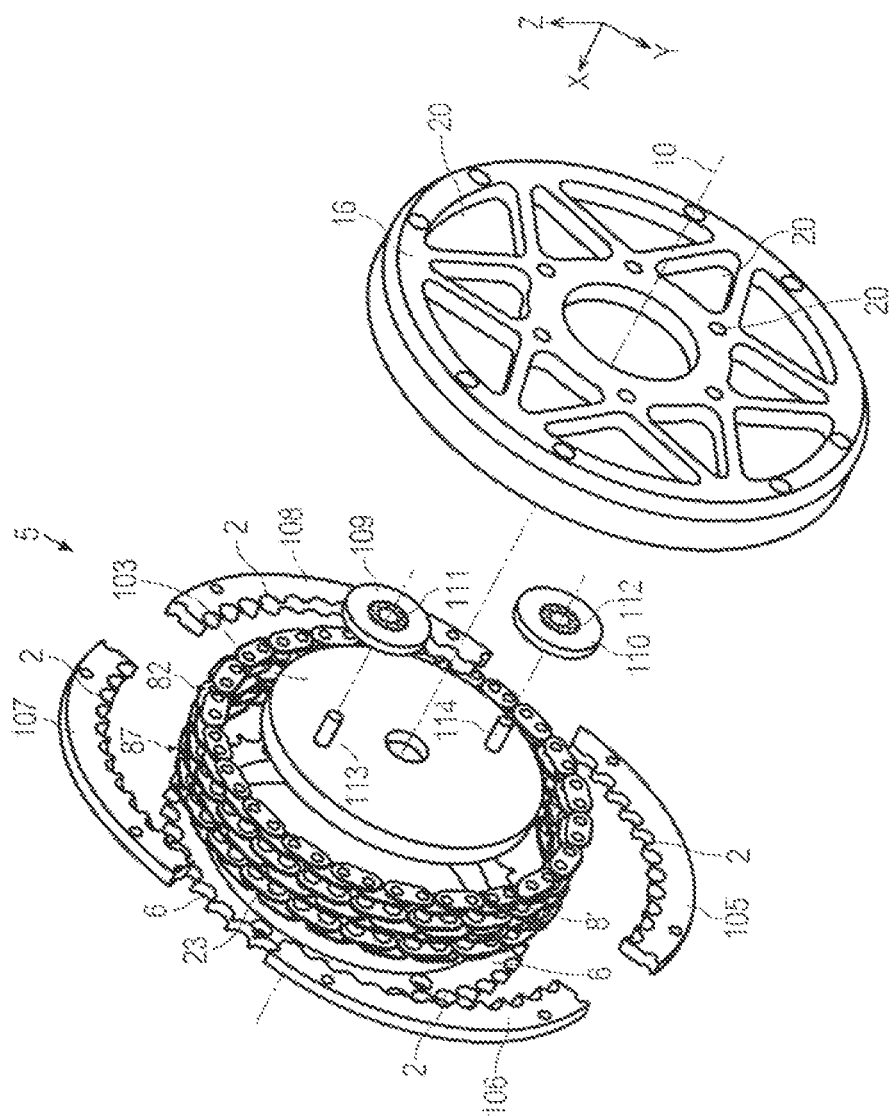
FIG. 27 shows an exploded drawing of a further embodiment of a harmonic chain gear.

FIG. 27 shows an exploded drawing of a further embodiment of a harmonic chain drive. Components similar to those shown in FIG. 26 have the same reference numerals. Instead of the chain slide 100 shown in FIG. 26, FIG. 27 has discs 109, 110 with a circular shape for dragging or lifting the double chain 8' into the outer wheel toothing 2. The discs 109, 110 are mounted on ball bearings 111, 112 on shafts 113, 114 such that they are able to rotate. The shafts 113, 114 are fitted to a dragger holder 103 parallel to the axis of symmetry 10 and they are positioned opposite one another in relation to the axis of symmetry 10 and they are located essentially at the same distance from the axis of symmetry 10.

Figure 28:
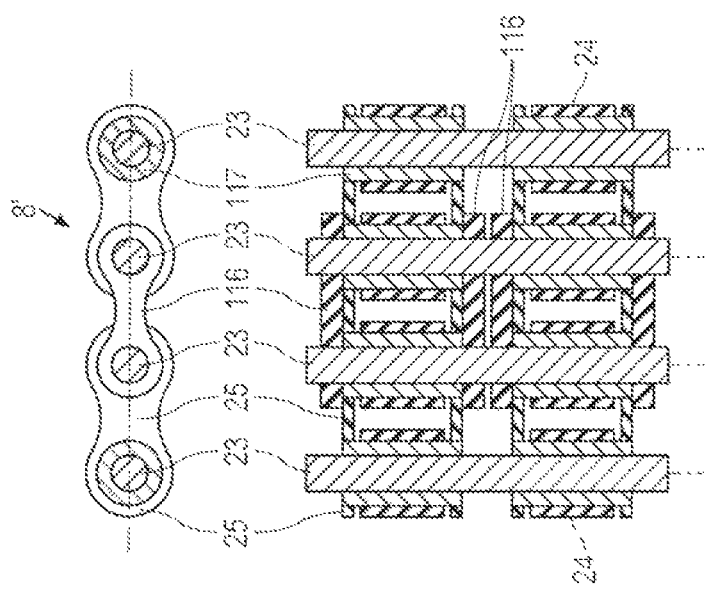
FIG. 28 shows a cut-out of a double roller chain.

FIG. 28 shows a cut-out from the double chain 8' as used in the embodiment as shown in FIG. 26. The double chain 8' is designed as a roller chain. In the double chain 8', a bush 117 is surrounded by a roller 24. The two bushes 117 are connected together by two plates 25. Four outer plates 116 join two chain links. The four outer plates 116 sit directly on the bolts 23.

Provided between a bush 117 and a roller 24 is a space into which lubricant can be introduced. The rollers 24 are therefore able to rotate freely on the bush 117. The use of a roller chain rather than a simple bush chain reduces the friction between dragger and chain as a result of the rotating rollers. Thus in the embodiment illustrated in FIG. 27 it is possible to dispense with the ball bearings 111, 112.

On the other hand, a chain without rollers, a bush chain, or bolt chain for example, can also be used if any slip between dragger and chain is compensated for by ball bearings such as in the embodiment of FIG. 27.

As can be seen best in the embodiments of FIGS. 24, 25, and 27, it is possible to design a region of the transmitter carrier as a toothed or non-toothed eccentric disc which is mounted eccentrically in relation to the axis of the output shaft to transmitting torque over the chain 8, 8', 8'' between the outer wheel toothing 2 and the inner wheel 6. In this arrangement, the region of the toothing of the eccentric disc about the point furthest away from the axis of the output shaft 11 and the eccentric mounting of the eccentric disc corresponds to a transmitter as shown in the embodiments of FIGS. 1-15 or FIG. 26. The inner wheel 6 is pressed against the chain 8, 8', 8'' by an eccentric movement of the toothed eccentric disc, and the chain 8, 8', 8'' is moved further by the eccentric movement of the eccentric disc. If the inner wheel 6 is moved in relation to the outer wheel, the chain 8, 8', 8'' would engage the transmitter and move the transmitter carrier 5 around its axis of rotation.

When using an eccentric disc as a transmitter, it is possible to use balls or rollers—rather than a traction means—as pressure means to roll around the rounded spaces between the teeth of the outer external toothing 2.

FIGS. 29 to 34 show a further embodiment of a motor-gear unit with a double chain. In this embodiment, the output shaft takes the form of an output ring 269. The eccentric discs 283, 291, eccentric cam bearings 284, 288 and dragger discs 285, 287 form a transmitter.

Figure 29:
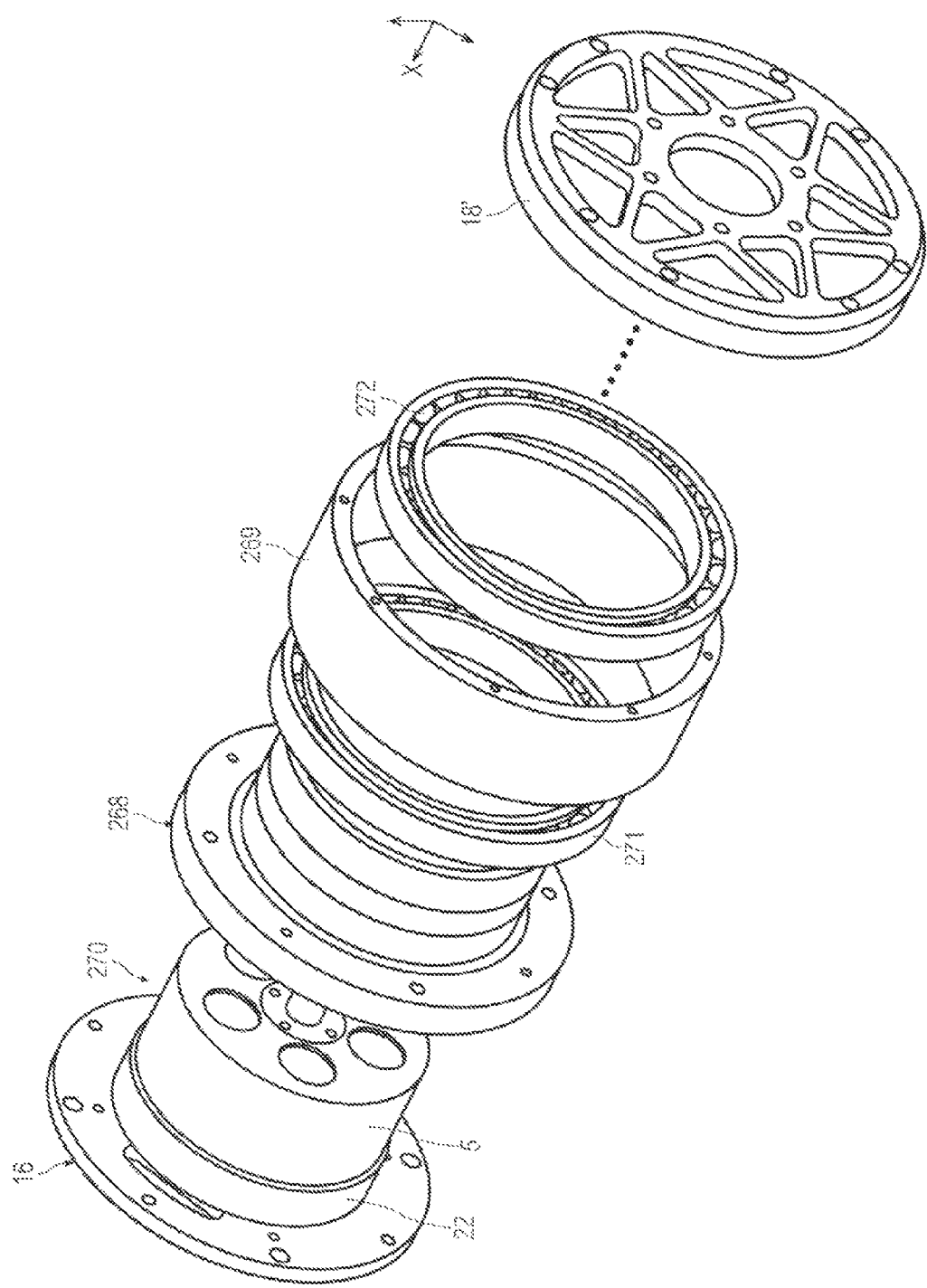
FIG. 29 shows a partial-exploded drawing of a further embodiment of a motor-gear unit.
Figure 30:
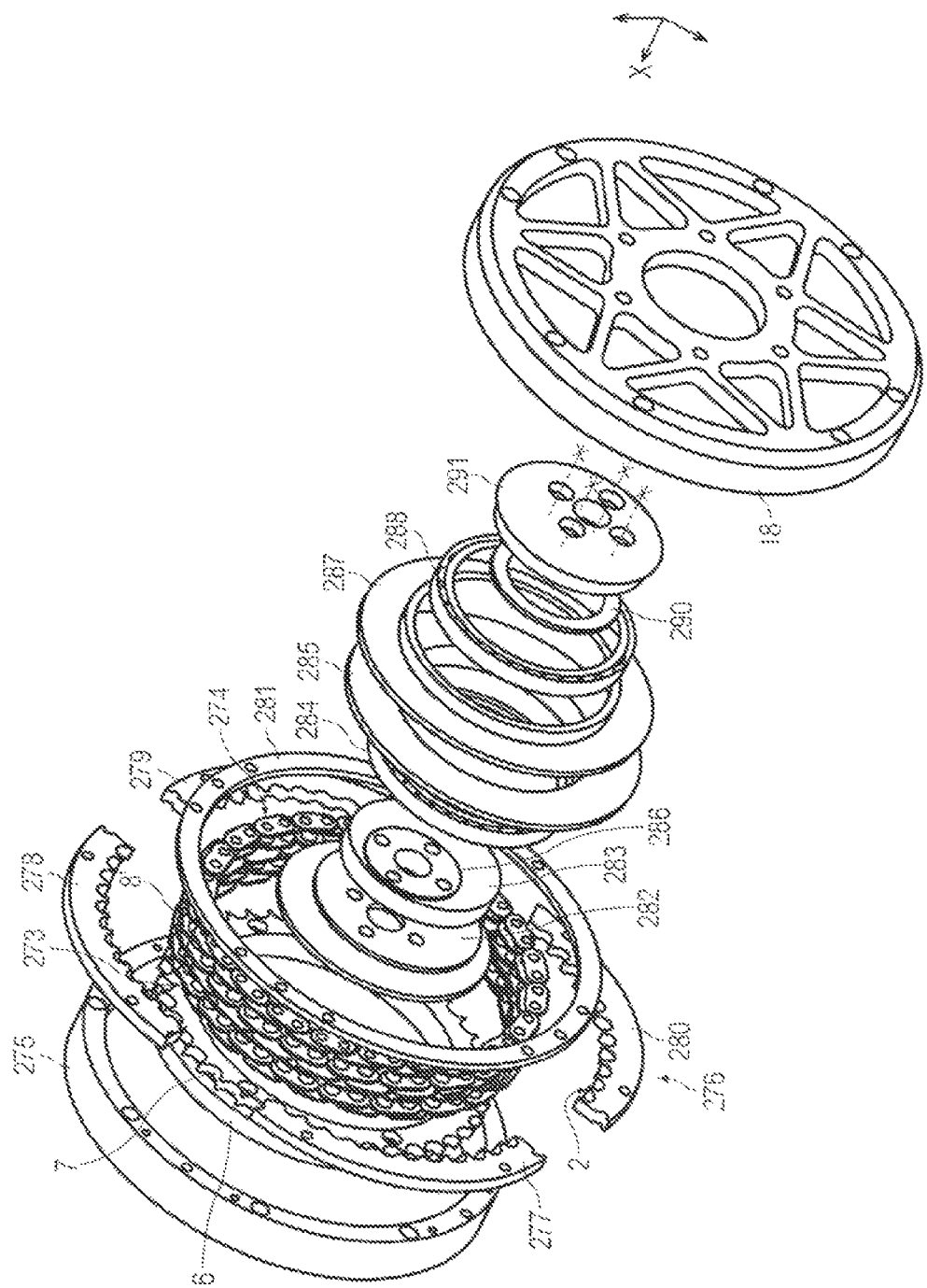
FIG. 30 shows an exploded drawing of the gear parts omitted in FIG. 29.

FIG. 29 shows a partially-exploded drawing of the further embodiment of a motor-gear unit. The gear parts of the motor-gear unit are omitted in FIG. 29; they are shown in FIG. 30 and are indicated by a number of dots in FIG. 29. FIG. 29 shows, from left to right, a front housing section 16, a motor block 270 with a partially-visible stator block 22 and a rotor 5, a support cylinder 268 on which an output ring 269 is concentrically mounted on a first output bearing 271 and a second output bearing 272, and a bearing holder 18'.

Positioned concentrically inside the motor block 270 is a shaft 11 (not illustrated in FIGS. 29 and 30). Similar to the embodiment shown in FIG. 18, this shaft 11 is fixed to a frame by a wishbone, which is also not shown here. The output ring 269 is connected to a rim flange in a manner similar to that shown in FIG. 18. Unlike in FIG. 18, however, the output ring 269 is mounted on a support cylinder 268 and not directly on the rotor 5, as shown in FIG. 18. This increases stability and reduces friction in comparison with the version shown in FIG. 18. In addition, in the version shown in FIG. 29, it is easier to use the same motor design as is used when output is via the inner wheel.

The support cylinder 268 is designed as a hollow cylinder with a flange, the flange of the support cylinder 268 being screwed to a flange on the motor block 270. The output bearings 271, 272 are designed as annular ball bearings, which are positioned concentrically inside the output ring 269, one on the motor side and one on the gear side.

Located between the gear-side output bearing 272 and the bearing holder 18' are gear parts, which are shown in FIG. 30.

FIG. 30 shows an exploded drawing of the gear parts omitted in FIG. 29. FIG. 30 shows, from left to right, an annular outer wheel holder 275, an annular inner wheel 6, a double chain 8', an outer wheel 276 consisting of the four identical ring sections 277, 278, 279, 280, an outer wheel holding ring 281, a disc-shaped eccentric cam holder 282, a motor-side eccentric cam 283, a motor-side eccentric cam bearing 284, a motor-side dragger ring 285, a gear-side dragger ring 287, a gear-side eccentric cam bearing 288, a spacer ring 290, a gear-side eccentric cam 291 and a rim holder 18', as shown in FIG. 29.

The outer wheel holder 275 is screwed firmly to a front face of the rotor 5, which is shown in FIG. 29. The four ring components 277, 278, 279, 280 of the outer wheel 276 are fixed between the outer wheel holding ring 281 and the outer wheel holder 275 via screw holes.

The outer wheel 276, the outer wheel holder ring 279 and the rim holder 18' are screwed via screw holes positioned one above the other to the outer wheel holder 275, which is in turn screwed firmly to the output ring 269.

The motor-side circular eccentric disc 283 is screwed fast eccentrically to the disc-shaped eccentric cam holder 282, which is in turn screwed fast concentrically to the front face of the rotor 5. Located on the eccentric cam holder 282 is a disc-shaped projection on which is placed the motor-side eccentric cam bearing 284. Positioned concentrically to the centre point of the motor-side eccentric disc 283 on the outside of the motor-side eccentric disc 283 is the motor-side eccentric cam bearing 284. Positioned concentrically to the centre point of the motor-side eccentric cam bearing 284 on the outside of the motor-side eccentric cam bearing 284 is the motor-side dragger ring 285.

The gear-side circular eccentric disc 291 is screwed fast to the motor-side circular eccentric disc 283. Located between the eccentric discs 283 and 291 is spacer ring 290, which is placed on a disc-shaped projection 286 of the motor-side eccentric cam 283. Positioned concentrically to the centre point of the gear-side eccentric disc 291 on the outside of the gear-side eccentric disc 291 is the gear-side eccentric cam bearing 288. Positioned concentrically to the centre point of the gear-side eccentric cam bearing 288 on the outside of the gear-side eccentric cam bearing 289 is the gear-side dragger ring 287.

In this arrangement, the motor-side eccentric disc 283 and the gear-side eccentric disc 291 are positioned in relation to one another such that the point on the eccentric disc 283 furthest away from the shaft 11 and the point on the eccentric disc 291 furthest away from the shaft 11 are opposite one another in relation to the shaft 11. In addition, the eccentric cam holder 282, the motor-side eccentric cam 283 and the gear-side eccentric cam 291 are screwed to a front face of the rotor 5 by four screws which pass through screw holes positioned one above the other. These screws are indicated schematically in FIG. 30. The two identical dragger rings 285 and 287 have an L-shaped profile as are shown particularly clearly in FIG. 32. It is therefore possible to make the two identical eccentric cam bearings 284 and 288 and the two eccentric discs 283 and 291 thicker than the width of the gear-side chain 274 of the double chain 8'.

The inner wheel 6 is positioned in the axial plane of a motor-side chain 273 of the double chain 8', whereas the outer wheel 76 and the motor- and gear-side dragger rings 85, 87 are positioned in the axial plane of a gear-side chain 274 of the double chain 8'. The radii of the dragger rings 285, 287 are dimensioned such that the gear-side chain 274 of the double chain 8' engages in the outer wheel toothing 2 in two dragger regions in which the dragger rings 285, 287 lie adjacent to the double chain 8', the two dragger regions being substantially opposite one another in relation to the axis of symmetry of the shaft 11. In addition, the length of the double chain 8' is dimensioned such that the motor-side chain 73 of the double chain 8' engages in the inner wheel 6 in two regions which are roughly opposite one another and which are approximately 45 degrees distant from the dragger regions.

In the embodiment of FIGS. 29-34, the transmitter carrier and the transmitter comprise the eccentric cam holder 282, the eccentric cam 283, the eccentric cam bearing 284, the dragger ring 285, the dragger ring 287, the gear-side eccentric cam bearing 288, the spacer ring 290, the gear-side eccentric cam 291 and the rim holder 18'. The transmitters comprise the dragger ring 258 and the dragger ring 287, respectively. Furthermore, an outer wheel 276 with an outer wheel toothing 2 is given by the four ring components 277, 278, 279, 280, 276.

Figure 31:
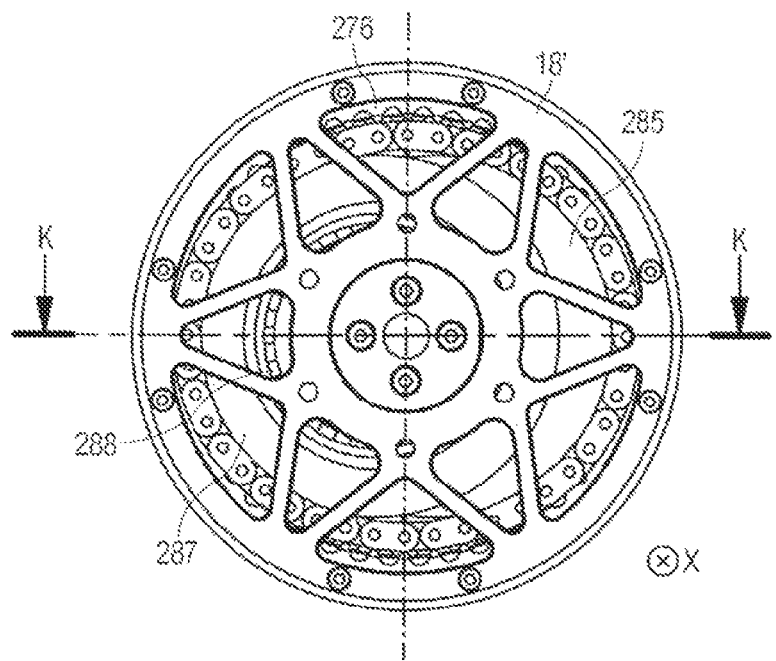
FIG. 31 shows a view of the motor-gear unit in FIG. 29.

FIG. 31 shows a view of the motor-gear unit of FIG. 29 as seen from the gear side. In this arrangement, the motor-side dragger ring 285, the gear-side dragger ring 287 and the gear-side eccentric cam bearing 288 are visible through the holes in the rim holder 18'.

Figure 32:
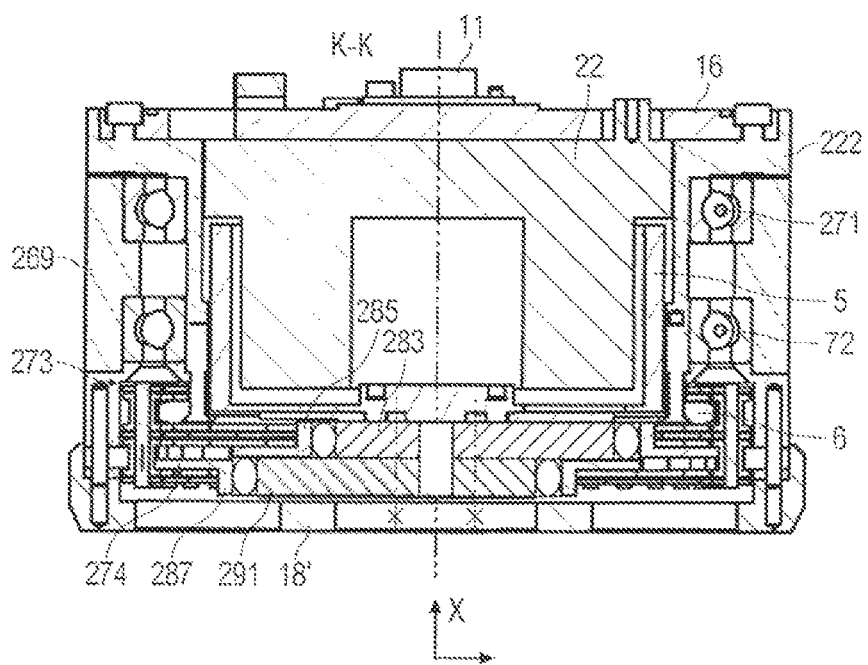
FIG. 32 shows a section through the motor-gear unit in FIG. 29.

FIG. 32 shows a section through the motor-gear unit of FIG. 29 along the line of intersection marked K-K in FIG. 30, which runs through the opposing dragger regions. The two chain rows 273, 274 of the double chain 8' are shown in cross-section, one continuous chain bolt being visible on the left and another on the right. The inside of the dragger rings 285, 287 in opposing dragger regions lie adjacent to the gear-side chain 274 of the double chain 8'. The motor-side chain 273 of the double chain 8' is lifted off the inner wheel in the plane of the line of intersection K-K.

Figure 33:
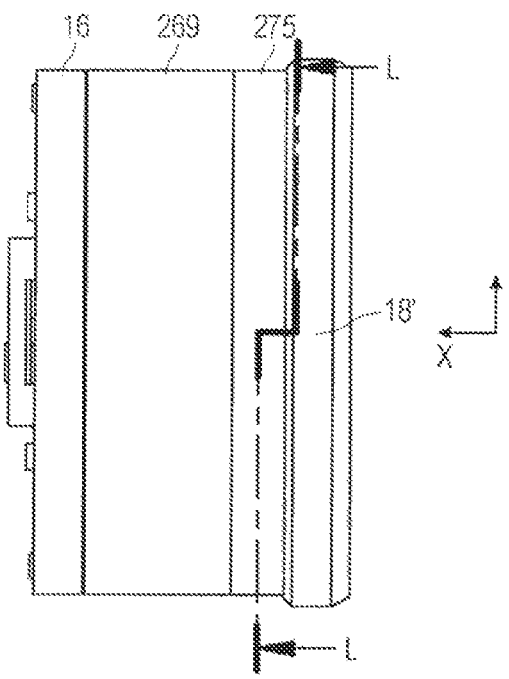
FIG. 33 shows a side view of the motor-gear unit in FIG. 29.

FIG. 33 shows a side view of the motor-gear unit of FIG. 29. In order to illustrate the internal structure of the motor-gear unit in FIG. 33 the line of intersection L-L is shown as angled.

Figure 34:
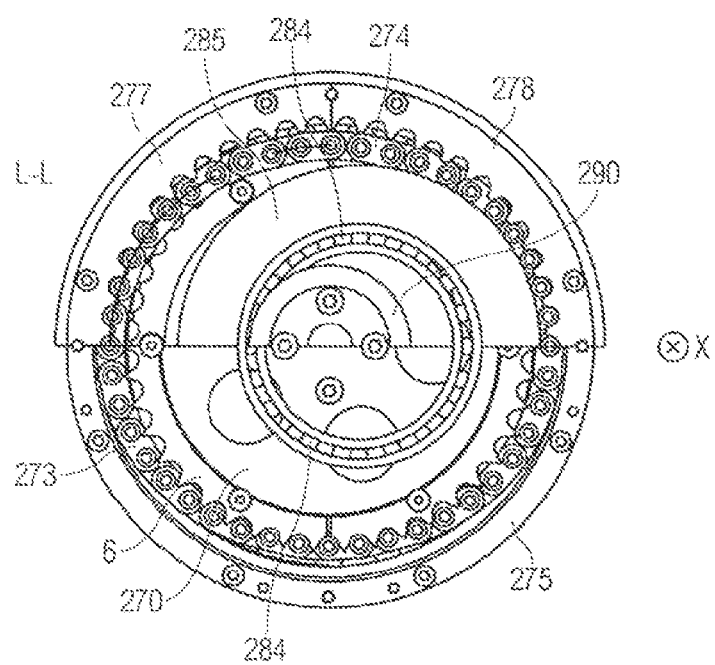
FIG. 34 shows a further section through the motor-gear unit in FIG. 29.

FIG. 34 shows a further section through the motor-gear unit of FIG. 29 along the line of intersection marked L-L in FIG. 33. The motor-side dragger ring 285, the motor-side eccentric cam bearing 284 and the spacer ring 290 placed in front of it are shown in the front part of the sectional plane, which runs through the gear-side chain 274 of the double chain 8'. FIG. 34 shows that the radius of the spacer ring 290 is dimensioned such that it is larger than the smallest distance between the motor-side eccentric cam bearing 284 and the axis of symmetry of the shaft 11.

A further part of the motor-side eccentric cam bearing 284 is shown in the rear section of the cutting plane L-L, which runs through the motor-side chain 273 of the double chain 8'. The inner wheel 6, adjacent to which lies the motor-side chain 273 in the lower region of FIG. 30, is also shown. Behind it can be seen part of the front face of the rotors 5 in which ventilation holes are provided.

When the motor is in operation, the rotor 5 is set in rotation by the action of a force on permanent magnets fitted to it. This causes the eccentric discs 283, 291, which are screwed to the rotor 5, to rotate about the shaft 11. The rotation of the eccentric discs 283, 291 about the shaft 11 is transmitted via the eccentric cam bearings 284, 288 to the dragger discs 285, 287, which are positioned concentrically in relation to the axis of symmetry of the eccentric cam 283, 291. The rotation of the dragger discs 285, 287 causes the dragger regions of the gear-side chain 274 to rotate about the axis of symmetry of the shaft 11 as well. In the process the dragger discs 285, 287 rotate on the eccentric cam bearings 284, 288 and thereby deflects the lateral force of the double chain onto the dragger discs 285, 287.

The double chain 8' has fewer chain links than the number of teeth on the outer wheel 276. In addition, the chains of the double chain 8' engage in the teeth in the inner wheel 6 and the outer wheel 276. The double chain 8' therefore has no slip in relation to them. As a result the outer wheel must progress nA−nK teeth, i.e. (nA−nK)/nA*360°, around the shaft 11 for each revolution of the dragger discs, nA being the number of teeth on the outer wheel and nK being the number of chain links in the double chain 8'. This gives a speed reduction ratio of nA/(nA−nK).

The outer wheel 276 transmits its rotational movement to the outer wheel holder 275, and to the output ring 269 to which it is connected by a screw connection. The output ring 269 rotates on the output bearings 271 and 271. The rotational movement of the output ring 269 is transmitted to a drive wheel of a vehicle. This can be achieved directly via a drive wheel rim flange fitted directly to the output ring 269 or indirectly via a chain drive in a manner similar to that shown in FIG. 18.

A motor-gear unit as shown in the embodiment illustrated in FIGS. 29 to 34 offers a number of advantages. Since the distance between the dragger rings 285, 287 and the shaft 11 remains constant and the dragger rings 285, 287 also largely fill the space inside the outer wheel, very little imbalance is generated.

Due to the special arrangement of the dragger rings 285, 287 it is possible to choose large dragger ring 285, 287 radii. This enables the dragger regions to be extended so that no sporadic loads occur. In addition, it is also possible to achieve a higher speed reduction since the change length of the double chain 8' can also be longer.

The mounting of the dragger rings 285, 287 on ball bearings 284, 288 which are positioned a preset distance from the shaft 11 ensures that no or little slip occurs between the double chain 8' and the outer wheel toothing 2. Friction losses are also reduced. In addition, it is not necessary to use a roller chain to compensate for slip. A simple bolt chain is sufficient. This also means that the design of the double chain 8' can be more stable.

Further advantages of the embodiment with the double chain as illustrated in FIGS. 29 to 34 have already been detailed in relation to the embodiments shown in FIGS. 23 to 27 with the double/triple chain. The same or similar advantages apply here.

In the embodiment illustrated in FIGS. 29 to 34, it is possible to use a double roller chain instead of, or in addition to, the eccentric cam bearing 284, 288.

In a version of the embodiment illustrated in FIGS. 29 to 34 the output can also be via the inner wheel 6. To this end, the dragger discs 285, 287 and the outer wheel 276 are provided in the motor-side chain plane 273 and the outer wheel 276 is fixed to a stationary part of the housing. The inner wheel 6, on the other hand, is provided in the gear-side chain plane 274 and the inner wheel 6 is fixed to an output ring 269.

In this arrangement, the radius of the output ring 269 is usefully larger than the radius of the outer wheel 276. In this context, the term 'fix' is taken to include indirect fixing using intermediate parts.

In the case of both output via the outer wheel 276 and output via the inner wheel 6 it is also possible to transmit the rotational movement inwards to an output shaft 11, instead of outwards to an output ring 269, in which case both the output ring 269 and the output bearings 271, 272 are omitted. The inner wheel 6 and the outer wheel 276 can then be fixed to the output shaft 11, and the output shaft 11 can be supported on ball bearings in a manner similar to that illustrated in FIG. 2 for the inner wheel 6.

FIG. 35 shows a version of the previous embodiments having a pushing means or pressure means. A pressure means 131 is provided between a rotating inner wheel 6 and a stationary outer wheel 130 in place of a traction means. The pressure means 131 may for example take the form of a flexible metal ring or metal cylinder. The pressure means 131, the inner wheel 6 and the outer wheel 130 are shaped such that there is little or no slip between the pressure means 131 and the inner wheel 6 and between the pressure means 131 and the outer wheel 130. This shaping may take the form of teeth, for example.

Two pressure wheels 132, 133 are positioned on a rotating carrier ring 134 in such a manner that they are positioned before the pressure means 13 in the direction of movement of the carrier ring and make contact with the pressure means 131. In this arrangement, the carrier ring and the pressure wheels 132, 133 correspond to a transmitter located between the inner wheel 6 and the outer wheel 130. To reinforce the pressure means 131 it is also possible to optionally provide stabilising wheels 135, 136, which work against the pressure wheels 132, 133 adjacent to the pressure means. As a further option it is also possible to provide as a component of the transmitter two further pressure wheels (not illustrated) in order to push the pressure means against the inner wheel from the outside. The pressure wheels or stabilising wheels are positioned such that they are able to rotate about their axis and the pressure means 131 are able to revolve. The revolving pressure means 131 transmits its revolving movement to the inner wheel 6.

In the version illustrated in FIG. 35 it is also possible for the inner wheel to be stationary and output to be via the outer wheel 130. In this case, input and output both have the same direction of rotation.

FIGS. 36 to 46 show further embodiments wherein parts, which are already mentioned above, are not in explained in further detail.

Figure 36:
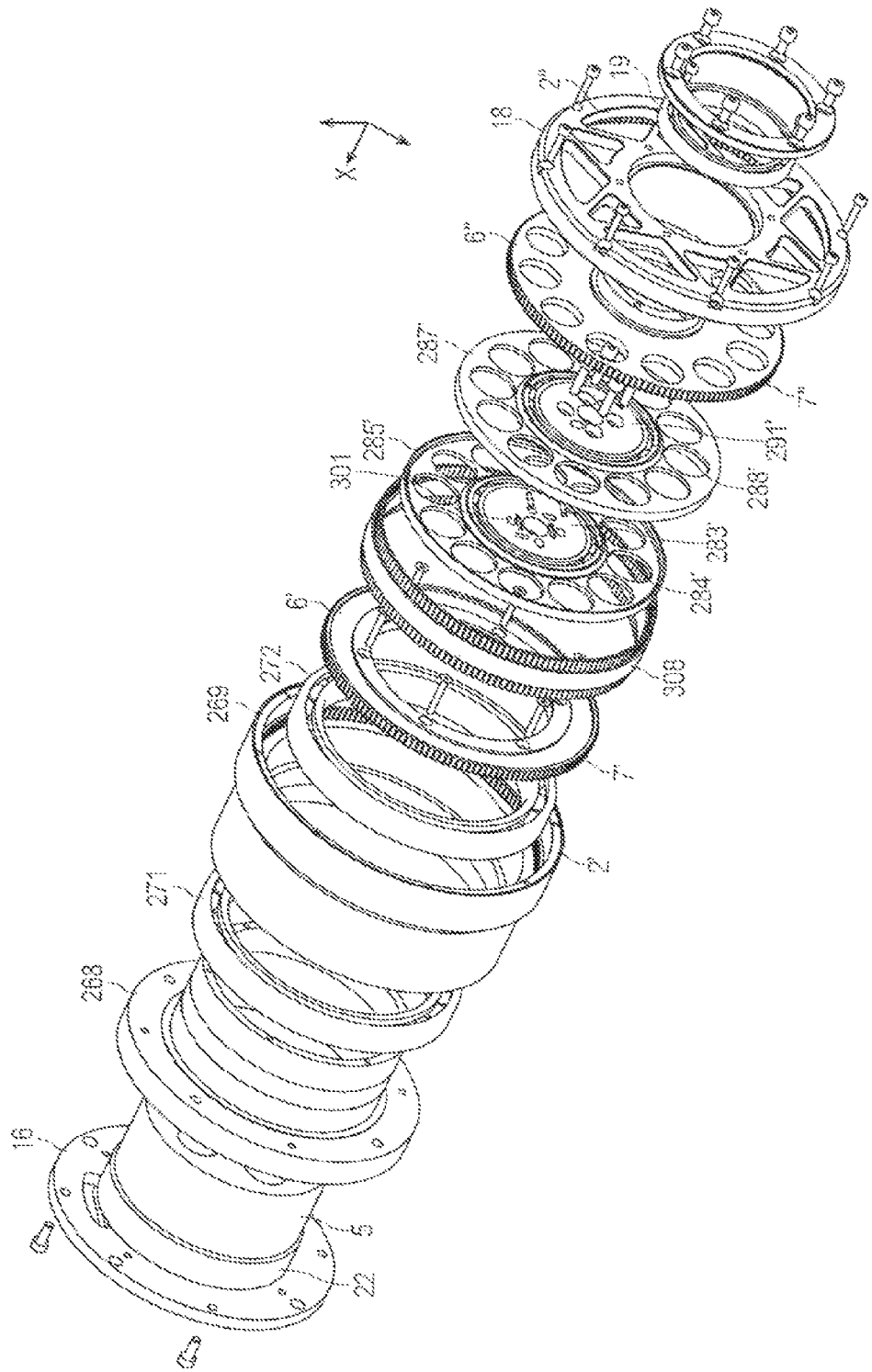
FIG. 36 shows an exploded view of an embodiment of a harmonic chain drive with a two-pin-row pin ring.

FIG. 36 shows an exploded view of an embodiment with a two-pin-row pin ring 308. To the right of the second output bearing 272 FIG. 35 shows, from left to right, a first inner ring 6', a two-pin-row pin ring 308, a motor side dragger disk 285' with motor side eccentric cam 283' and motor-side eccentric cam bearing 284', a gear side dragger disk 287' with a gear-side eccentric cam 291' and a gear-side eccentric cam bearing 288', a second inner ring 6'' as well as parts shown in previous embodiments. The dragger disks 285' and 287' are shaped as circular disks.

This is a three row gear design wherein the two pairs 6', 2' respectively 6'', 2'' of an inner wheel and an outer wheel are located in different axial planes, wherein the transmitter carrier with transmitters 285', 287', 283', 284', 288', 291' is located in a third axial plane between the two pairs 6', 2' respectively 6'', 2'' of an inner wheel and an outer wheel.

The first inner ring 6' and the second inner ring 6'' are connected to the stator 22. An outer wheel toothing 2', 2'' is designed as a two row inner toothing of an output ring 269.

Figure 46:
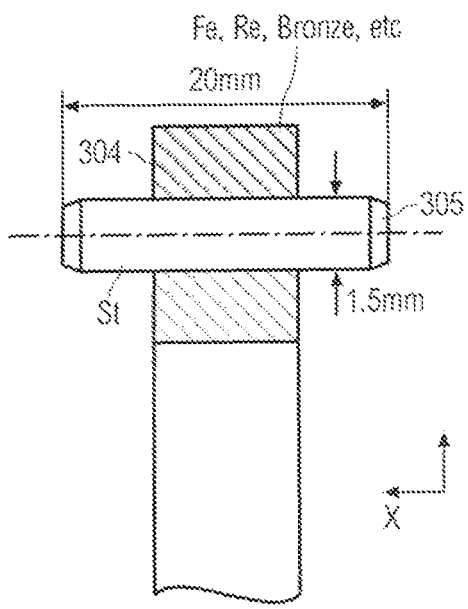
FIG. 46 shows a cross section through an element of the pin ring.

Here, the two pin rows of the pin ring 308 as a traction means extend between the inner peripheries 2', 2'' of the outer wheels and the outer peripheries 7', 7'' of the inner wheels 6', 6''. The protruding parts of the pins 305 which can be best seen in FIG. 46 provide the function of the bolts of a traction chain that interact with the teeth of the outer wheels and inner wheels 6', 6''. In the case of a driven transmitter 285', 287', 283', 284', 288', 291', the pin ring 308 is lifted off the outer peripheries 7', 7'' of the inner wheels 6', 6'' and pushed against the inner peripheries 2', 2'' of the outer wheels, thereby creating a relative movement between the inner wheels and the outer wheels. In cases, where the inner wheels 6', 6'' are driven, a relative movement between the outer wheels and the pin ring 308—and thereby the transmitter 285', 287', 283', 284', 288', 291'—is provided. In still other cases, where the outer wheel is driven, a relative movement between the inner wheel 6', 6'' and the pin ring 308—and thereby the transmitter 285', 287', 283', 284', 288', 291'—is provided. The transmitter 285', 287', 283', 284', 288', 291' is then driven by the pin ring 308.

The output ring 269 is rigidly connected to an output drive such as a rim flange.

On the motor-side eccentric cam 283' four adjustment slits 301 are provided, which are oriented at a right angle to a radius of the motor-side eccentric cam 283'. The four adjustment slits 301 comprise two pairs of adjustments slits. The adjustment slits 301 of each pair have the same orientation and the adjustments slits 301 of the pairs are oriented perpendicular to each other. Guiding cylinders are provided in the adjustment slits, which can be seen in FIG. 47. Holes in the gear side eccentric cam 291' are shaped as oblong holes.

Via the adjustment slits 301, the eccentricity of the dragger 285' and 287' can be adjusted by shifting the eccentric cams 283', 291' and thereby the dragger disks 285' and 287' along the adjustments slits 301. Thereby, the two-pin-row pin ring 308 is tightened. When the centre of the gear side eccentric cam 291' is moved away from the symmetry axis 10 along two of the guiding cylinders, the pin ring 308 is tightened. The oblong holes of the gear-side eccentric cam 291' allow movement of the gear-side eccentric cam 291' relative to screws, which pass through the oblong holes.

When the gear side eccentric cam is tightened to the motor side eccentric cam via the screws, which pass through the oblong holes of the gear side eccentric cam 291' and through corresponding holes of the motor side eccentric cam 283', the gear side eccentric cam 291' is pressed against the guiding cylinders and against the motor side eccentric cam 291', and the position of the gear side eccentric cam 291' is fixed.

Figure 37:
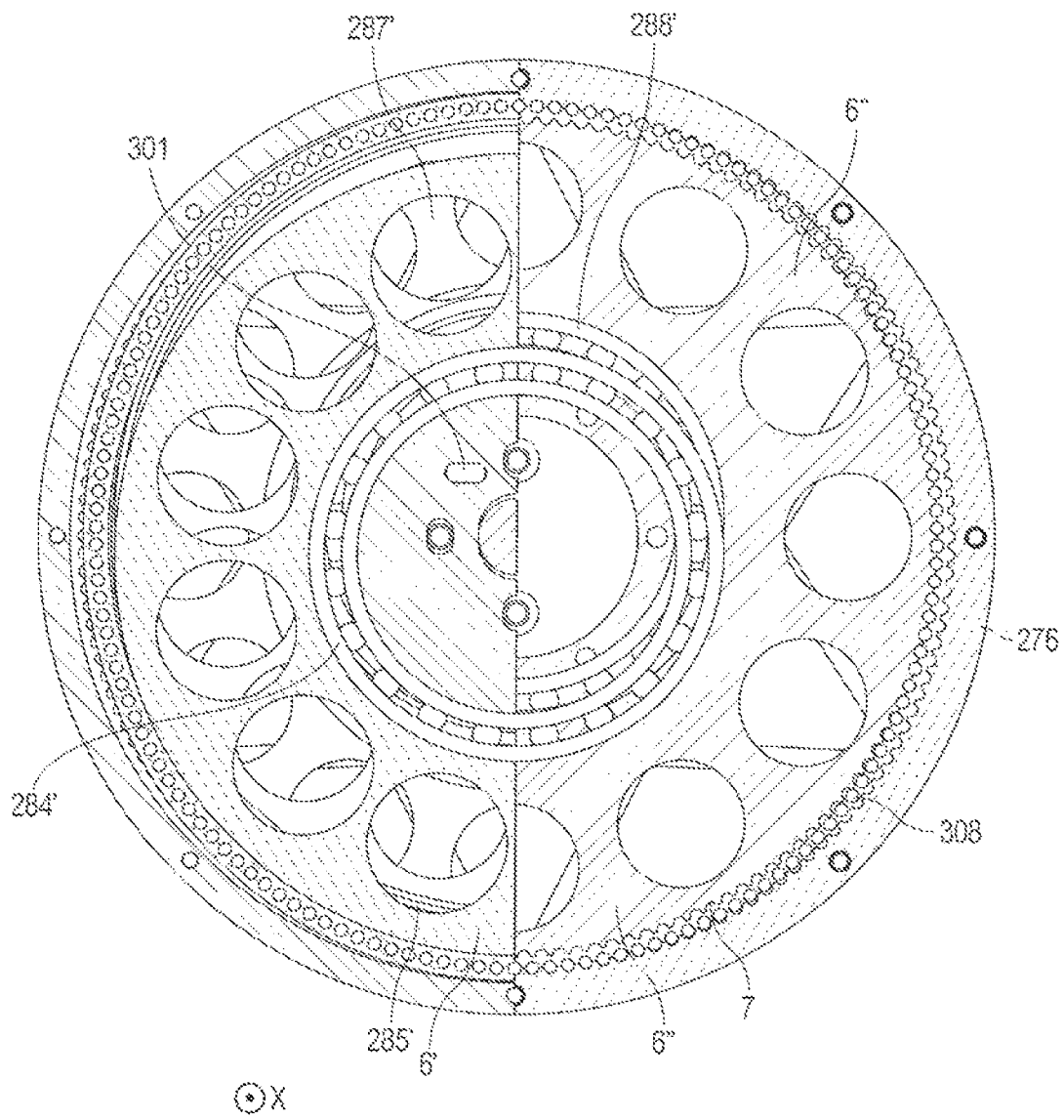
FIG. 37 shows a cross-section through the motor-gear unit of FIG. 36.

FIG. 37 shows a cross section through the motor-gear unit of FIG. 36.

Figure 38:
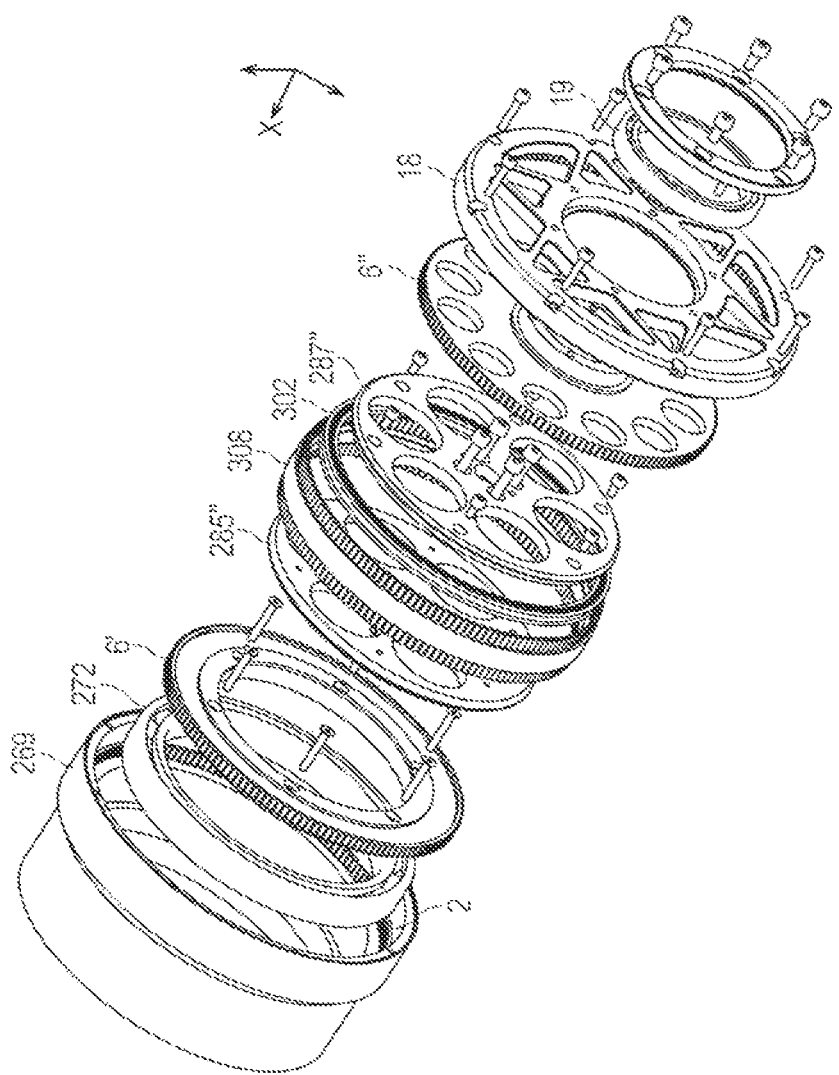
FIG. 38 shows an exploded view of an embodiment of a harmonic chain drive with a two-pin-row pin ring and with a wire race bearing.
Figure 39:
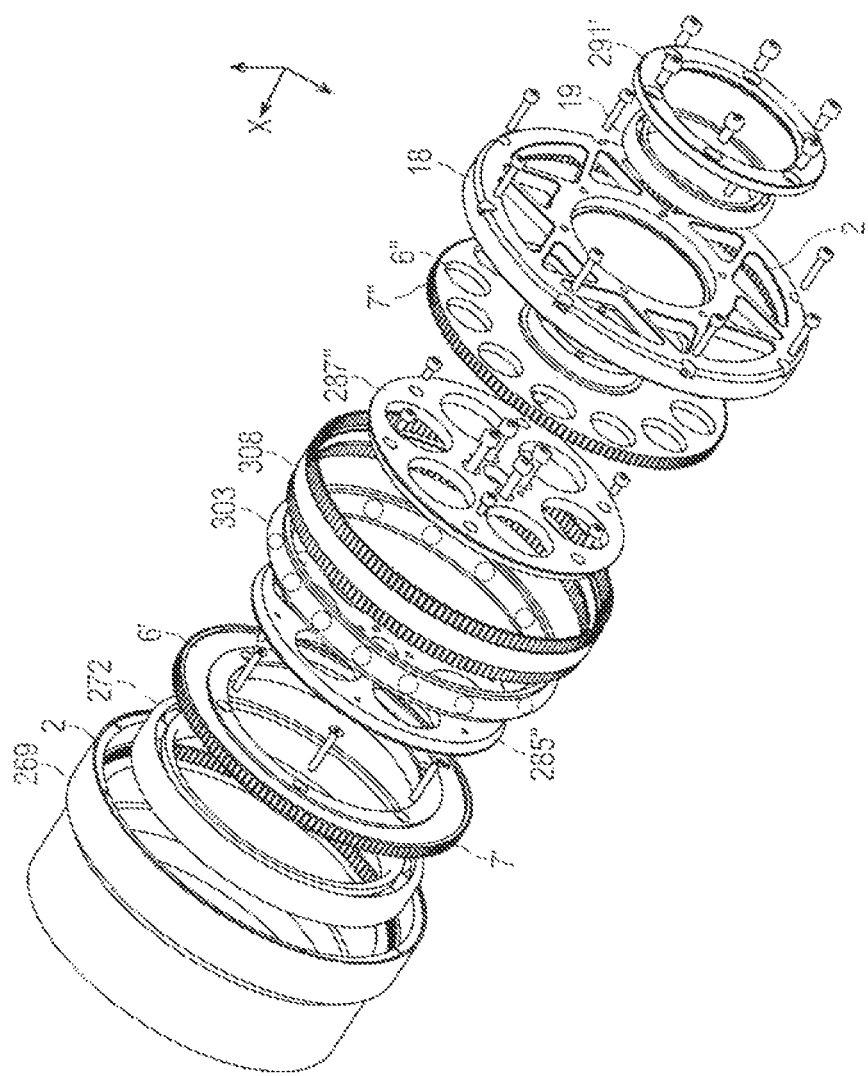
FIG. 39 shows an exploded view of an embodiment of a harmonic chain drive with a two-pin-row pin ring and with and two oval dragger disks.

FIGS. 38 and 39 show an exploded view of two embodiments of a harmonic chain drive with a two-sided pin ring 308 and a wire race bearing 302. In contrast to the embodiment of FIG. 36, the dragger disks 285" and 287" are not designed as circular dragger disks but as oval shaped dragger disks. Preferentially, the centre of the ovals lies on the symmetry axis 11 such that the oval shaped disks lie on top of each other. The eccentric cams 283', 291' shown in FIG. 36 are not used in the embodiment of FIG. 38. Also, the eccentric cam bearings are not used here. Instead, the friction is taken up by the wire race bearings 302, 303 also known as "Franke bearing". The wire race bearings 302, 303 are arranged between the dragger disks 285", 287" and the output ring 269. Through the revolving movement of the dragger disks 285", 287" the wire race bearings 302, 303 are deformed and are pressed against the outer wheel toothing 2. During operation, the wire race bearings 302, 303 take up the friction between the dragger disks 285", 287" and the inner surface of the two-pin-row pin ring 308, which can be best seen in FIG. 46.

FIGS. 38 and 39 differ in the type of wire race bearings 302, 303. In FIG. 38 a complete wire race bearing 302 is used, comprising four wire rings and a flexible ball cage. The four wire rings are arranged such that they enclose the balls of the ball bearing. The balls are held in the flexible ball cage. The four wire rings can be seen in the cross sectional view of FIG. 43. In alternative embodiments, the number of the wire rings may also be two, three, or more than four. In FIG. 39, an inner part 303 of a wire race bearing is used, comprising a flexible ball cage but no wire rings.

Figure 40:
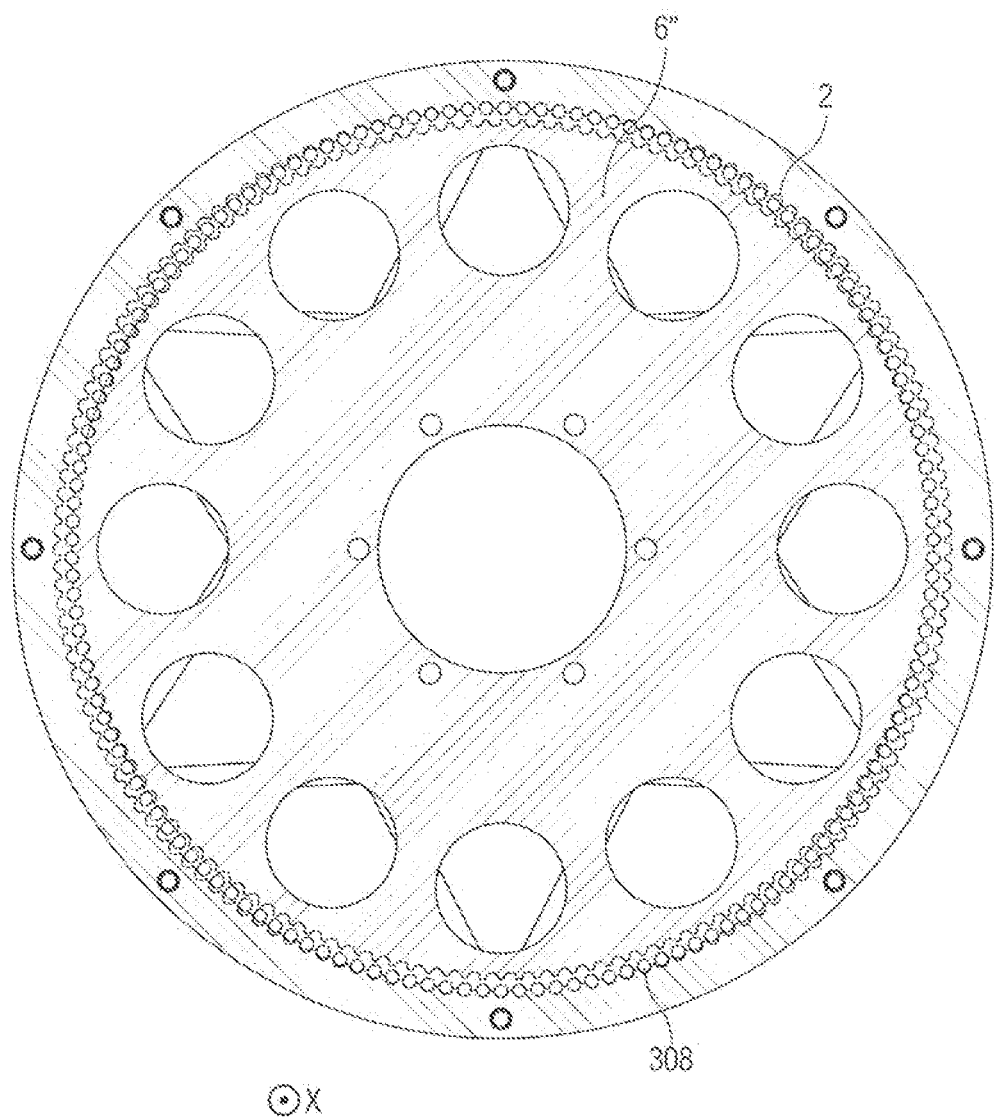
FIG. 40 shows a cross-section through the motor-gear unit as shown in FIG. 38 or FIG. 39.

FIG. 40 shows a cross sectional view through a motor gear unit according to FIG. 38 or FIG. 39. A slit is provided between the inner wheel toothing and the outer wheel toothing such that the slit is just large enough to take up the pins 305. The smaller the slit, the larger the transmission ratio for a given tooth size of the toothings. As a result, particularly large transmission ratios are possible for the embodiments with a pin ring 308.

Figure 41:
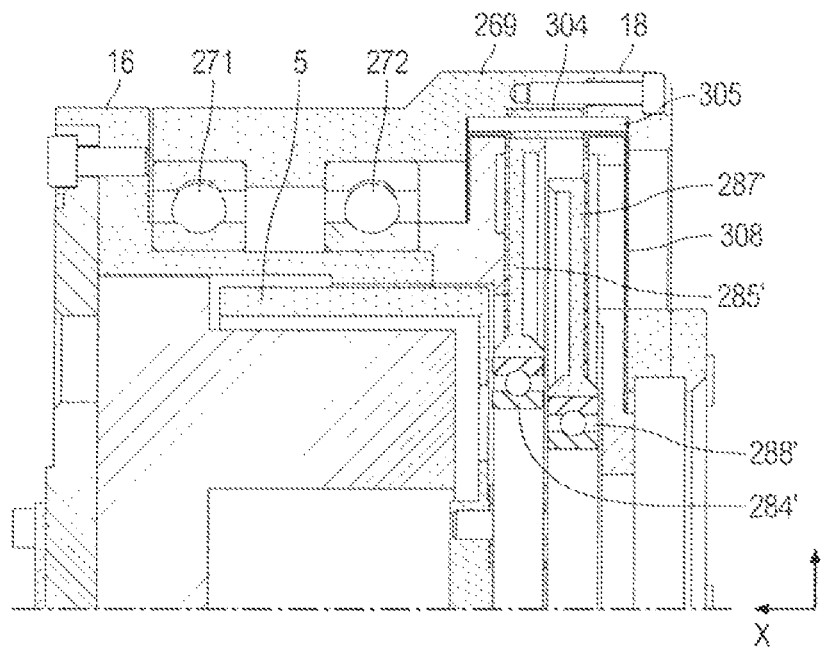
FIG. 41 shows a cross-section through the motor-gear unit as shown in FIG. 36.

FIG. 41 shows a cross section through the motor gear unit according to FIG. 36. The cross section is taken in a plane that passes through the opposing dragger regions, from which one dragger region is shown. It can be seen that the motor side dragger ring 285' pushes against a flexible ring 304 of the pin ring 308 such that the pin 305 pushes against an outer wheel. The outer wheel is designed as two outer wheels, which are realized as inner toothings of the bearing support 18 and the output ring 269, which is rigidly connected with screws. The toothings are not shown here, but in FIG. 36. The eccentric cams on which the dragger rings 285', 287' are supported via bearings are screwed to the rotor 5 via four screws from which on screw end is visible in FIG. 42.

FIG. 46 shows a detailed view of the two-pin-row pin ring 308. The two pin rows of the two-pin-row pin ring 308 are formed by steel made pins 305 of width 20 mm and thickness 1.5 mm, which are protruding from both sides of the central elastic ring 304. The elastic ring 304 is preferentially made from metal, such as iron, aluminium, bronze or other alloys. The elastic ring 304 comprises elongated gaps in which the pins 305 may be fitted.

Figure 42:
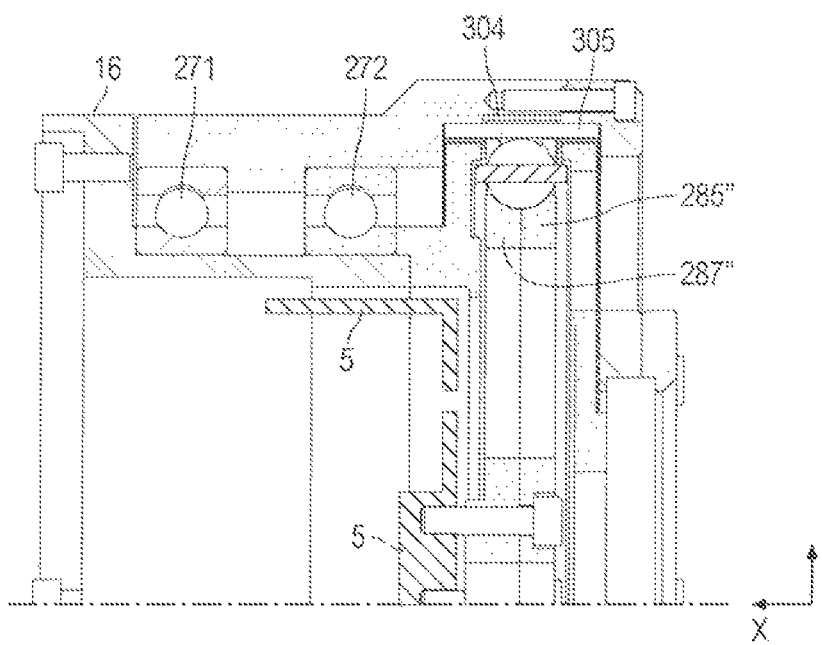
FIG. 42 shows a cross-section through the motor-gear unit as shown in FIG. 37.

FIG. 42 shows a cross sectional view through the motor gear unit according to FIG. 37. The cross section is similar to the cross section of FIG. 41. But in contrast to FIG. 41, the flexible ring is pushed outside not by two slightly axially asymmetric dragger discs but by the balls of the bearing that are located in the middle plane of the flexible ring element 304 of the traction means or pin ring such that the balls follow a circular path on the inner surface of the pin ring 308. It can further be seen that balls of an inner part of a wire race bearing are supported in a round groove of the oval dragger disks 285", 287", so as to guide the balls from the inner side. A flexible cage of the inner part of the wire race bearing is shown in cross section. On the inside of the flexible ring 304, a round groove is provided as well, so as to guide the balls from the outer side. Through the use of the circular grooves it is no longer necessary to provide ring wires to guide the balls but a flexible cage with balls is sufficient, such as provided by an inner part of a wire race bearing.

Figure 43:
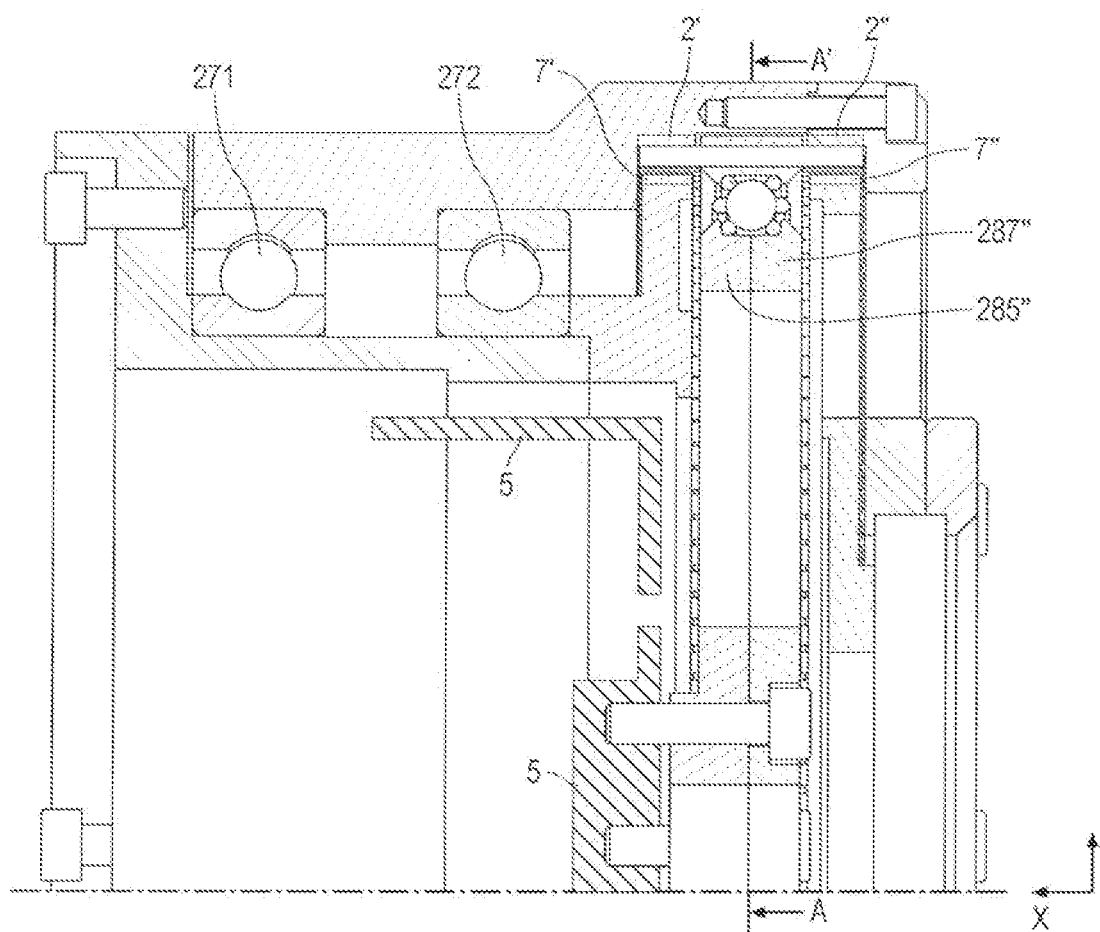
FIG. 43 shows a cross-section through the motor-gear unit as shown in FIG. 38.

FIG. 43 shows a cross sectional view through the motor gear unit according to FIG. 38. In contrast to the previous FIG. 42, a full wire race bearing is provided. The four wires can be seen in the outer corners of a square-shaped gap, which is bound by a rectangular opening of the dragger disks 285", 287" and a rectangular opening on a part on the inside of the flexible ring 304 of the pin ring 308. The four wires are supported by the rectangular opening. A ball cage is shown in cross-section on each side of the ball.

Figure 44:
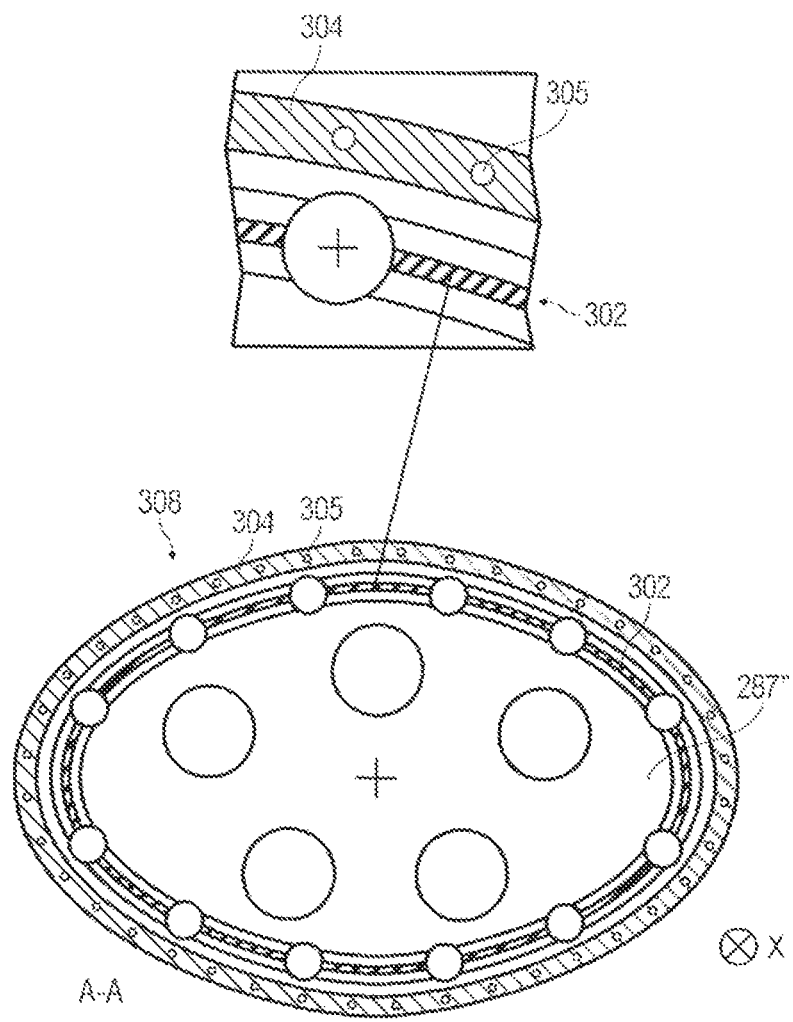
FIG. 44 shows a partial cross-section through the motor-gear unit as shown in FIG. 37.

FIG. 44 shows a partial cross section through the motor gear unit according to FIG. 37. From the inside to the outside, an oval dragger disk 287', the wire race bearing 302 and the two-pin-row pin ring 308 are shown. A ball cage and wire rings of the race ball bearing 302 are shown from the side. In an enlarged section, the ball cage is shown from the side.

Figure 45:
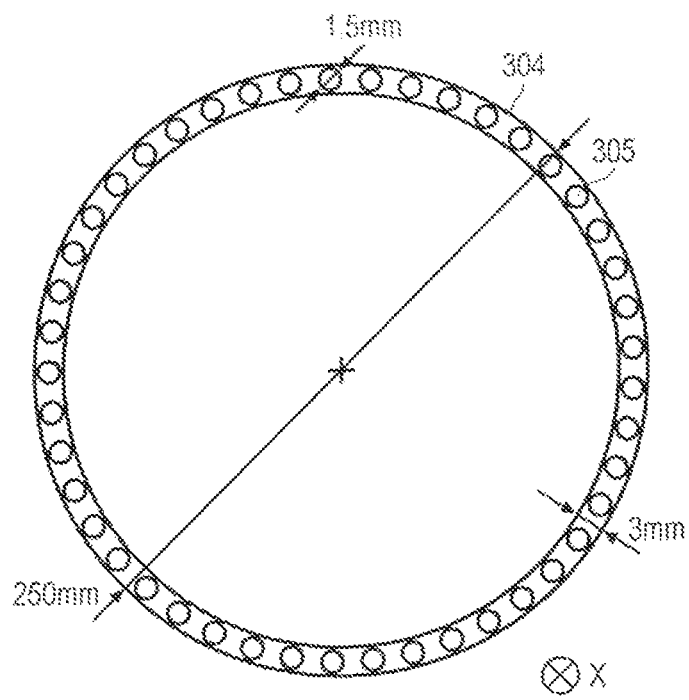
FIG. 45 shows a side view of a pin ring.

FIGS. 45 and 46 show detailed views of the two-pin-row pin ring 302. In this view, an inner and an outer border of an elastic ring 304 are shown, in which pins 305 are provided with a diameter of 1.5 mm. The distance from the inner to the outer ring is 3 mm and the radius of the un-deformed race ball bearing is 205 mm. An advantage of the race ball bearing 302 in the abovementioned embodiments is its deformability by the pressure of the dragger disks 285', 285", 287', 287".

In the embodiments of FIG. 36-46, which comprise a pin ring 302, a transmitter carrier with transmitters, which is arranged inside the pin ring 302, revolves around the axis 10. The transmitters push against the flexible inner ring of the pin ring 302 and, in two opposing dragger regions, lift the pins of the pin ring from the inner wheel/wheels. In the dragger regions, the pins 305 of the pin row are pushed between the teeth of the outer wheel toothing/toothings. The pins 305 in turn exert a lateral force against the outer wheel toothing/toothings such that the outer wheel turns.

In the embodiments, the transmitters are realized as circular or oval shaped dragger disks or dragger rings and the transmitter carriers are realized as a support on which the transmitter are fixed. A bearing which takes up the friction can be seen as part of the transmitter for those embodiments, which provide a flexible bearing between the dragger disks and the outer wheel toothing and as part of the transmitter carrier in the embodiments in which the dragger disks are supported on the bearing from the inside.

Figure 47:
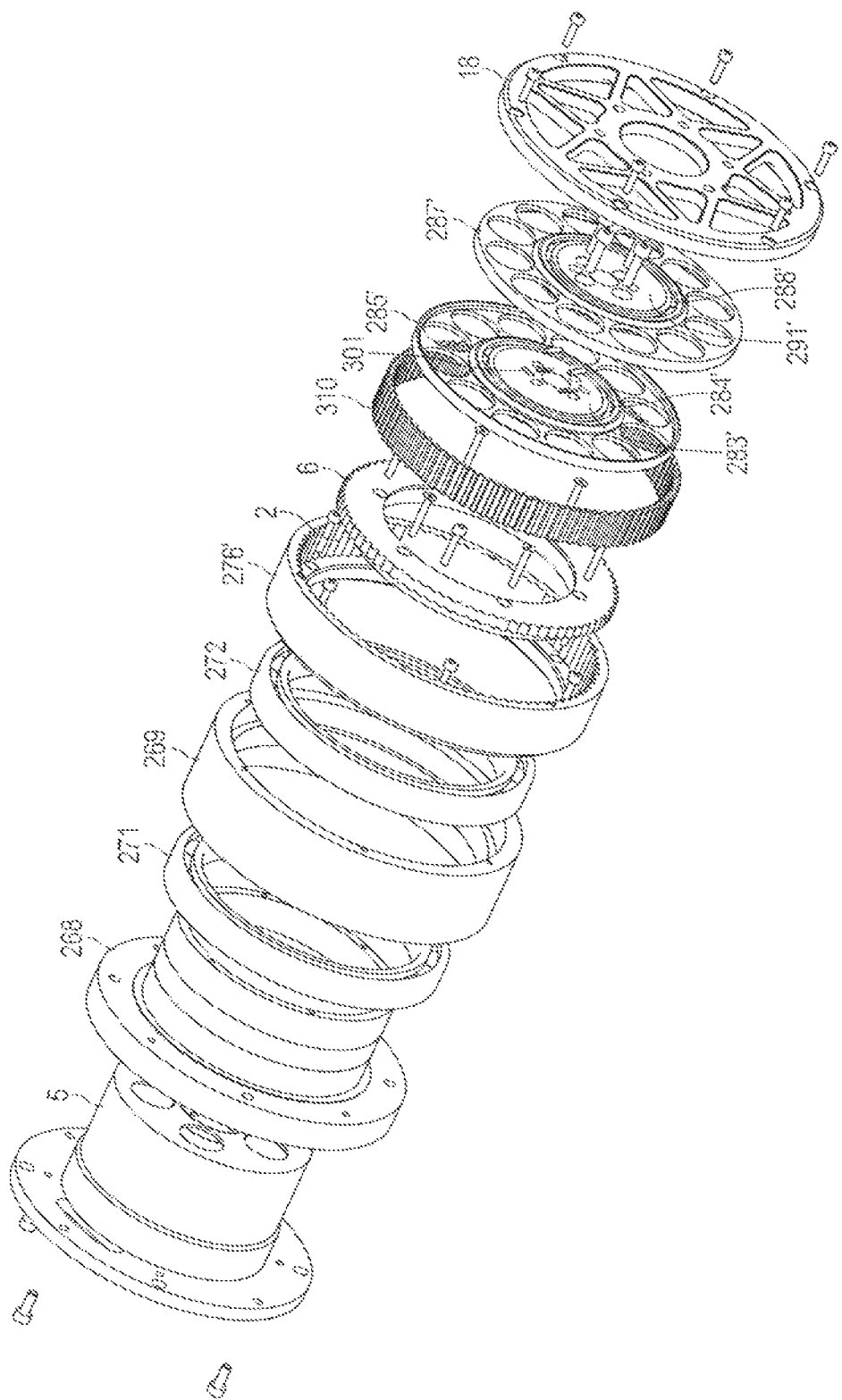
FIG. 47 shows an exploded view of an embodiment of a harmonic chain drive with a tooth belt.

FIG. 47 shows a further embodiment in which a tooth belt 310 is used as pressure means.

To the right of the second output bearing 272 FIG. 35 shows, from left to right, an outer wheel 276', a first inner ring 6', a tooth belt 310, a motor side dragger disk 285' with motor side eccentric cam 283' and motor-side eccentric cam bearing 284', a gear side dragger disk 287' with a gear-side eccentric cam 291' and a gear-side eccentric cam bearing 288', as well as parts shown in previous embodiments. The dragger disks 285' and 287' are shaped as circular disks.

This design corresponds to a two row gear design wherein the inner wheel 6 and the dragger disks 285', 287' are located in two different axial planes. The outer wheel 276' extends over the whole width of the tooth belt 310, in contrast to the previous embodiments comprising a two-pin-row pin ring. The inner ring 6 is connected to the stator 22. An outer wheel toothing 2 is designed as inner toothing of an outer ring 276'.

The tooth belt 310 as a traction means extends between the inner periphery 2 of the outer wheel 276' and the outer periphery of the inner wheel 6. The teeth of the tooth belt 310, which is designed as a tooth belt with inner and outer toothing, have the function of the bolts of a traction chain that interact with the teeth of the outer wheel 276' and the inner wheels 6. In the case of a driven transmitter 285', 287', 283', 284', 288', 291', the tooth belt 310 is lifted off the outer periphery 7 of the inner wheels 6 and pushed against the inner peripheries 2 of the outer wheel 276', thereby creating a relative movement between the inner wheels and the outer wheels. In cases where the inner wheel 6 is driven, a relative movement between the outer wheel 276' and the tooth belt—and thereby the transmitter 285', 287', 283', 284', 288', 291'—is provided. In still other cases, where the outer wheel is driven, a relative movement between the inner wheel 6 and the tooth belt—and thereby the transmitter 285', 287', 283', 284', 288', 291'—is provided. The transmitter 285', 287', 283', 284', 288', 291' is then driven by the tooth belt.

The output ring 269 is rigidly connected to an output drive such as a rim flange.

On the motor-side eccentric cam 283' four adjustment slits 301 are provided, which are oriented at a right angle to a radius of the motor-side eccentric cam 283'. Guiding cylinders are provided in the adjustment slits 301. Holes that are provided in the gear side eccentric cam 291' are shaped as oblong holes. The mechanism of adjustment and tightening of the tooth rim is analogous to the previous description with reference to FIG. 36.

Figure 48:
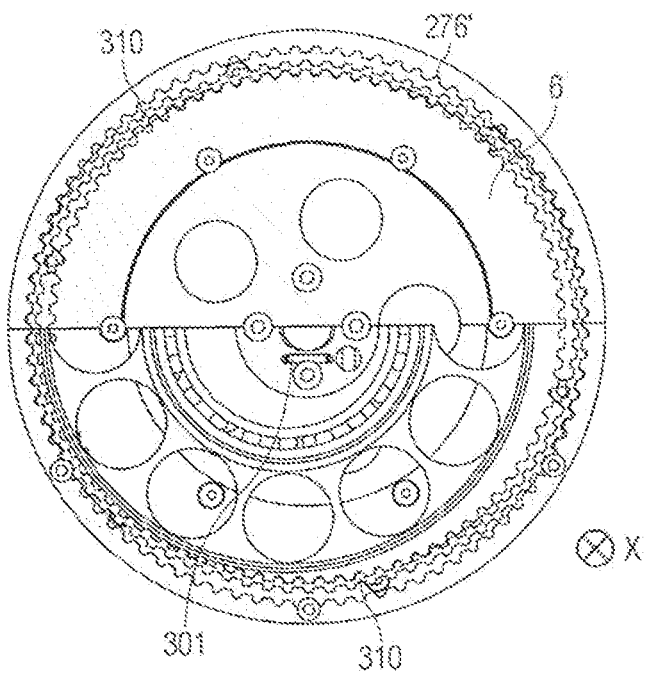
FIG. 48 shows a first cross-section through the harmonic chain drive of FIG. 47.

FIG. 48 shows a cross section through the harmonic chain gear of FIG. 47 along an angled plane, such that half of the plane cuts in front of the inner wheel 6 and the other half cuts in front of the motor-side dragger disk 285'. The position of the dragger disks 285' and 287' is such that the two opposing dragger regions lie at the border of the two halves of the cross section. It can be seen that the adjustment slit is in the direction of a line, which connects the dragging regions.

Figure 49:
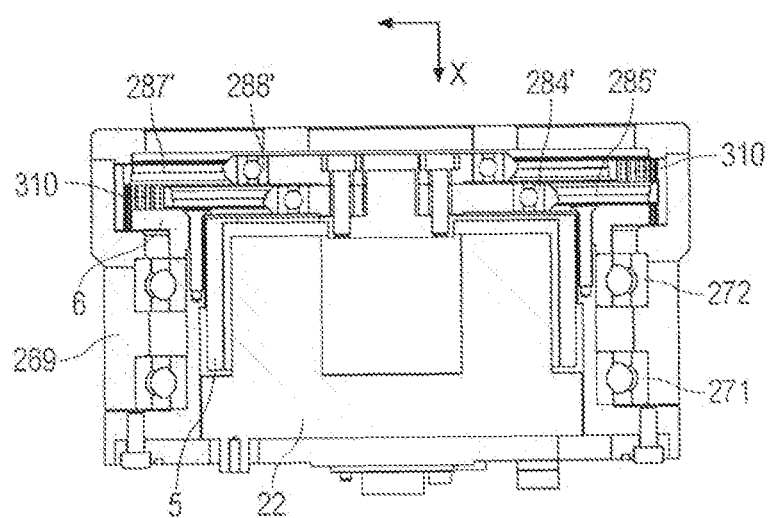
FIG. 49 shows a second cross-section through the harmonic chain drive of FIG. 47.

FIG. 49 shows a cross section through the harmonic chain gear of FIG. 47, wherein the cutting plane runs through the symmetry axis 10 and the opposing dragger regions. Part of the tooth belt 310 is shown in the dragger regions. Two of the four screws with which the eccentric cams are fixed to the rotor 5 are seen in cross section, as are two of the six screws with which the inner wheel 6 is fixed to the stator 22.

For the embodiments, which are shown or described in this application, it is in principle possible to use all types of electric motors together with the harmonic chain drive gear. Brushless DC motors in which the rotor is provided with permanent magnets can be simple and at the same time advantageous in this arrangement. To this end, the stator has coil windings, as shown in the embodiments, to which a suitably pulsed direct voltage is applied, and generates an alternating magnetic field, which cooperates with the permanent magnets, which in turn causes the rotor to rotate. In this arrangement, it is possible to provide sensors in the region of the rotor in the form of auxiliary coils or Hall sensors to determine the momentary position of the rotor taken into account in controlling the current through the coil windings. Sensor-less motor designs are also conceivable in which the current rotor position is determined by an induction voltage in a coil or coils of the stator.

In further versions, it is possible to use synchronous motors or asynchronous motors together with the harmonic chain drive gear as disclosed in the application. In such cases, they are often referred to as AC motors. Asynchronous motors have the advantage that they can be operated without brushes because a rotating electromagnetic field entrains the rotor which is designed as a short-circuit winding in which the alternating field induces a magnetic field.

Alternatively, it is also possible to use DC motors in which brushes are used to apply current to the rotor coil.

The coils in the rotor and the stator of synchronous motors and DC motors can be operated in series or in parallel. In principle all combinations are conceivable, i.e. synchronous series motors, synchronous parallel or shunt motors, DC series motors, and DC parallel or shunt motors. Synchronous motors can also be fitted with a permanent magnet as the rotor, in which case a combination with a rotor coil is also conceivable.

Synchronous motors, which can be operated in parallel, have a torque curve, which is largely constant in relation to speed. Conversely, the available torque of a synchronous motor operated in series rises as speed increases.

With asynchronous motors and also with synchronous parallel motors a tipping point is observed at which a maximum torque is reached. When the speed falls below a certain level, the available torque decreases. In rotary-current motors, a particular angle of rotation has no particular influence on stationary torque.

In motors with series connection behaviour a stronger fall in speed can be observed under load. Motors with series connection behaviour are therefore particularly suitable for the subject matter of the application because operating without switchgear, i.e. with a fixed speed reduction, is possible over a wide speed range.

Here DC series motors which develop a very high speed at low load, but in which the speed then drops sharply as load increases, have proved particularly successful. They produce a high-speed drive with high starting torque, which is particularly desirable when driving vehicles. When starting from stationary a series motor and in particular a DC series motor has a high torque, which permits high starting acceleration. The speed can reach very high levels entirely without load. An electronic control unit advantageously counters this by reducing power through the application of a lower drive voltage to the motor.

With appropriate switching to control the coils of the stator of an asynchronous motor it is possible to generate similar properties, there is also the advantage that no collector and no brushes are required to drive the rotor. In fact, this results in a more robust short-circuit rotor of simple design, which has a characteristic curve similar to that of the series motor.

In terms of the structural design of the electric motor, both double and single split axial motors are possible. A radial motor with an inner rotor or an outer rotor is also conceivable.

Outer rotors have the advantage of a higher moment of inertia, which has a favourable effect on the running smoothness of the drive unit it forms. Combinations of axial motors and radial motors are also conceivable, in particular when they are designed as outer rotors.

The subject matter of the application can be realised with a wide range of electric motor types including AC motors, DC motors, brushless DC motors, series-wound motors, shunt-wound motors, synchronous motors, and asynchronous motors. Internal combustion engines such as piston engines or even combustion turbines can also be used.

The above-mentioned types of electric motors can in principle also be used as a generator, wherein the part of the gear that is connected with the main shaft of the motor is the output shaft of the gear.

The gear can also be employed to use a slow-speed drive unit such as a water turbine or wind turbine, to drive a generator at a relatively high speed.

Alternatively, the gear can also be employed to use a high-speed drive unit such as an internal combustion engine or a gas or fuel combustion turbine to drive a generator at a relatively low speed.

The embodiments of the application, which have been described above have in principle in common an outer wheel and an inner wheel, whereby a traction means extends between the inner periphery of the outer wheel and the outer periphery of the inner wheel. Commonly used fraction means include plastic or metal chains, toothed belts and deformable metal or plastic cylinders or other elliptic shapes. In the case of a driven transmitter, the traction means is lifted off the outer periphery of the inner wheel and is pushed against the inner periphery of the outer wheel, thereby creating a relative movement between the inner wheel and the outer wheel. In cases where the inner wheel is driven, a relative movement between the outer wheel and the traction means—and thereby the transmitter—is provided. In still other cases, where the outer wheel is driven, a relative movement between the inner wheel and the traction means—and thereby the transmitter—is provided. The transmitter is then driven by the traction means.

The application also covers a further embodiment in which a pressure means or pushing means for transmitting mainly compression forces is provided in place of a traction means which transmits mainly tensile forces between the inner wheel and the outer wheel. Metal or plastic cylinders or other elliptic shapes are often used as a pressure means. Such a gear then has an input shaft and an output shaft, the gear having an outer wheel, an inner wheel arranged concentrically in relation to the outer wheel and the pressure means extending between the outer wheel and the inner wheel, and at least one revolving transmitter which urges or pushes the pressure means away from the inner periphery of the outer wheel and towards the outer periphery of the inner wheel. In the case of a driven transmitter, the pressure means is pushed off the outer periphery of the inner wheel and is pushed against the inner periphery of the outer wheel, thereby creating a relative movement between the inner wheel and the outer wheel. In cases, where the inner wheel is driven, a relative movement between the outer wheel and the traction means—and thereby the transmitter—is provided. In still other cases, where the outer wheel is driven, a relative movement between the inner wheel and the pressure means—and thereby the transmitter—is provided. The transmitter is then driven by the pressure means.

The pressure means may be designed as a flexible metal sheath, which is able to transmit thrust forces and bending moments. Where this is the case the transmitters lie against the outside of the sheath and drag it from tooth to tooth.

The subject matter of the application also relates to a harmonic chain gear in which the transmitters are mounted on shafts such that they are able to rotate and the shafts are provided on the transmitter carrier. In this arrangement, the transmitters may be designed as gear wheels or rollers.

In an axially asymmetric one row gear design such as in the embodiments of FIGS. 1-22 and in FIG. 35, the traction means respectively the pressure means has one single radial section that is provided both for the contact with the outer wheel and for the inner wheel. In the one row gear design, the transmitter generally contacts the traction means respectively the pressure means from within the gap between the inner wheel and the outer wheel. The transmitter, the inner wheel, the outer wheel as well as the traction means respectively the pressure means are located essentially in the same axial plane.

In an axially asymmetric two row gear design such as in the embodiments of FIG. 23, FIGS. 26-34, and FIGS. 47-49, the inner wheel and the outer wheel are often located in different axial planes, wherein the transmitter is either located in the axial plane of the inner wheel or in the axial plane of the outer wheel. The traction means respectively the pressure means extends axially between the axial planes of the inner wheel and the outer wheel, contacting both the inner wheel and the outer wheel at different sections of their respective circumferences.

In a three row gear design such as in the embodiments of FIGS. 36-46, the two pairs of an inner wheel and an outer wheel are located in different axial planes, wherein the transmitter is located in a third axial plane between the two pairs of an inner wheel and an outer wheel.

In a further embodiment which is not shown in the Figures, a three row gear design is provided with two inner wheels and one outer wheel or—alternatively—also with two outer wheels and one inner wheel.

It is also possible to provide a three-row gear design with one inner wheel and one outer wheel. As shown in FIGS. 24-25, it is then also possible to provide a double row transmitter with two transmitter sections, wherein each transmitter section is provided in an axial plane, which is different from the axial plane of the inner wheel. The traction means respectively the pressure means extends axially between the axial planes of the outer wheels and the inner wheel, contacting both the inner wheel and the outer wheels at different sections of their respective circumferences.

It is also possible, despite not being shown in the Figures, to provide an axially symmetric three-row gear design with two outer wheels and one inner wheel, which are located in different axial planes, wherein the transmitter is located in the axial plane of the inner wheel. It is then also possible to provide a double row transmitter with two transmitter sections, wherein each transmitter section is provided in the axial plane of each outer wheel. The traction means respectively the pressure means extends axially between the axial planes of the inner wheels and the outer wheel, contacting both the inner wheels and the outer wheel at different sections of their respective circumferences.

In short, combinations of any number of inner wheels and any number of outer wheels are possible, wherein a single row transmitter or a multiple row transmitter with multiple transmitter sections can be used. The embodiments show only some of the many combinations that are disclosed in the present application.

To facilitate understanding of the embodiments below, the following table indicates the reduction/transmission ratios of a precision harmonic chain drive for different drive/driven configurations. In the table R refers to the dragger, I to the inner wheel and A to the outer wheel. Here the dragger can be designed in different manners, for example as a dragger element located between a chain and an inner wheel, as one or more eccentrically supported circular discs or as one or more oval discs. In addition, $n_A$ refers to the number of outer wheel teeth, $n_I$ to the number of inner wheel teeth and $n_K$ to the number of chain links.

| In | Out | Fixed | Transmission ratio | Reduction | Opposite direction |
|----|-----|-------|--------------------|-----------|--------------------|
| R  | I   | A     | $1:(n_A - n_K)/n_I$ | J | J |
| R  | A   | I     | $1:(n_K - n_I)/n_A$ | J | N |
| I  | A   | R     | $1:(n_I/n_A)$       | J | N |
| A  | I   | R     | $1:(n_A/n_I)$       | N | N |
| I  | R   | A     | $1:n_I/(n_A - n_K)$ | N | J |
| A  | R   | I     | $1:n_A/(n_K - n_I)$ | N | N |

Moreover, according to the invention configurations comprising a dragger and two outer wheels are also possible, wherein the number of teeth on the inner and outer wheels would equate to the corresponding number of teeth on the relevant driven, drive or fixed outer wheels.

Figure 50:
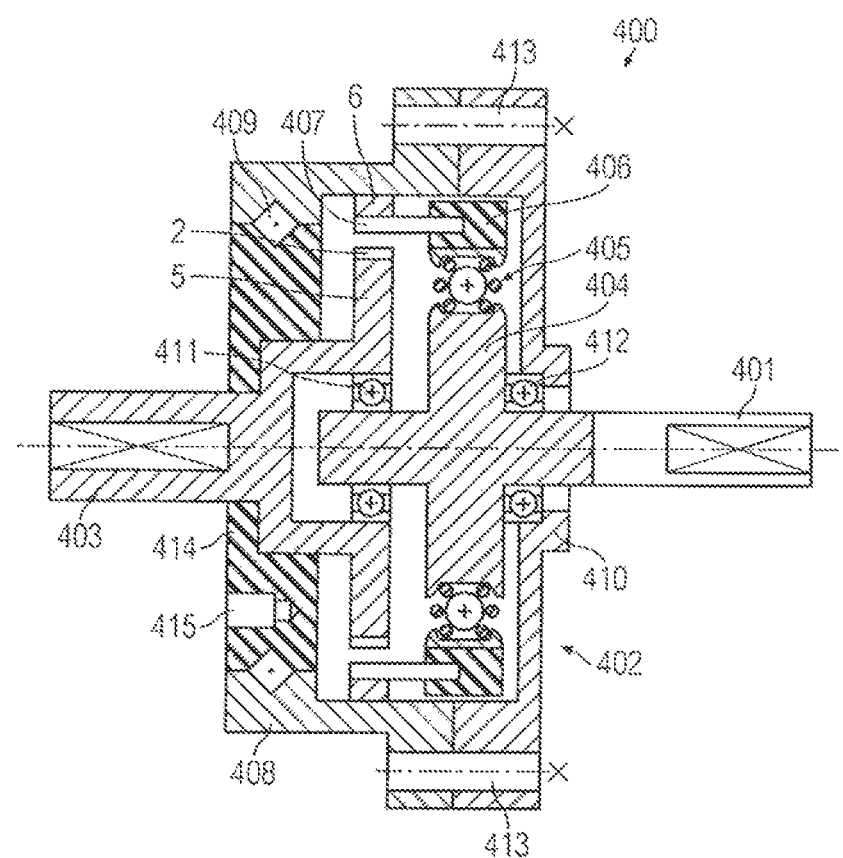
FIG. 50 shows an embodiment of a reduction gear.

FIG. 50 shows an embodiment of a reduction gear 400 according to this application. The reduction gear comprises a drive shaft 401, a housing 402, a driven shaft 403 opposite the drive shaft 401 and further components positioned inside the housing 402. The reduction gear 400 is structured as follows from the drive side to the driven side: formed on the drive shaft 401 is an oval dragger disk 404. Formed on the oval dragger disk 404 is a receiving region for wires of a wire race bearing or Franke bearing 405. A receiving region of pin ring 406 lies on the wire race bearing 405. The receiving region is provided on the inside of the pin ring 406. Driven-side pins 407 of the pin ring 406 engage at opposite dragger points in outer wheel toothing 6 which is provided on a fixed, stationary drive-side housing part 408.

Formed on the driven shaft 403 is an inner wheel 5 with inner wheel toothing 2, which is supported by a ball bearing 411 on the drive shaft 401. Further pins 407 of the pin ring 406 engage in inner wheel toothing 2 at opposing points which are not shown in this view. A co-rotating housing part 414, which is supported externally on the stationary drive-side housing part by a cross roller bearing 409 is provided on the driven shaft 403. A stationary drive-side housing part 410 is supported on the drive shaft by a ball bearing 412. Screw holes 413 for fixing the housing run through the stationary housing parts 408 and 410. Holes 415 for fixing further elements, e.g. for fixing a work piece or a processing tool are provided in the co-rotating housing part 414.

Figure 51:
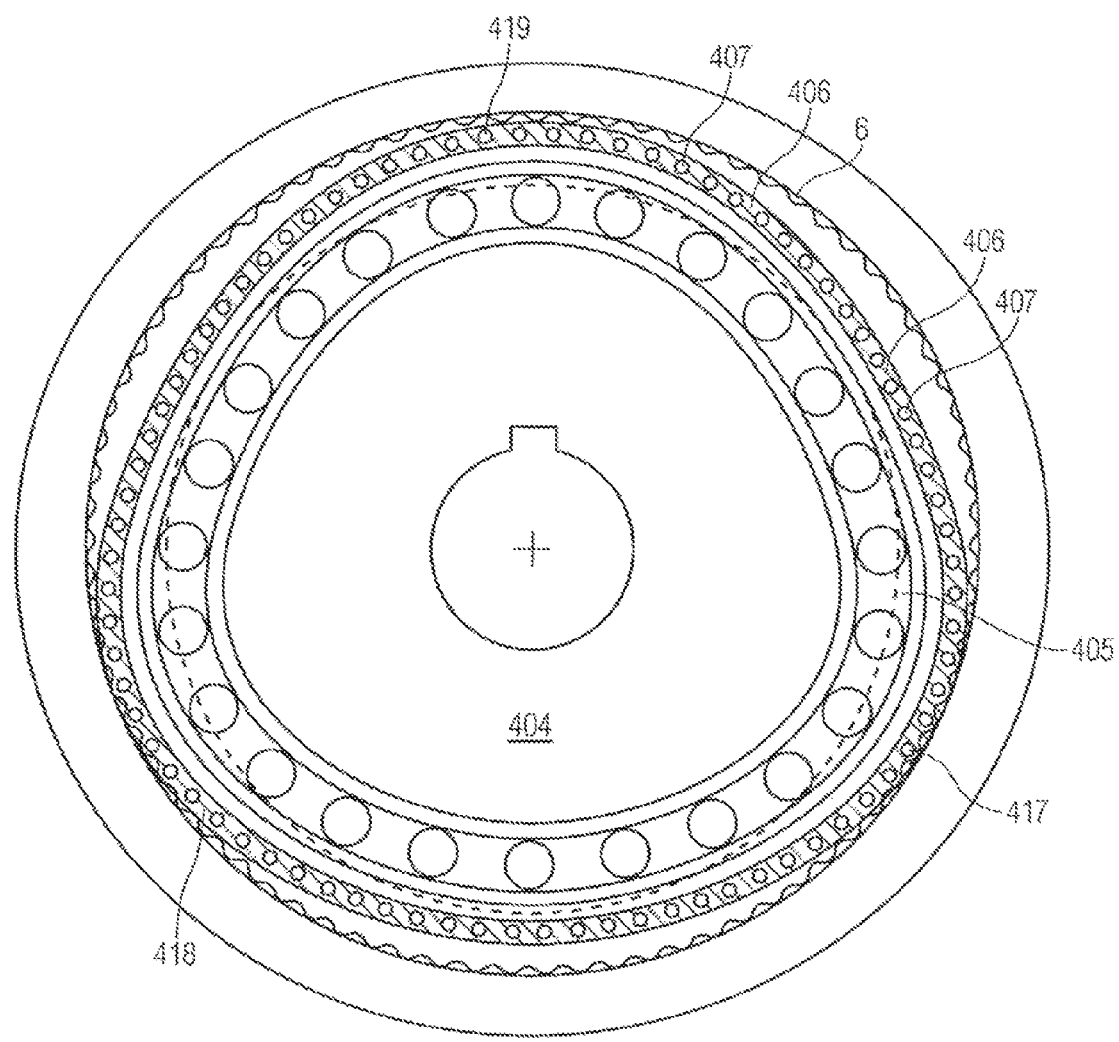
FIG. 51 shows a dragger disk with a three-fold symmetry.

In this case, the dragger points are positioned diametrically opposite one another. To achieve a good mesh it is therefore advantageous for the number of inner wheel teeth, the number of chain links, and the number of outer wheel teeth to differ from one another by an even number. In an alternative arrangement, it is also possible to provide three symmetrically arranged dragger points. In such a case, a difference in the number of teeth and the number of chain links, which is a multiple of three is advantageous. In this case, the dragger disk has a three-fold rotational symmetry. An arrangement of this type is shown in FIG. 51 by way of example. The dragger disk 404 is shaped such that the wire race bearing 405 lifts the pins 407 of the pin ring 406 from an inner wheel which is indicated in FIG. 49 by means of a broken line at three dragger points 417, 418, 419 such that the pins 407 engage in the outer wheel toothing 6 at the three dragger points. The outer wheel toothing 6 and the inner wheel toothing, which is not shown, are located in the plane of the pins 407, whereas the dragger disk 404 and the wire race bearing 405 are located in a plane behind them.

Figure 52:
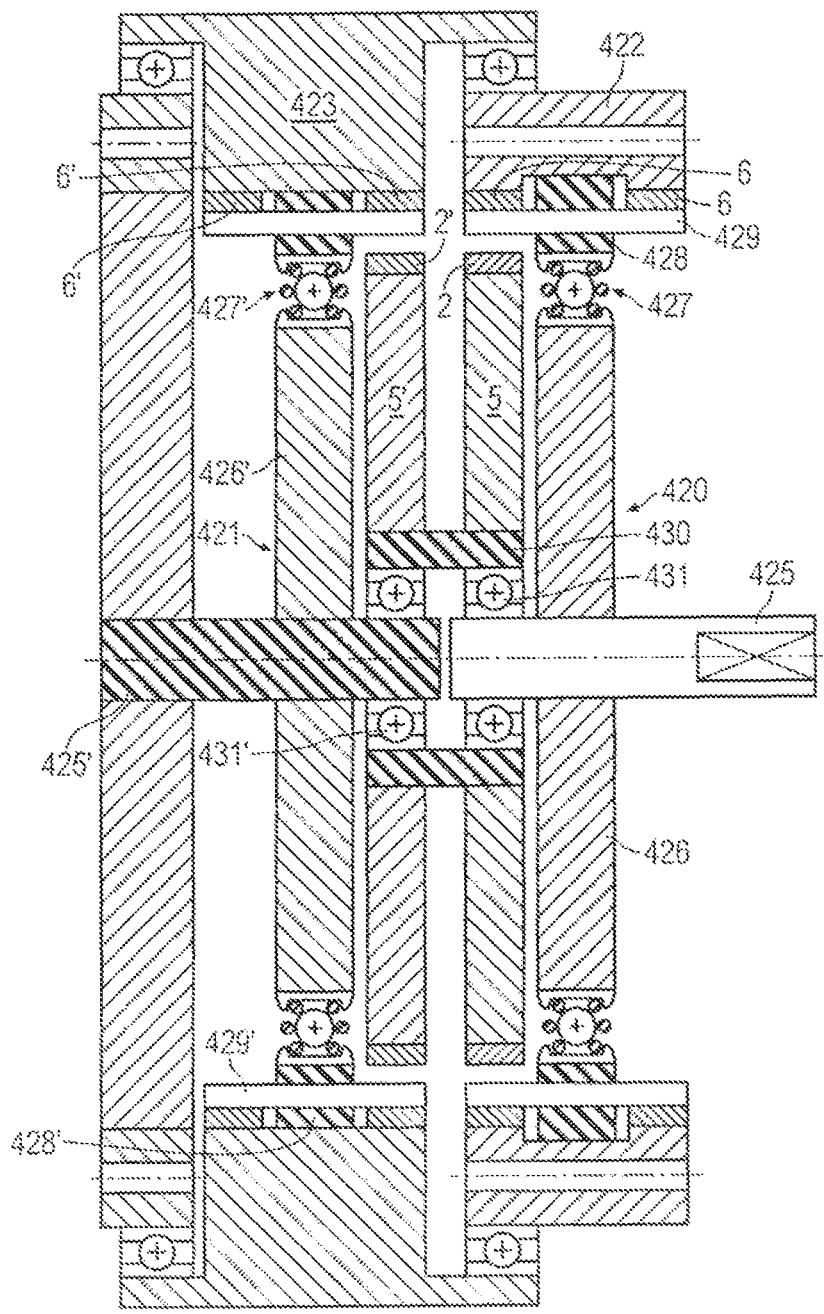
FIG. 52 shows a two-stage gear.

FIG. 52 shows a two-stage gear according to the application. In a two-stage gear, a first gear stage 420 and a second gear stage 421 are positioned inside a stationary housing part 422 and a co-rotating housing part 423. The first gear stage has a drive shaft 425 on which is provided an oval dragger disk 426. On a receiving region on the circumference of the dragger disk 426 lies a wire race bearing 427. On the wire race bearing 427 lies a pin ring 428 in which pins 429 are provided. Pins 429 of the pin ring 428 engage in outer wheel toothing 6, which is provided on the stationary housing 422.

Outside the drawing plane shown in FIG. 52 further pins 429 of the pin ring 248 engage in an inner wheel 5, which is positioned on the driven side of the dragger disk 426. The inner wheel 5 is positioned on a hollow shaft 430, which is supported by a ball bearing 431 on the drive shaft 425. A further ball bearing 431' on an output shaft 425' supports the hollow shaft 430. An inner wheel 5' of the second gear stage 421 is provided on the hollow shaft 430.

The second gear stage 420 is structured in a similar manner to the first gear stage 420 and, seen from the drive to the driven side, comprises the inner wheel 5' with inner wheel toothing 2', outer wheel toothing 6' on the co-rotating housing part, a pin ring 428' with pins 429' and an oval dragger disk 426' provided on a stationary shaft 425'. In contrast to the first gear stage, the shaft 425' on which the oval dragger disk 426' is stationary and the outer wheel toothing 6' is provided in a co-rotating housing part 423.

In operation, the drive shaft 425 drives the dragger disk 426, the wire race bearing 427 and the pin ring 428 of the first gear stage 420. The pin ring 428 is dragged into the outer wheel toothing 6 and transmits the orbital movement thus created to the inner wheel 5. The inner wheel 5 transmits its rotational movement via the hollow shaft 430 to the inner wheel 5' of the second gear stage 421. The inner wheel 5' transmits its rotational movement to the pin ring 428' and to the inner wheel toothing 6' of the co-rotating housing part 423.

Through the combination of the gear stages, a high transmission ratio is achieved, or, respectively, on reversal of input and output, a high reduction ratio. The reduction ratio is $$R = 1 : \left( \frac{n_{A1} - n_{K1}}{n_{I1}} \times \frac{n_{I2}}{n_{A2}} \right)$$

where $n_{Aj}$ is the number of teeth on the $j^{th}$ outer wheel, $n_{Ij}$ the number of teeth on the $j^{th}$ inner wheel and $n_{Kj}$ the number of pins on the $j^{th}$ pin ring.

Figure 53:
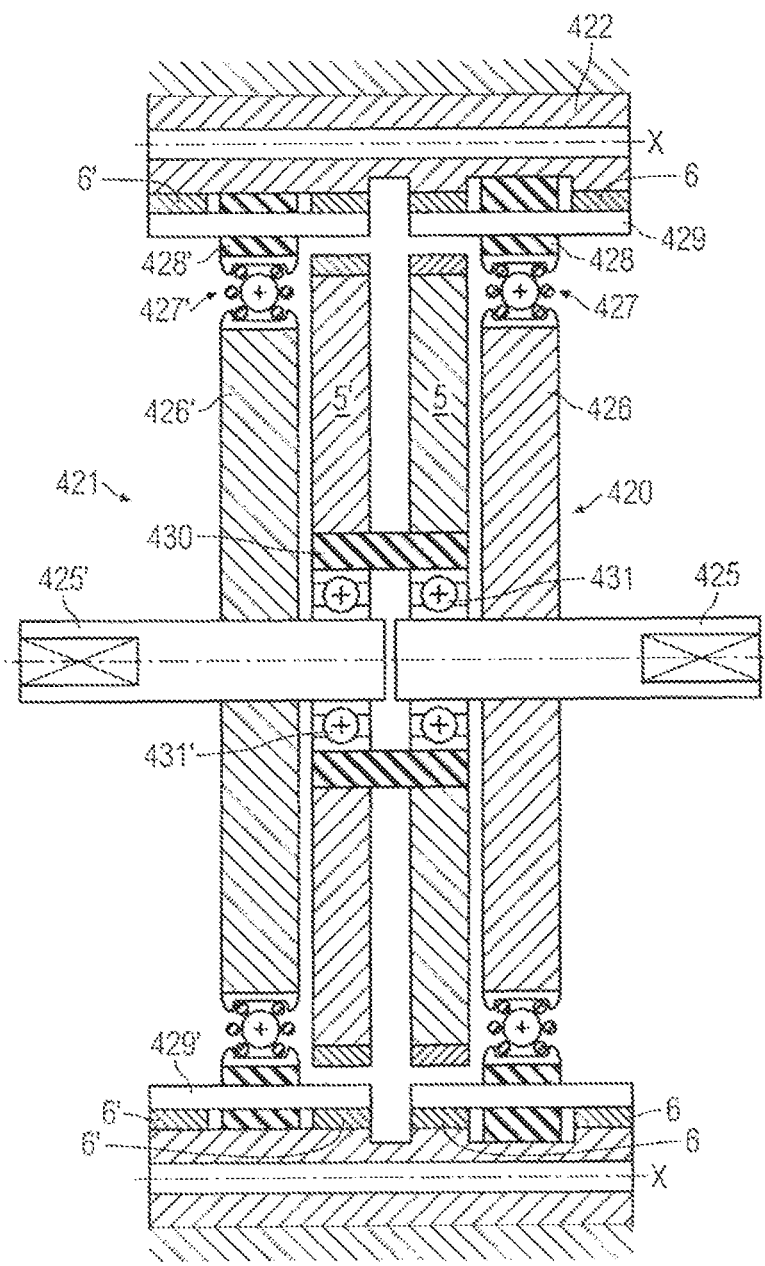
FIG. 53 shows a further embodiment of a two-stage gear.

FIG. 53 shows a further embodiment of a two-stage gear according to the application wherein the structure of the first and second gear stages 420 and 421 corresponds essentially to that shown in FIG. 52. In contrast to the embodiment shown in FIG. 52, however, the outer wheel toothing 6' is provided on a stationary housing part and the shaft 425' is designed as a freely rotatable driven shaft 425'.

In operation, the first gear stage 420 operates as described with reference to the embodiment shown in FIG. 52. In gear stage 421, the rotational movement of the inner wheel 5' is transmitted to the pins 429' of the pin ring 428'. The pins 429' engage in the stationary outer wheel toothing 6', thereby generating an revolving movement of the dragger ring 426'. Overall, this gives a transmission ratio of $$R = 1: \left( \frac{n_{A1} - n_{K1}}{n_{I1}} \times \frac{n_{I2}}{n_{A2} - n_{K2}} \right).$$

If the first and second gear stages have similar dimensions, it is possible to reach a transmission ratio, which differs only slightly from 1. By using a low-backlash harmonic pin ring gear it is also possible to convert a predetermined input rotation into a defined output rotation with particular accuracy.

Figure 54:
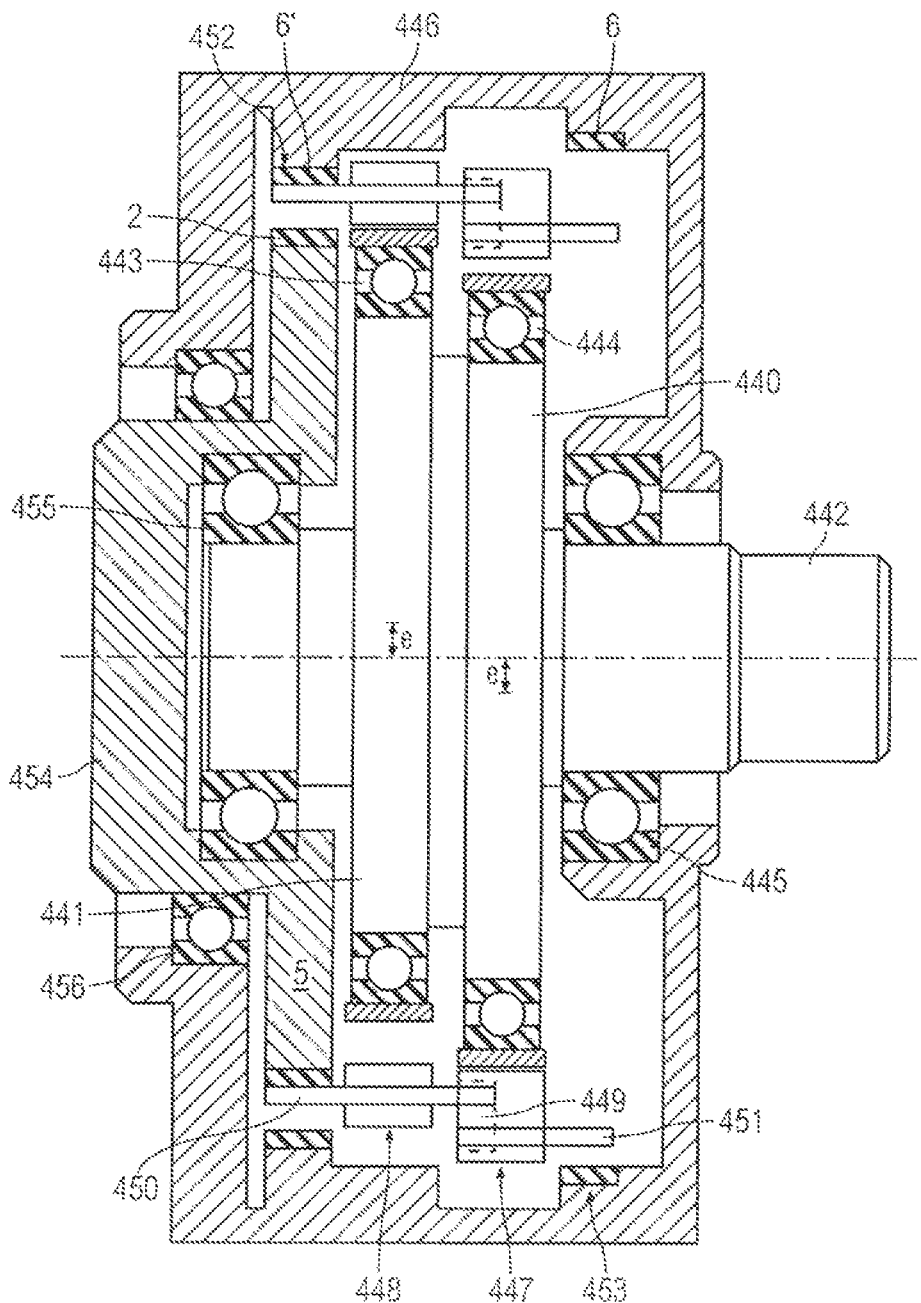
FIG. 54 shows an embodiment of a two-stage gear with two interconnected pin rings.

FIG. 54 shows an embodiment of a harmonic reduction gear with one dragger point per pin ring. The harmonic reduction gear has two circular dragger disks 440, 441, which are positioned eccentrically and are offset by 180 degrees on a drive shaft 442. A first ball bearing 443 and a second ball bearing 444 are positioned both on the circumference of the first dragger disk 440 and on the circumference of the second dragger disk 441. A ball bearing 445 in a gear housing 446 externally supports the drive shaft 442. A first pin ring 447 is positioned around the first dragger disk 440 and the first ball bearing 443 and a second pin ring 448 is positioned around the second dragger disk 441 and the second ball bearing 443.

Pins 450 of the second pin ring 448 engage with slits 449, which are provided in the first pin ring 447 such that the first pin ring 447 is able to move radially inwards and outwards in relation to the second pin ring 448. Pins 451 of the first pin ring 447 engage at a first dragger location in the outer wheel toothing 6, which is formed on the housing. In addition, pins of the second pin ring engage at a second dragger point 453 offset by 180° in relation to a first dragger point 452 in an outer wheel toothing 6', which is formed on the gear housing 446. Further pins 450 of the second pin ring pin ring 448 engage in the inner wheel toothing 2. The inner wheel toothing 2 is formed on an inner wheel 5 which forms part of a driven shaft 454. The driven shaft 454 is supported internally on an inner ball bearing 455 and externally on an outer ball bearing 456 which rests on the gear housing 446.

In operation, the dragger disks 440, 441 are driven by the drive shaft 442 and drag the first pin ring 447 into the outer wheel toothing 6' and the second pin ring 448 into the outer wheel toothing 6'. The difference between the tooth number of the outer wheel toothing 6' and the pin number of the pin ring 448 as well as the difference between the tooth number of the outer wheel toothing 6 and the pin number of the pin ring 447 are the same, such that the pin ring 447 and the pin ring 448 rotate at the same speed. The rotational movement of the pin rings 447, 448 is transmitted to the inner wheel 5 and the driven shaft 454 by the meshing of the pins 450, 451 of the second pin ring 448 into the inner wheel toothing 2.

Since there is only one dragger point 452, 453 per pin ring 447, 448, the number of pins 450, 451 and the teeth on the outer wheel toothing 6, 6' need not differ by a multiple of 2 as is the case when there are two dragger points. Here they may also differ by only 1, for example. Where the teeth and the pins 450, 451 have the same dimensions the reduction achieved can therefore be twice as high. The presence of two dragger points 452, 453 offset by 180° avoids an asymmetrical distribution of force and doubles the number of pins 450, 451 engaging in the outer wheel toothing.

The embodiments shown in FIGS. 55 to 58 are particularly suitable for electrical bicycles. By fitting a double freewheel it is possible to provide a method of adjusting the ratio between motor and muscle power required for pedelecs, for example, by simple means. To that end, a drive shaft can be provided between an inner freewheel which is supported around a crank shaft and an outer freewheel which is connected to a motor drive, the drive shaft being connected with an output, for example with an output pinion. The outer freewheel is positioned in the transmission between the motor and the inner freewheel and is configured such that the motor is decoupled if the rotational speed generated by the pedal drive is greater than the rotational speed generated by the motor.

Figure 55:
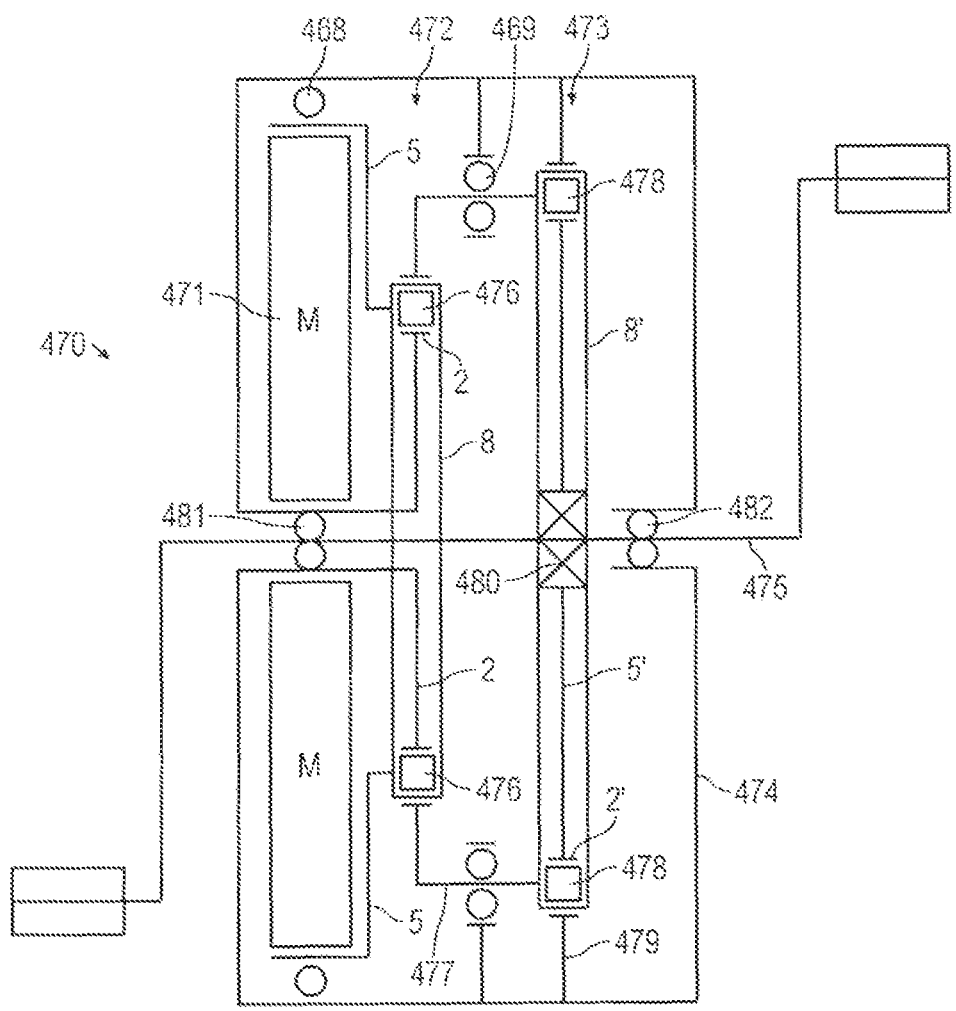
FIG. 55 shows an embodiment of a two-stage gear for an electric bike.
Figure 56:
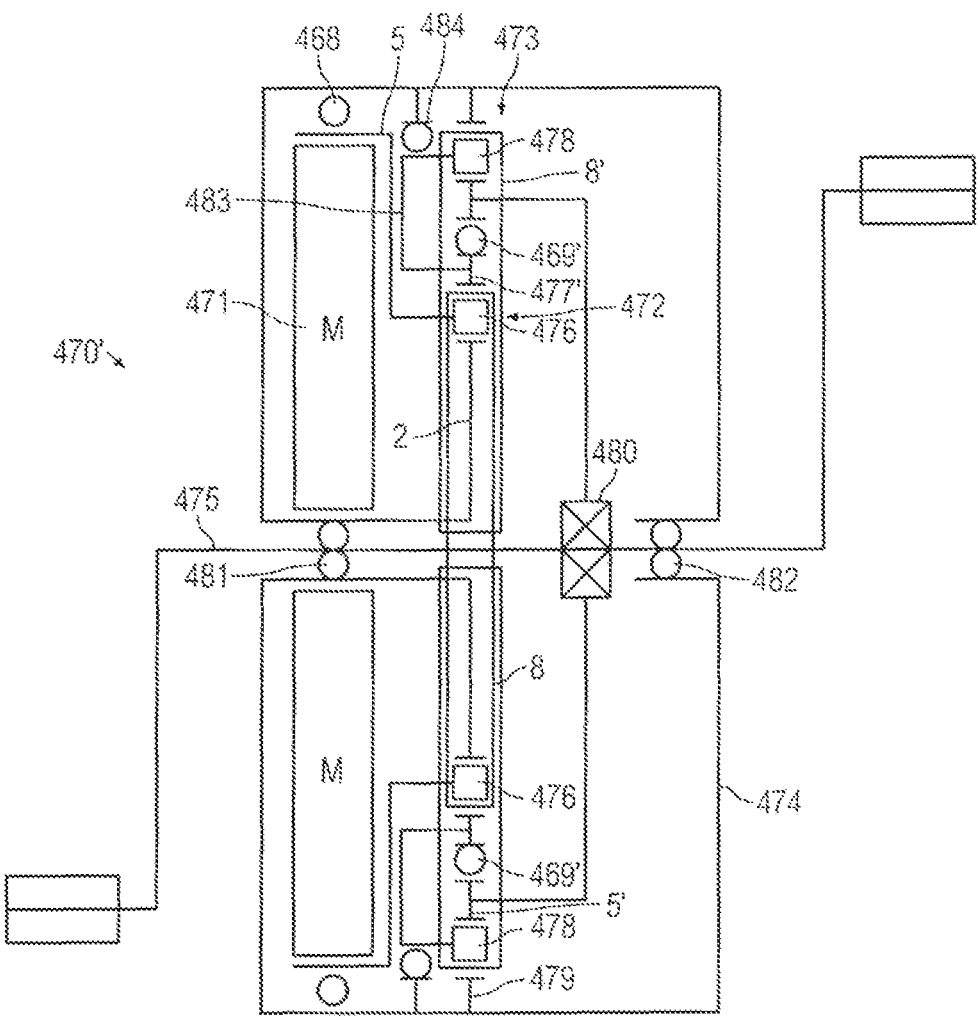
FIG. 56 shows a further embodiment of a two-stage gear for an electric bike.

FIGS. 55 and 56 show embodiments for two-stage harmonic chain drives. As the transmission ratios of the gear stage multiply, it is possible to reduce further the gear dimensions or to achieve a higher reduction with the same dimensions.

FIG. 55 shows an embodiment of a two-chain harmonic chain drive 470 for an electric bicycle.

The two-chain harmonic chain drive 470 has an external rotor motor 471 and two gear stages 472, 473 which are positioned in a gear housing 474 around a pedal shaft 475.

The first gear stage 472 has a dragger 476 which is connected to a rotor 5 of the motor 471, a stationary inner wheel 2, a rotatable outer wheel 477 which is connected to a dragger 478 of the second gear stage 473 and a chain 8 which is positioned between the inner wheel 2 and the rotatable outer wheel 477. The rotatable outer wheel 477 is supported in a ball bearing 469 with an outer race, which is connected to the gear housing 474. The rotor 5 is supported externally on a ball bearing 468 with an outer race, which is also connected to the gear housing 474.

The second gear stage 473 comprises a stationary outer wheel 479, the dragger 478, a rotatable inner wheel 5' and a chain 8', which is positioned between the rotatable inner wheel 5' and the stationary outer wheel 479. The stationary outer wheel 479 is connected to the gear housing 474, while the rotatable inner wheel 5' is supported by a freewheel 480 on the pedal shaft 475. Ball bearings 481, 482 in the gear housing 474 externally support the pedal shaft 475.

FIG. 56 shows a further embodiment of a two-chain harmonic chain drive 470' for an electric bicycle. In contrast to the two-chain chain drive 470' shown in FIG. 55, here a first gear stage 472 is positioned inside a second gear stage 473. The first gear stage 472 has a dragger 476, which is connected to a rotor 5 of an external rotor motor 471, a stationary inner wheel 2, a rotatable outer wheel 477' and a chain 8 which is positioned between the stationary inner wheel 2 and the rotatable outer wheel 477'. The rotatable outer wheel 477' is connected via a ring 483 to a dragger 478 of the second gear stage 473. FIG. 56 shows only the U-shaped cross-section of the ring 483. A ball bearing 469' on a rotatable inner wheel 5' of the second gear stage 473 externally supports the rotatable outer wheel 477' and a further ball bearing 484 on the housing 474 externally supports the ring 483. The second gear stage 473 is positioned essentially in the plane of the first gear stage 472 and around the first gear stage 472. The second gear stage 473 comprises the rotatable inner wheel 5', the dragger 478, a stationary outer wheel 479 and a chain 8'. The rotatable inner wheel 5' is supported by a freewheel 480 on the pedal shaft 475.

Figure 57:
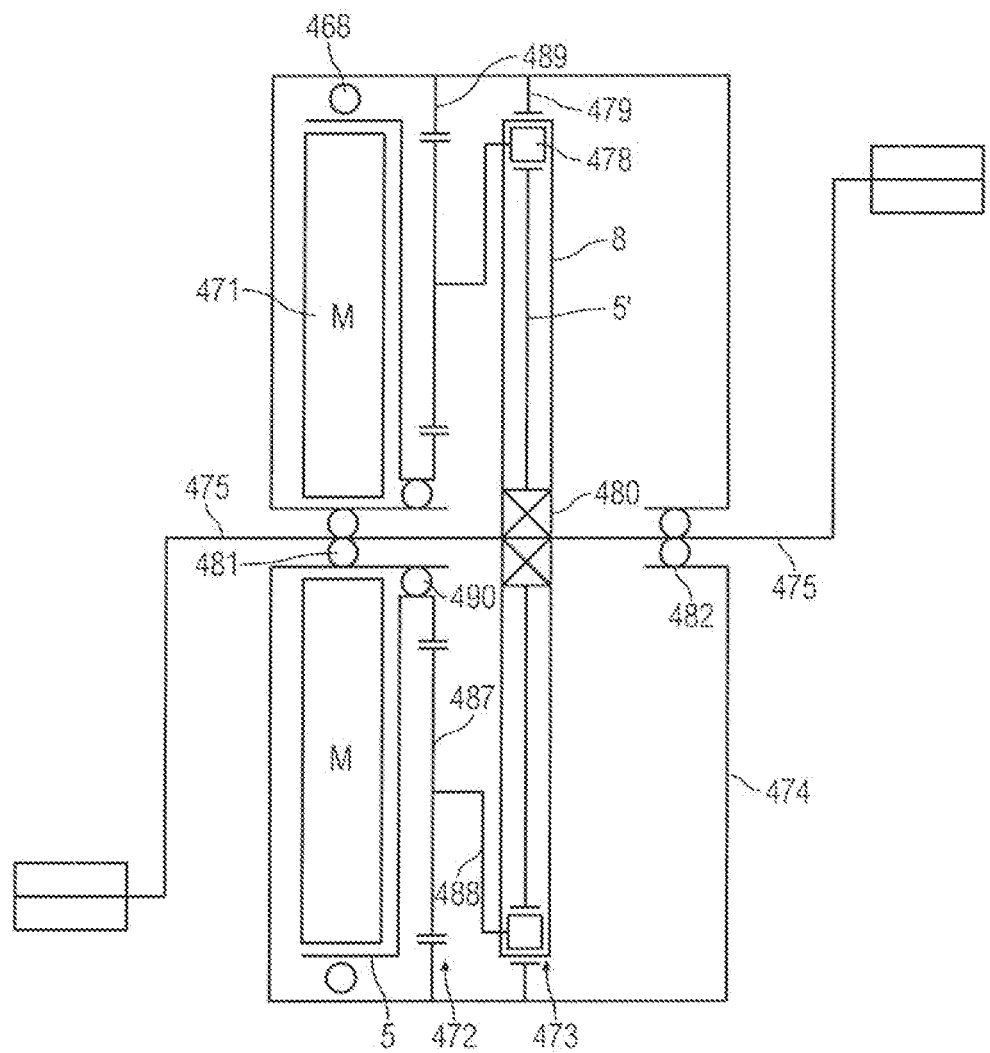
FIG. 57 shows an embodiment of a two-stage gear for an electric bike having a planetary gear as a pre-stage.

FIG. 57 shows an embodiment of a harmonic chain drive for an electric bicycle with a planetary pre-stage 472. The harmonic chain drive comprises a first gear stage 472 in the form of the planetary pre-stage 472 and a second gear stage 473 in the form of a harmonic chain drives 473.

The planetary pre-stage 472 comprises a rotatable sun gear 5, planetary gears 487, a planetary carrier 488, and a stationary hollow ring 489. The sun gear 5 is connected to a rotor of an external rotor motor 471 and is supported internally by an inner ball bearing 490 on the gear housing 474. An outer ball bearing 468 on the gear housing 474 externally supports the rotor. The rotor is connected to the sun gear 5. The planetary gears 487, whose diameter is greater than the diameter of the sun gear 5, are provided between the sun gear 5 and the stationary hollow gearwheel 489. The stationary hollow gearwheel is fixed stationarily to the gear housing 474 or is formed on the gear housing 474. The planetary gears 487 are supported by a bearing, which is not shown here on shafts of a planetary carrier 488. The shafts are mounted on an annular gear of the planetary carrier 488, which is shown in profile only in FIG. 57. A two-part dragger 478 is fixed rigidly to the planetary carrier 488.

The dragger 478 is a component of the second gear stage 473, which also comprises a stationary outer wheel 479, a chain 8 and a rotatable inner wheel 5'. The dragger 478 and the chain 8 are positioned between the rotatable inner wheel 5' and the stationary outer wheel 479, which is connected stationarily to the gear housing 474. The rotatable inner wheel 5' is supported by a freewheel 480 on the pedal shaft 475. A motor-side ball bearing 481 and a gear-side ball bearing 482 on the gear housing 474 externally support the pedal shaft 475.

Instead of a planetary pre-stage, it is also possible to use a planetary post-stage. It is advantageous to construct a harmonic chain drive such that the gap between the inner and the outer wheel is as small as possible to keep the forces and the deformations exerted on the transmission means, e.g. the chain, the pin ring or the toothed belt, as small as possible. In such a case, the reduction achieved is also high. This high reduction can be reduced again by means of a downstream planetary stage. In an electrically driven bicycle in which the wheels have a circumference of 0.25 to 0.5 m, good matches to optimum motor speed can be achieved at the following dimensions: For a motor speed of >10,000 rpm U/min or even >15,000 rpm the reduction U_HCD of the harmonic chain drive is set at 1:20 to 1:60 and the transmission ratio of the downstream planetary gear is set at 1:1 to 1:3. A lower limit of up to 1:10 and an upper limit of up to 1:100 are also possible for the reduction of the harmonic chain drive and an upper limit of up to 1:100 is possible for the transmission ration of the planetary gear.

Figure 58:
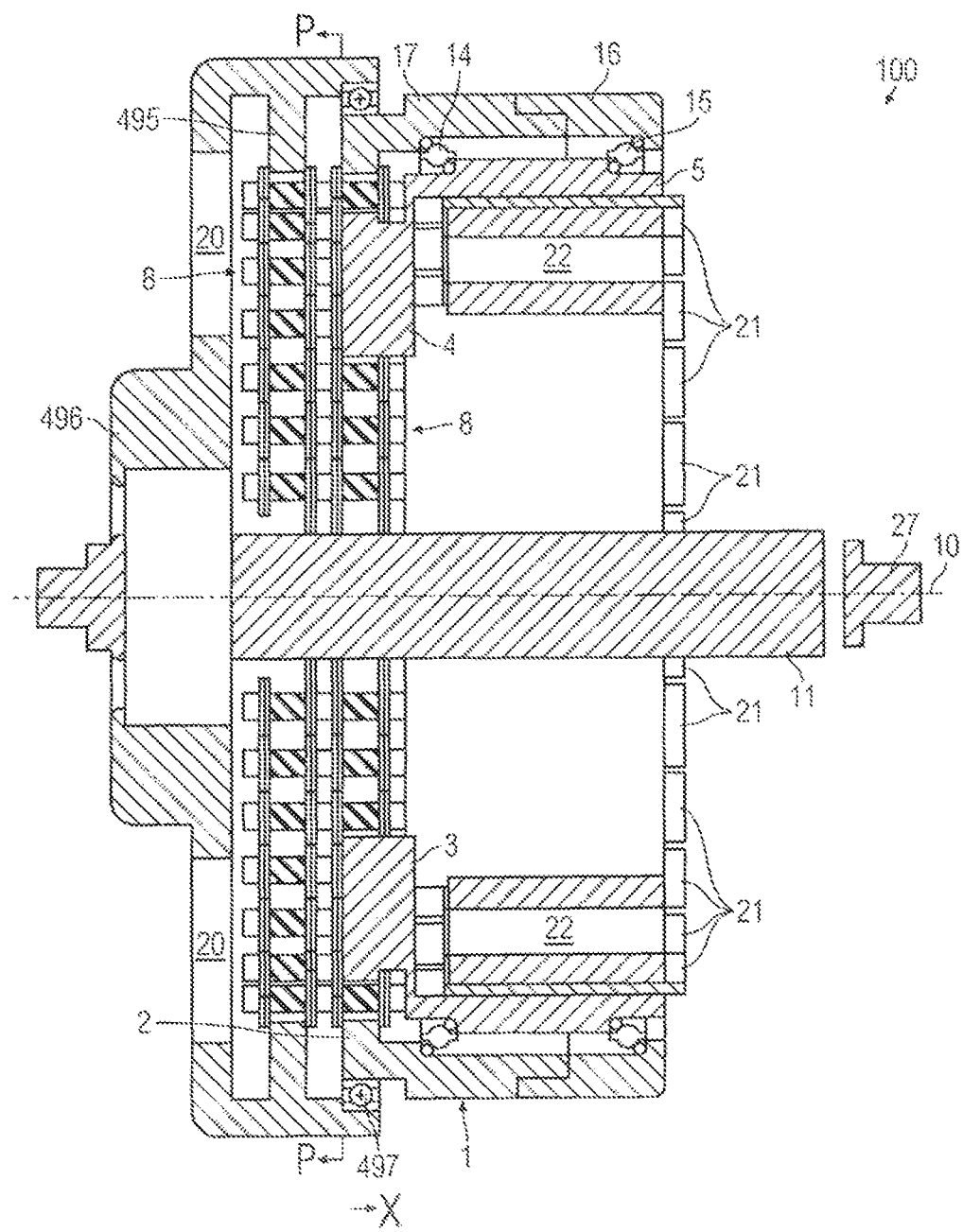
FIG. 58 shows a harmonic chain drive with double chain having two outer wheels instead of an inner and an outer wheel.

FIG. 58 shows a further embodiment of a harmonic chain drive with a double chain 8. This embodiment comprises a stationary outer wheel 2 in the plane of a first chain row of the double chain 8 and, instead of a rotatable inner wheel, a rotatable outer wheel 495 in the plane of a second chain row of the double chain 8. An annular gear, which is illustrated in cross-section in FIG. 58, is connected to the rotor 5 of an external rotor motor. The annular gear can be seen particularly clearly in FIG. 59. Externally adjacent to it is a first chain row of the double chain 8. Adjacent to this first chain row is the stationary outer wheel 2. A rear housing part 496 is supported by a ball bearing 497 rotatably on a stationary housing part 16 and is connected to an output shaft 11. A rotatable outer wheel 495 is formed inside on the rear housing part 496.

Figure 59:
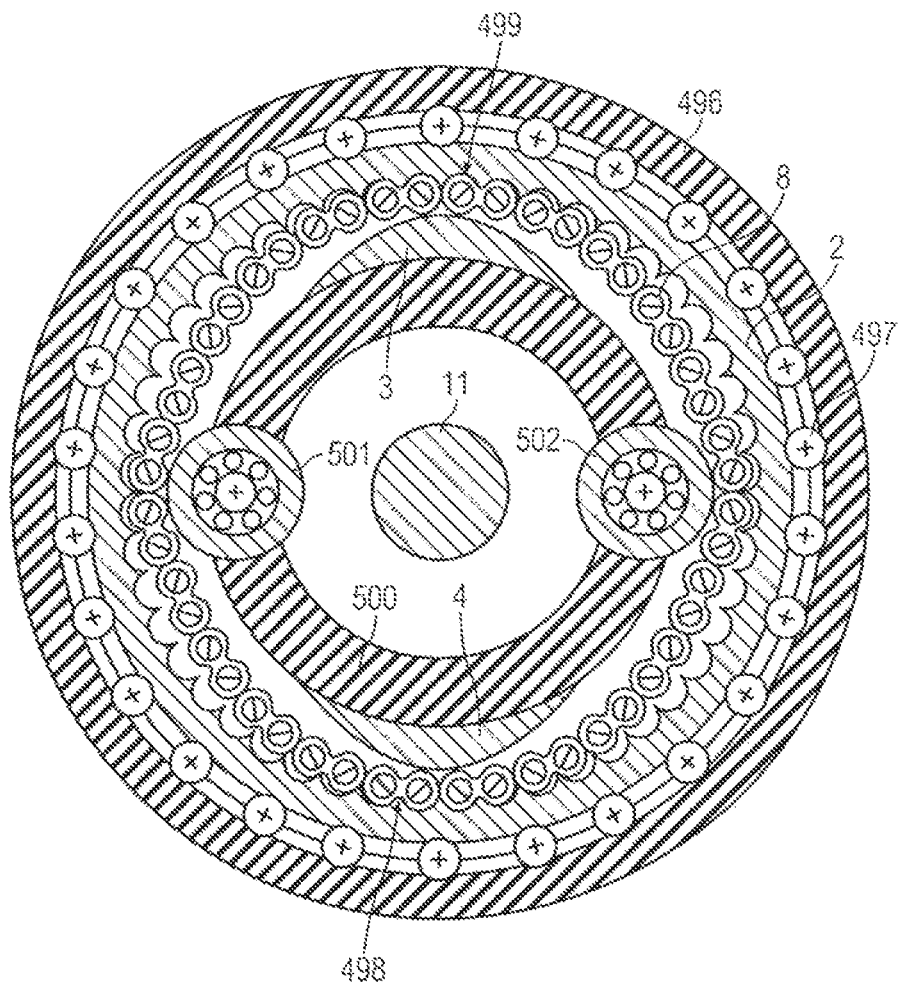
FIG. 59 shows a section through the harmonic chain drive of FIG. 58.

FIG. 59 shows a cross-section along the line of intersection [X-X] of the harmonic chain drive shown in FIG. 58. Provided on an annular disk 500 at two dragger regions 498, 499 offset by 180° are two draggers 3, 4. Offset by 90° in relation the draggers 3, 4 to support the double chain 8 internally are provided supporting gears 501, 502, which are both supported rotatably on a ball bearing. The ball bearings are both supported on shafts provided on the annular disk 500. In addition, FIG. 59 shows the rear housing part 496 and the ball bearing on which the rear housing part 496 is supported.

In operation, the motor-side chain row of the double chain 8 is dragged into the outer wheel toothing 2 of the stationary outer wheel. The double chain 8 has fewer chain links than the stationary outer wheel has teeth and the double chain 8 therefore revolves. This orbital movement of the double chain 8 is transmitted to the rotatable outer wheel 495. If the number of teeth $n_{42}$ of the rotatable outer wheels 495 is greater than the number of chain links $n_K$, the result is a downstream reduction, which corresponds to the ratio $n_{42}/n_K$.

Figure 60:
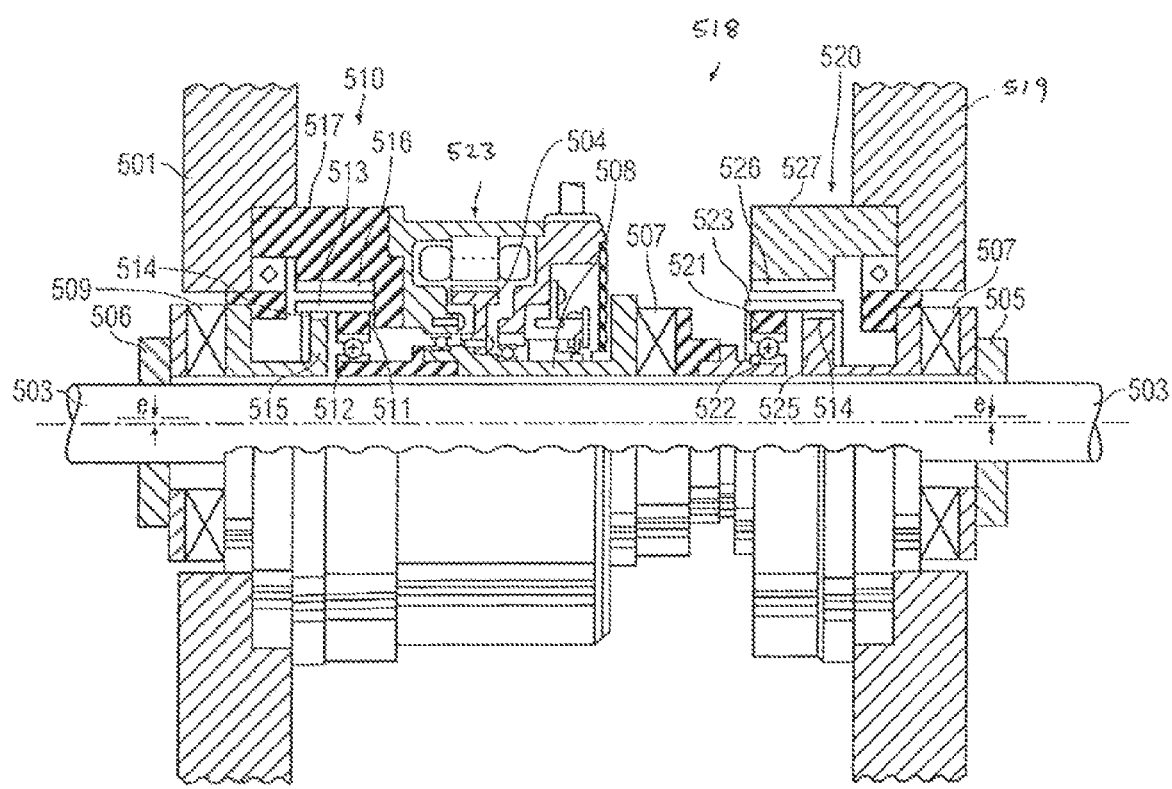
FIG. 60 shows an inclination adjustment device for a drilling rod having two harmonic chain drives.

FIG. 60 shows an inclination adjustment device 518 for orienting a drill rod 503 for use in a drilling operation.

The inclination adjustment device 518 comprises a housing 519, a drive, a first harmonic chain drive 510 and a second harmonic chain drive 520. Located inside the housing 519 is a drill rod 503, which is oriented by the inclination adjustment device 518.

The first harmonic chain drive 510 comprises a dragger disk 511 which is supported on a ball bearing 512. The ball bearing 512 is supported on a hollow shaft supported, which is connected to a rotor 504 of the motor 523. A pin ring 513 lies on the dragger disk 511 and engages partially in inner wheel toothing 514 of an inner wheel and partially in outer wheel toothing 516 formed on a housing part 517. In the interests of clarity, only one of the pins of pin ring 513 is shown.

As for the first harmonic chain drive 510, the second harmonic chain drive 520 also comprises a dragger disk 521, a ball bearing 522, a pin ring 513, inner wheel toothing 524, outer wheel toothing 516 and a housing part 517 which are connected to each other as described above.

The drill rod 503 passes through a hole in an upper punched disk 505 and a hole in a lower punched disk 506. The punched disks 505, 506 are designed as round disks with an eccentrically positioned hole. The upper punched disk is connected by an upper electromagnetic clutch 507 to a driven element of the second harmonic chain drive 520. A further electromagnetic clutch 507 and a hollow shaft 508 connect a drive of the second harmonic chain drive to the rotor 504. The lower punched disk 506 is connected by a lower electromagnetic clutch 509 to a drive element of the first harmonic chain drives. The driven elements are designed as inner wheels 515, 525 and hollow shafts are connected therewith. Cross roller bearings supporting the electromagnetic couplings 508, 509 are indicated by rhomboids.

The first harmonic chain drive 510 and the second harmonic chain drive 520 advantageously have essentially the same reduction ratio. This makes it possible to achieve an even rotation and to use parts of the same design. Instead of pin rings, it is also possible to use other annular transmission means with pins or bolts such as chains, for example.

The use of the harmonic chain drives 510, 520 achieves a high torque. The high torque is sufficient to orient even a relatively heavy drill rod 503. In addition, the inclination can be controlled with great accuracy by virtue of the reduction. The design of the motor 523 and the harmonic chain drives 510, 520 and thus the inclination adjustment device 518 can be so compact that the drill rod 503 can be introduced into the bore hole, in particular as far as the boring head.

Using the inclination adjustment device 518 it is possible to retro-correct the direction of boring. This is advantageous when boring for crude oil, for example, for reasons of cost and time.

Figure 61:
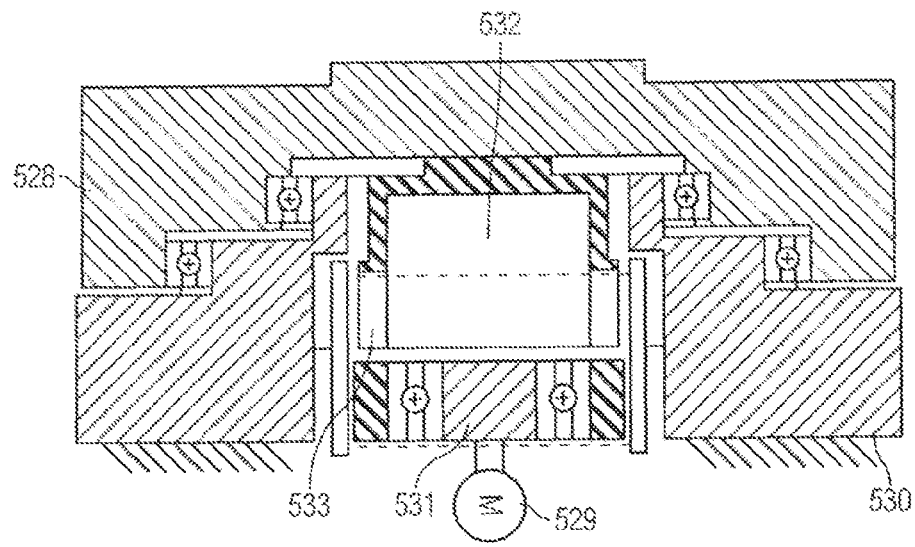
FIG. 61 shows a rotatable table with a harmonic chain drive.
Figure 62:
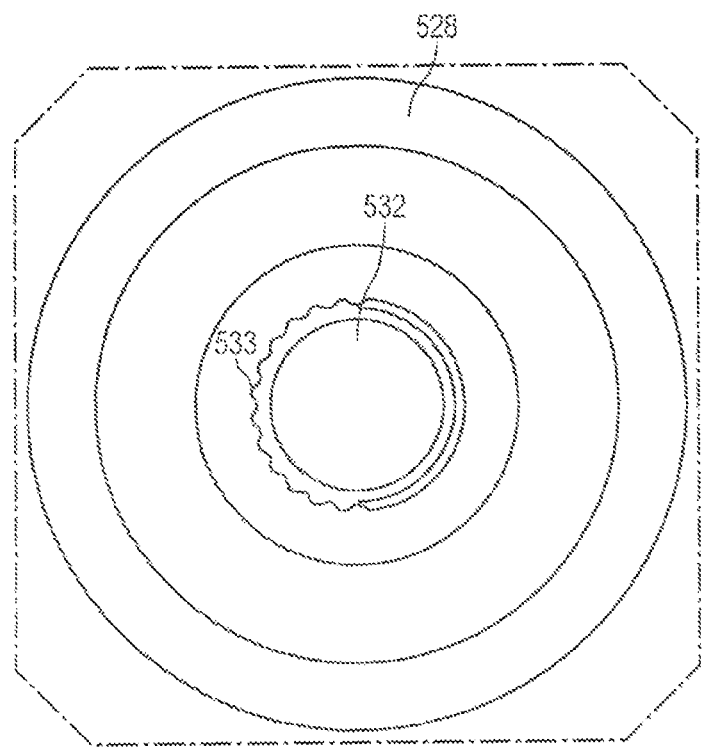
FIG. 62 shows a top view of the rotatable table of FIG. 61.

FIGS. 61 and 62 show a positioning device for rotating a table such as a laboratory table or a table for the processing of a sample. For example, a mirror for reflecting a laser beam may be placed on the table and the table may be used for precision adjustment of the laser beam direction. The arrangement of FIGS. 61 and 62 comprises the table 528, a motor 529, a support 530 and the harmonic chain drive 531. An output of the harmonic chain drive 531 is connected to a wheel 531 with a tooth ring 533, in which the traction means, in this case a pin ring, engages.

Figure 63:
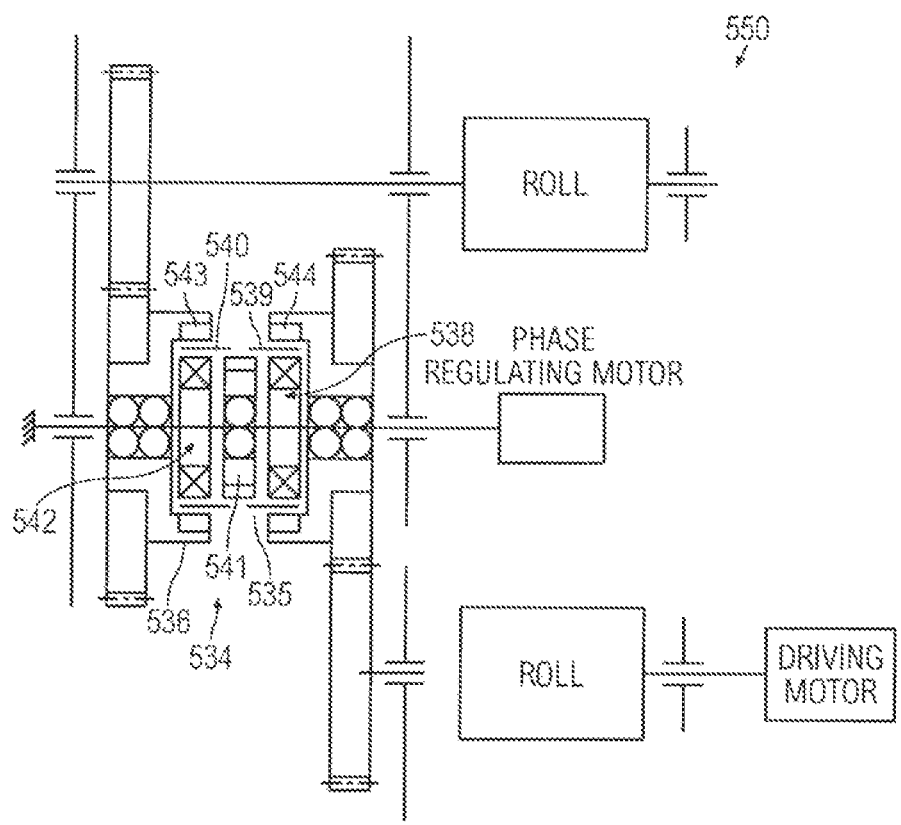
FIG. 63 shows an overriding drive for a phase adjustment comprising a harmonic chain gear.

FIG. 63 shows a phase regulating apparatus 550. A phase regulating speed reducer 534 in the phase regulating apparatus 550 has first and second harmonic chain gears 535, 536. A first dragger disc 538 for the first harmonic chain gear 535 is connected to a phase regulating motor. An inner wheel 541 connects a first traction means 539 to a second traction means 540 of the second harmonic chain gear 536 so that these fraction means rotate together in a back-to-back state. A second dragger disc 542 for the second harmonic chain gear 536 is made nonrotatable. During a normal power transmission time, the phase regulating motor is not operated. Therefore, when the reduction ratio of the two gearings is set equal, an input rotation of the first harmonic chain drive 535 into a first rigid internal gear 543 is outputted at the same rotational frequency from a second rigid internal gear 544.

According to this arrangement, a phase regulating apparatus having a low rotation transmission error can be manufactured at a low cost. The phase regulating apparatus may be used to compensate a time lag or a time-advancement in periodic motions, such as for the control of a valve opening in a combustion motor.

Figure 64:
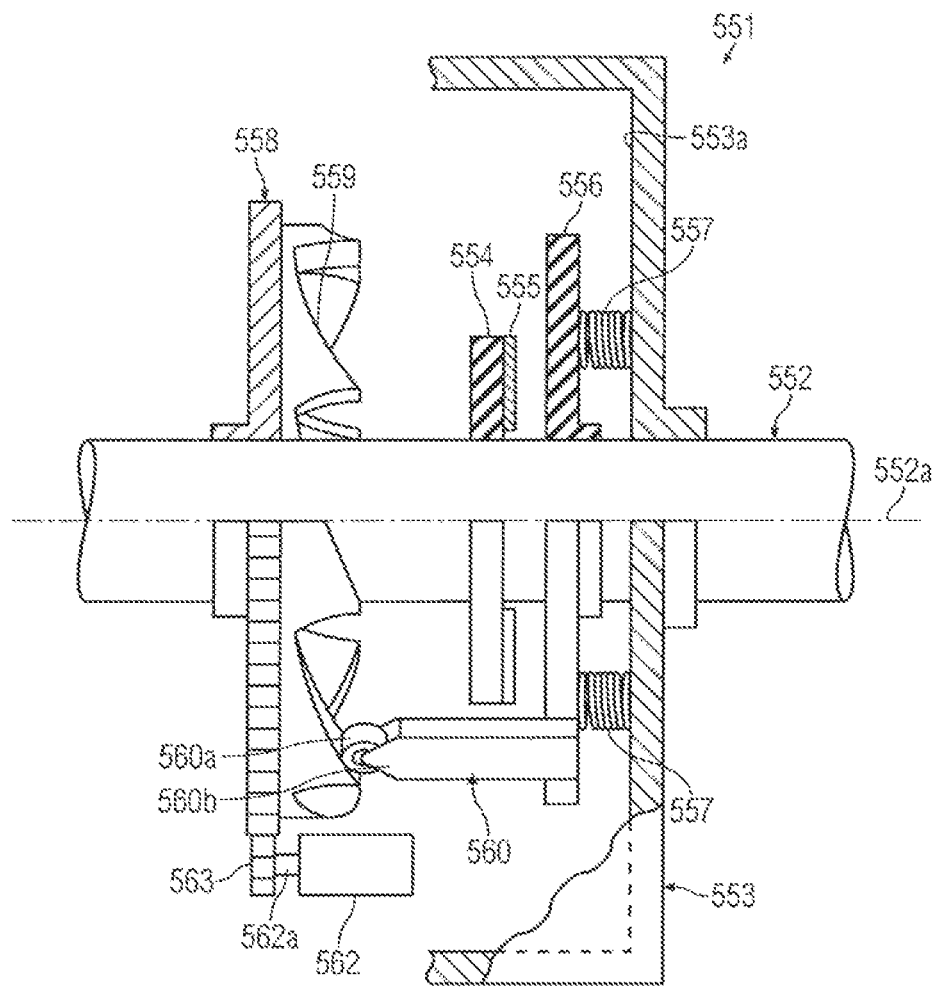
FIG. 64 shows brake actuator with a harmonic chain gear drive for modifying the brake force.
Figure 65:
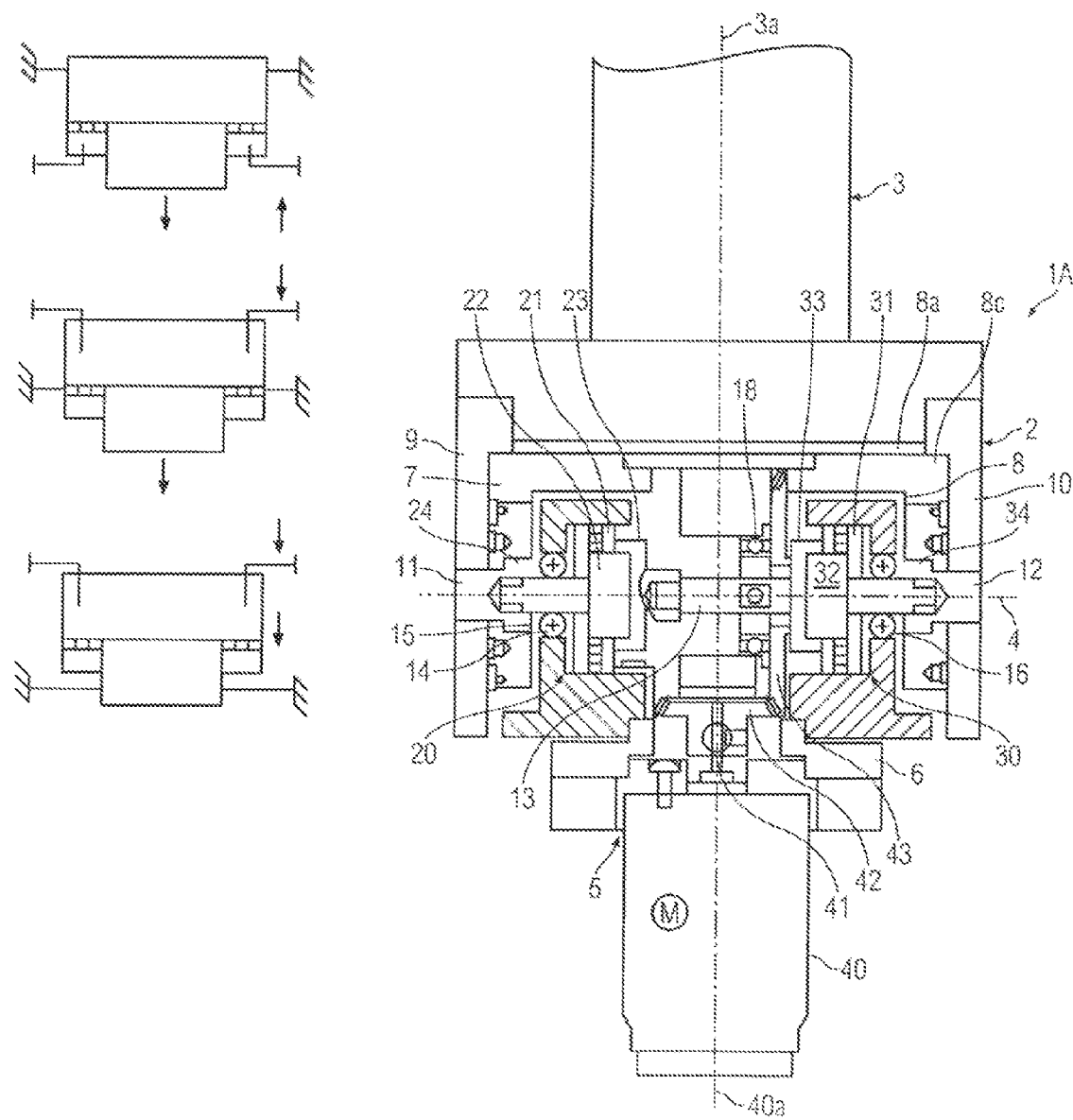
FIG. 65 shows a robot finger with two harmonic chain gears.

FIG. 64 shows a small-scale servo motor braking device 551, which has a low operating velocity for release of a brake during normal operation, wherein compression coil springs 557 cause a pressure of a sliding plate 556 against a brake disk 554 which is fixed to a motor shaft 552, such that a braking is achieved. A small-scale motor 562 with a harmonic chain drive according to the application causes a rotational movement of a control disk 558 in a direction in which a control surface follower 560 rolls upwards from a cavity 559b of a control surface 559 to a tip 559a. The sliding plate 559 moves away from the brake plate 554 against the spring force and the device switches from a rotational movement into a brake release state. If a further rotation of the control surface disc 558 is caused, the control surface follower 560 moves from the tip 559a of the control surface into a consecutive cavity 559b and the sliding plate 6 is pressed by the spring force against the brake plate 554 and the device switches to a state in which a brake force acts upon the motor shaft 552.

The rotating actuator 5 is provided with first and second harmonic chain drives 20 and 30 and with a motor 40. An inner wheel of the first harmonic chain drives 20 is connected to the gear-drive housing unit 7 and an inner wheel of the second harmonic chain drives 30 is integrated into the gear-drive housing unit 8. The first and second harmonic chain drives 20 and 30 are of essentially identical construction and are positioned coaxially such that they face in the same direction. A common rotating input shaft 13 extends along the centre of this harmonic chain drive and the central shaft line of the rotating input shaft 13 corresponds to the joint shaft line 4.

The first harmonic chain drive 20 which is housed in gear-drive housing unit 7 is designed with a internally toothed outer wheel 21, an inner wheel 22 positioned coaxially in the outer wheel 21 and a dragger 23 or dragger disk 23 with an elliptical contour which is located coaxially inside the outer wheel 21. The dragger 23 is fixed coaxially to a distal end region of the rotating input shaft 13. The driven inner wheel 22 is connected to the housing 2. The outer wheel 21 is statically connected to a housing part and is supported rotatably by a bearing 14 on a driven shaft, which is connected to the inner wheel 21. A thick cylindrical hub 24, which is connected to the inner wheel 21, is mounted on a lateral region of the gear-drive housing unit 7.

The rotating input shaft 13 extends rotatably from the first dragger to the second dragger wherein the rotating input shaft 13 is supported rotatably by the bearing 14. The first output shaft 11 which projects from the bearing 14 into a region in the vicinity of the lateral face of the other gear-drive housing unit 8 is designed integrally with the cylindrical hub 24. The first retaining arm 9 of the transmitter 3, which is connected to the first output shaft 11, is connected integrally to the output shaft 11.

The second harmonic chain drive 30 which is housed in the other gear-drive housing unit 8 has the same design and is also provided with an annular outer wheel 31, an inner wheel 32 positioned coaxially inside the outer wheel 31 and with a dragger 33 which is located coaxially inside the outer wheel. The dragger 33 is fixed coaxially on the rotating input shaft 13. The rigid outer wheel 31 is connected to the housing 2. The inner wheel 32 is connected to a thick cylindrical hub 34, which is formed in the central region of the base of the beaker shape, and is supported rotatably by a bearing 16.

In addition, the second output shaft 12, which projects from the bearing 16 laterally away from the gear-drive housing unit 8, is designed integrally on the cylindrical hub 34. The second retaining arm 10 of the transmitter 3, which is connected to the second output shaft 12 is connected integrally to the output shaft 12.

The motor 40 of the rotating actuator 5 is positioned at a point facing the gear-drive housing unit 8 on the rear surface of the base 6. A rotating output shaft 41 of the motor 40 extends in a direct at right angles to the joint shaft line 4, passes through a hole 6a in the base 6 and projects into the gear-drive housing unit 8.

A drive bevel gear 42 is connected coaxially to the distal end of the rotating output shaft 41 and is fixed to it. A driven bevel gear 43, which is fixed coaxially on the rotating input shaft 13, engages with the drive bevel gear 42.

The following is a description of the mode of operation of the finger joint mechanism 1 with this configuration. Due to the driving of the motors 40, the rotating movement of the rotating output shaft 41 is transmitted by the drive bevel gear 42 and the driven bevel gear 43 to the rotating input shaft 13 and input shaft 13 is moved rotationally. The draggers 23 and 33 of the first and second harmonic chain drives 20 and 30 are fixed on the rotating input shaft 13. When the draggers rotate, a relative rotational movement is thus generated caused by the difference in the number of teeth on the two gear wheels between the inner wheel 22 and the outer wheel 21 and between the inner wheel 32 and the outer wheel 31. Since the outer wheels 21 and 31 are fixed, the inner wheels 22 and 32 perform a rotating movement and the output shafts 11 and 12 in the inner wheels rotate as an integrated whole. As a result, the transmitter 3 connected to the output shafts 11 and 12 rotate in a predetermined direction about the joint shaft line 4.

The aforementioned drive can also be constructed in an asymmetrical version in which the output shaft of the rotating actuator 5 lies offset in relation to the symmetrical shaft 3a. Here, the bevel gear 42 is positioned on the outside of the bevel gear 43 in relation to symmetrical shaft 3a and the toothing on the bevel gear 43 is angled outwards such that the bevel gear 42 positioned on the outside is able to engage in the bevel gear 43. This allows the harmonic chain drives 20, 30 to be placed more closely together. A further asymmetrical version is created by positioning a harmonics chain drive 20 on the shaft 3a with the other harmonic chain drive to the side of it, wherein the output shaft of the actuator 5 continues to lie on the shaft 3a. In addition, it is also possible to provide a joint with only one harmonic chain drive.

Figure 66:
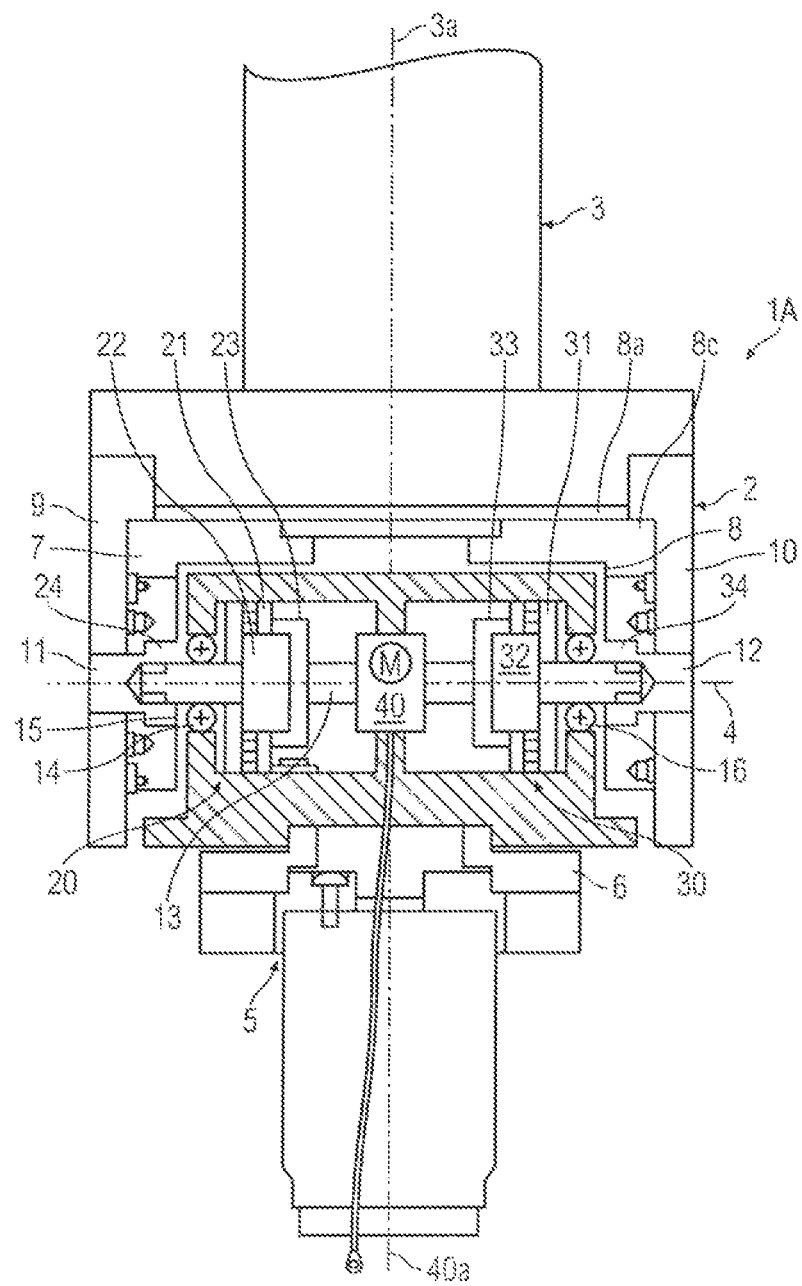
FIG. 66 shows a further embodiment of a robot finger with two harmonic chain gears.

In the arrangement shown in FIG. 66 the motor 40 is positioned inside the joint. The bevel gear wheels 42, 43 are therefore no longer required and the shaft 13 can be driven directly by the motor 40.

Figure 67:
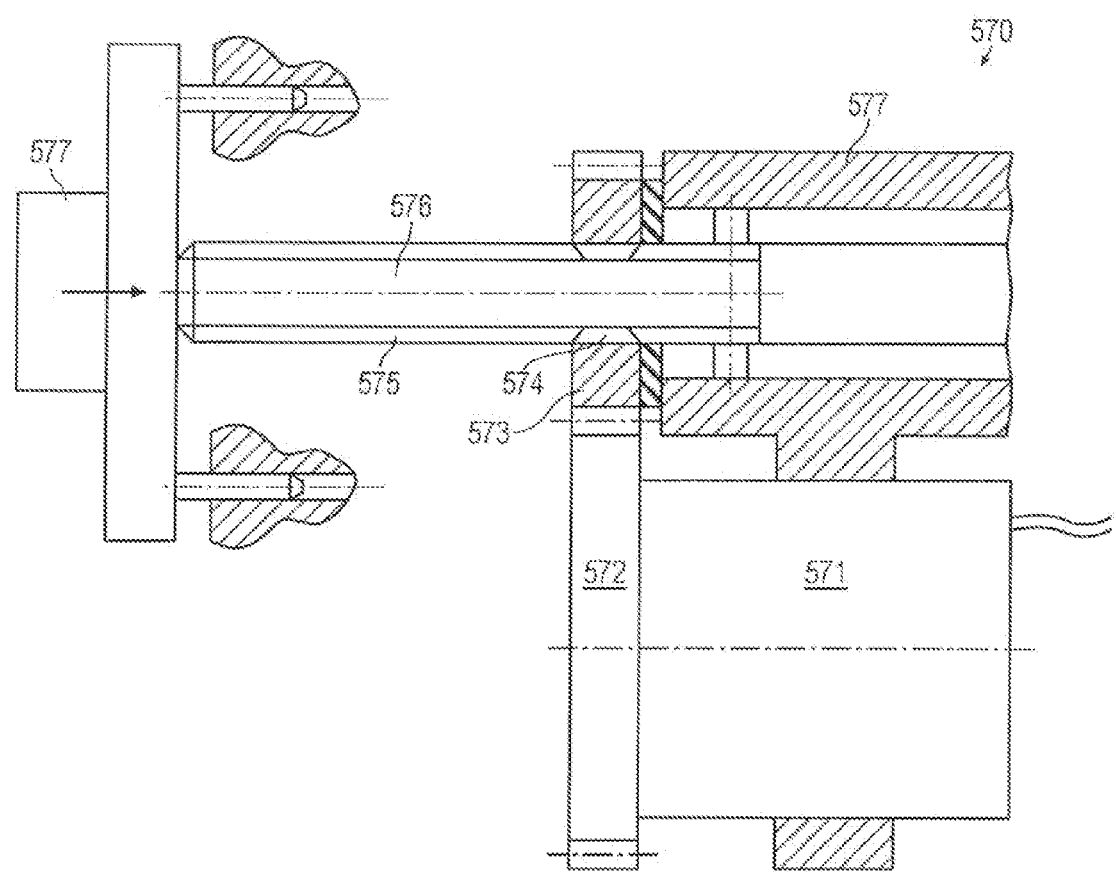
FIG. 67 shows a spindle drive with a harmonic chain gear drive.

FIG. 67 shows a spindle drive 570 with a harmonic chain drive 571. The harmonic chain drive 570 may be designed according to any of the abovementioned embodiments. An output of the harmonic is connected to a first tooth wheel 572, which is in turn connected to a second tooth wheel 573. The second tooth wheel 573 is designed as a hollow tooth wheel 573 and is arranged concentrically to an axis of the spindle drive 570. The inner side of the hollow shaft 573 comprises a wedge shaped edge 574, which engages into a thread 575 of a shaft 576 that is movable in a linear direction that coincides with a longitudinal axis of the shaft 576. The shaft 576 is arranged concentrically in a hollow shaft 577 and is supported in the hollow shaft 577. The hollow tooth wheel 573 is supported such that it can rotate around its axis but remains fixed with respect to the linear direction. The mechanism is not shown in detail in FIG. 67. It may be realized, for example, by two lateral ball bearings which are fixed to the hollow shaft or 577 to a casing.

In operation, the harmonic chain drive turns the tooth gear 572 in one of two directions. The tooth gear 572 turns the tooth gear 573 and the edge 574 moves the shaft 576 along the linear direction via engagement with the threading 575. FIG. 67 shows an embodiment in which the shaft 576 is oriented vertically upwards such that it can be used to lift a table with a items 577 on it against a gravitational force with high precision. However, the shaft 567 may also be oriented horizontally or in other directions and may be supported at two or more locations.

For the below-mentioned devices, the disclosure refers to an actuator, such as a motor, with a harmonic chain gear for use in the device and to the device with at least the harmonic chain gear. The application discloses an adjusting device with a harmonic chain gear for adjusting a position of a seat such as an aircraft seat or a dentist seat. Moreover, the application discloses a wheel chair, an electrically driven boat, a refrigerator compressor, a block and tackle mechanism, a motor saw, a lawn mower and a rope winch, each comprising a drive and a harmonic chain gear that is connected to the drive and the device. Likewise, the application also discloses an electric tool such as a saw, a screwdriver, or an impact wrench with a drive and a harmonic chain gear. Likewise, the application discloses a drive with a harmonic chain gear for a garage door, for a garden door, for a canvas blind, for a sliding door, for an elevator, for a roller coaster and for other types of rail vehicles. The harmonic chain gear according to the application can be made compact and therefore it is possible to integrate the drive even in smaller devices. For example in the case of the elevator, the drive with the harmonic chain gear can be used as a backup drive that is connected to the elevator.

Furthermore, the application also discloses a stand for a photo camera, a focusing drive for a camera lens, and a drive for the tracking of an astronomical telescope with a drive that comprises a harmonic chain gear. "Telescope" refers to a small-scale telescope for amateur use as well as to a small or large-scale astronomical telescope for professional systems that may be terrestrial or extraterrestrial. In these applications, the harmonic chain gear provides a high precision drive.

Figure 68:
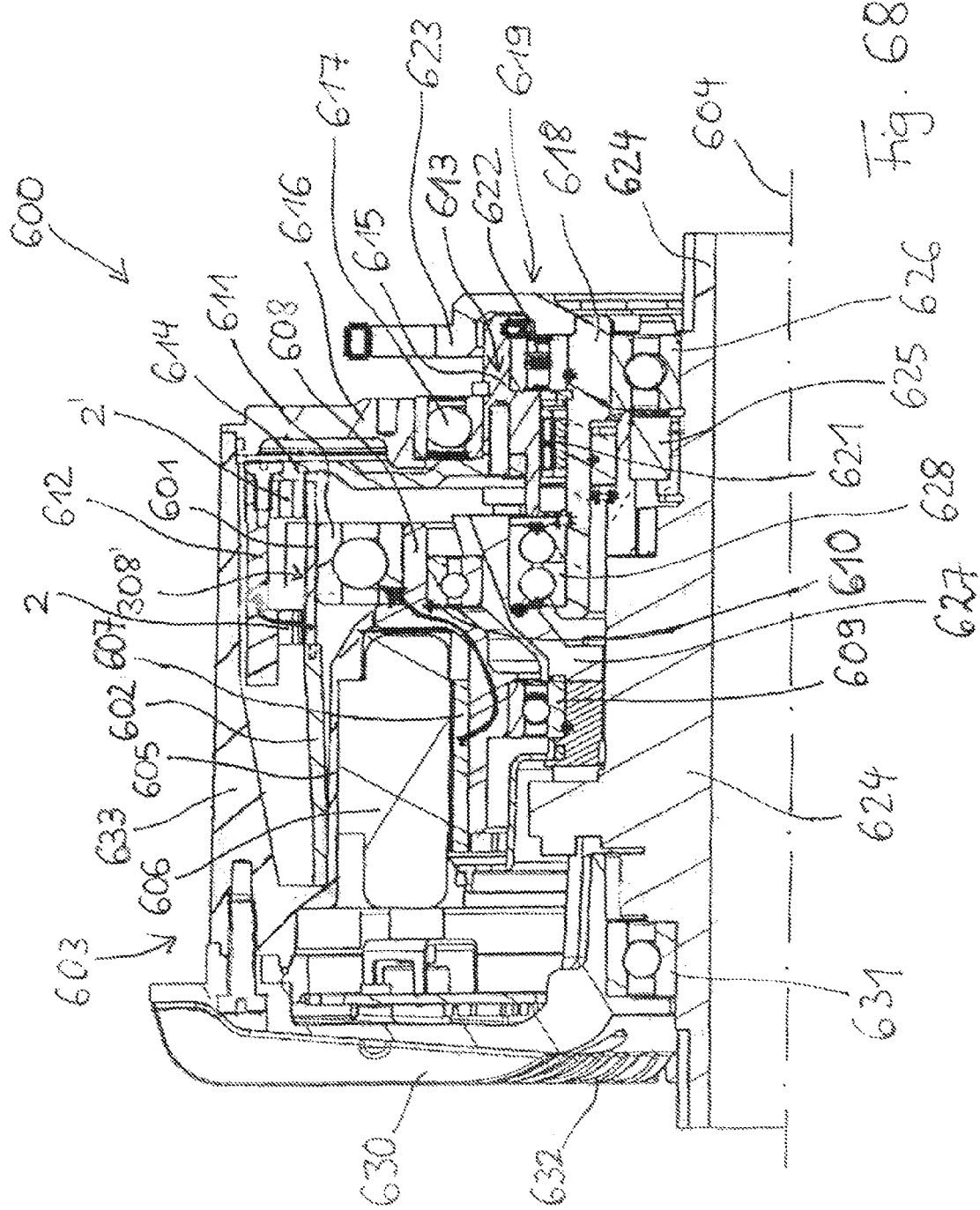
FIG. 68 shows a further embodiment of a harmonic pin drive.

FIG. 68 shows a further embodiment of a harmonic pin drive 600 in which pins 601 of a pin ring 308' are connected to elastic spring rods 602, which are connected to a casing 603 of the harmonic pin drive 600. In the cross sectional view of FIG. 68, one pin 601 of the pin ring 308' and one spring rod 602 is shown. In a first alternative, the elastic spring rods 602 and the pins 601 are formed as one part whereas in a second alternative, the pins 601 are inserted into corresponding openings of the elastic spring rods.

The spring rods 602 are elastic and the spring rods can move up and down within the plane of the cross section of FIG. 68. The other spring rods 602 are movable in a similar way. The spring rods 602 are arranged on a circumference of a circle around a cylindrically shaped portion 605 of the casing. The cylindrically shaped portion 605 carries a coil 606, which is provided on an inner wall of the cylindrically shaped portion 605.

An inner cylinder 607 is provided radially inwards to the coil 606. Magnets, which are not shown in FIG. 68, are provided on the inner cylinder 607. The cylindrically shaped portion 605, the coil 606 and the inner cylinder 607 provide an electric motor, wherein the cylindrically shaped portion 605 and the coil 606 provides a stator of the electric motor and the inner cylinder 607 provides a rotor of the electric motor. The inner cylinder 607 is also referred to as "input shaft" of the harmonic pin gear or pin drive.

On an output side, a transmitter portion 608 is provided on the inner cylinder 606. The inner cylinder 607 is radially supported on the output shaft 624 via a groove ball bearing 609 and is laterally supported on a cup shaped part 627 by an angular ball bearing 610. The part which comprises the transmitter portion 608 is also referred to as "transmitter".

A ball bearing 611 is mounted on the transmitter portion 608. The pin ring 308' is provided around the ball bearing 611. A first outer ring gear 2 and a second outer ring gear 2', which are also known as outer wheels, are provided on two axially opposite sides of the ball bearing 611. The first outer ring gear 2 and the second outer ring gear 2' are formed out on an outer cylindrical portion 612 of a motor output part 613. The outer ring gears 2, 2' comprise inner teeth along inner circumferences of the outer ring gears 2, 2' and the shapes of the inner teeth are adapted to the shape of the pins 601. The cylindrical portion 612 is also referred to as "output shaft".

The motor output part 613 comprises the outer cylindrical portion 612, which is screwed to a disk shaped part 614 of the motor output part 613, and an inner cylindrical portion 615, which is screwed to the disk shaped part 614. The disk shaped part 614 of the motor output part 613 is supported radially outwards on a retaining disk 616 of the casing via a ball bearing 617.

Radially inwards, the disk shaped part 616 is supported on a cylinder-like portion 618 of an output part 619 via a needle bearing 621 and an outer free wheel 622. A tooth gear carrier 623 is fixed on the cylinder-like portion 618. The cylinder-like portion 618 of the output part 619 is supported on a output shaft 624 via an inner free wheel 625 and a ball bearing 626. Radially outwards, the cylinder-like portion 618 is supported on the cup shaped part 627 via a double ball bearing 628.

On a motor side, which is opposite to the output side of the output gear wheel 623, a motor cover 630 of the casing 603 is supported on the output shaft 624 via a ball bearing 631. The motor cover 630 comprises radially arranged cooling fins 632. An outer cylinder 633 of the casing 603 is screwed to the motor cover 630 and the retaining disk 616 is screwed to the outer cylinder 633.

In a first embodiment, the transmitter portion 608 is provided as an oval shaped portion 608 and the ball bearing 611 as a flexible ball bearing 611. A flexible ball bearing 611 may for example be provided as a wire race bearing, also known as "Franke" bearing. In a second embodiment, the transmitter portion 608 is provided as a circular shaped portion 608, which is eccentrically mounted with respect to the axis 604. In this case, the ball bearing 611 can be provided as a non-flexible ball bearing 611, which essentially stays in a circular shape.

In the first and in the second embodiment, the ball bearing 611 may be provided as an incomplete ball bearing without an outer ring gear and/or without an inner ring. An incomplete ball bearing without outer ring gear is advantageous in combination with the three-layer pin ring shown in FIG. 70.

During operating of the harmonic pin drive 600, the coil 606 is supplied with a current. The current produces a rotating field that drives the inner cylinder 607 via an electromagnetic field, which acts on the magnets. The inner cylinder 607 rotates the transmitter portion 608, which in turn rotates the inner ring of the ball bearing 611.

The motion of the ball bearing 611 causes a radial displacement of the pins 601. In turn, the radial displacement of the pins causes the pins 601 to move over the teeth of the outer ring gears 2, 2'. A phase of the radial displacement increases along the circumference of the outer ring gears 2, 2.

The radial movement of the pins 601 causes a propelling force on the inclined flanks of the teeth of the outer ring gears 2, 2. The corresponding reaction force is taken up by the spring rods 602 to which the pins 601 are connected. According to the application, the dimensions of the pin ring and of the outer ring gears 2, 2 can be made such that a speed reduction of about 4500:75 can be achieved. For illustration, two arrows indicate a torque flow from the rotor 607 of the electric motor to the outer ring gears 2, 2'.

The outer ring gears 2, 2' transmit their rotational motion to the motor output part 613. If the revolution speed of the motor output part 613 is faster than the revolution speed of the output part 619, the motor output part 613 drives the output part 619 via the outer free wheel 622. If, on the other hand, the revolution speed of the output shaft 624 is faster than the revolution speed of the output part 618, the output shaft drives the output part via the inner free wheel. The inner and outer free wheels 625, 622 function as overrunning clutches.

FIGS. 69 to 72 show multi-layer pin rings. According to the application, the multi-layer pin rings can be used in the harmonic pin drives according to the application, which are shown in FIGS. 36-47, 50, 51, 52, 53 and 68.

Figure 69:
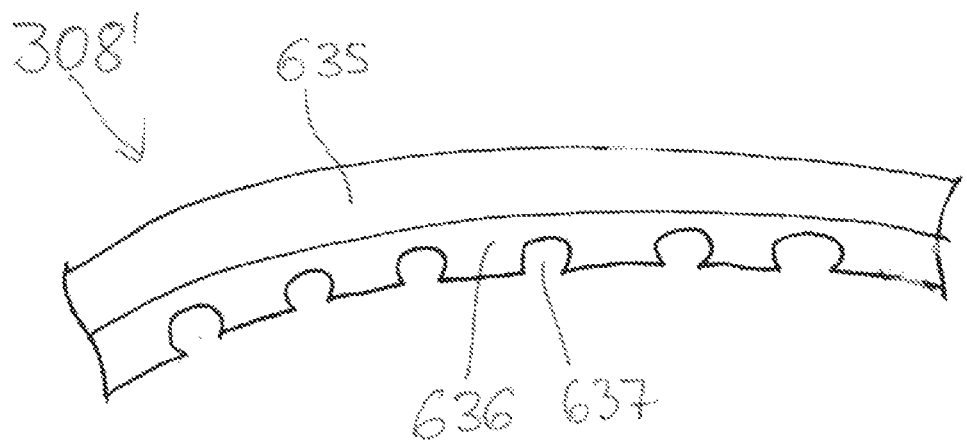
FIG. 69 shows a partial side view of a two-layer pin ring.

FIG. 69 shows a partial side view of a two-layer pin ring 308'. The outer part comprises a steel ring 635 and a reception ring 636, which is fixed to the steel ring 635. The reception ring 636 may be made from aluminium, plastic, steel, or iron, for example. The steel ring 635 is provided radially outwards of the reception ring 636. Round openings 637 are provided in the reception ring 636 at regular distances along a circumference of the reception ring 636. Pins, which are not shown in FIGS. 69 and 70, are provided in the round openings 637.

Figure 70:
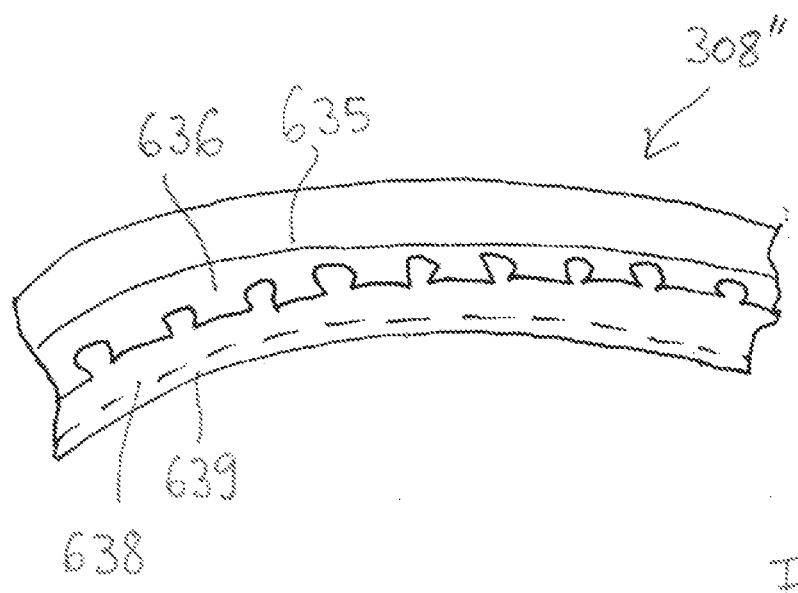
FIG. 70 shows a partial side view of a three-layer pin ring.

FIG. 70 shows a partial side view of a three-layer pin ring 308". Radially inwards to the reception ring 636, an outer bearing surface 638 is connected to the reception ring 636. The outer bearing surface 638 corresponds to an outer ring gear 638 of a flexible bearing and comprises an integrated bearing surface for rolling elements, which are not shown in FIG. 70.

Figure 71:
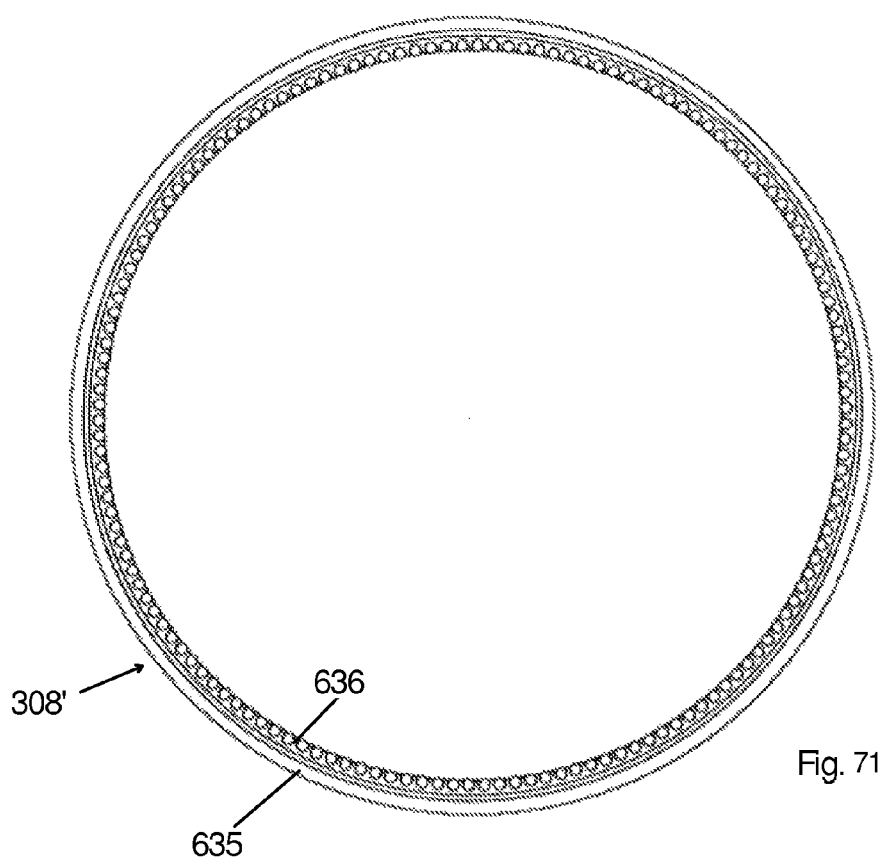
FIG. 71 shows a side view of the multi-layer pin ring.

FIG. 71 shows a side view of a two-layer pin ring 308' in which the pins in the round openings are shown from the side.

Figure 72:
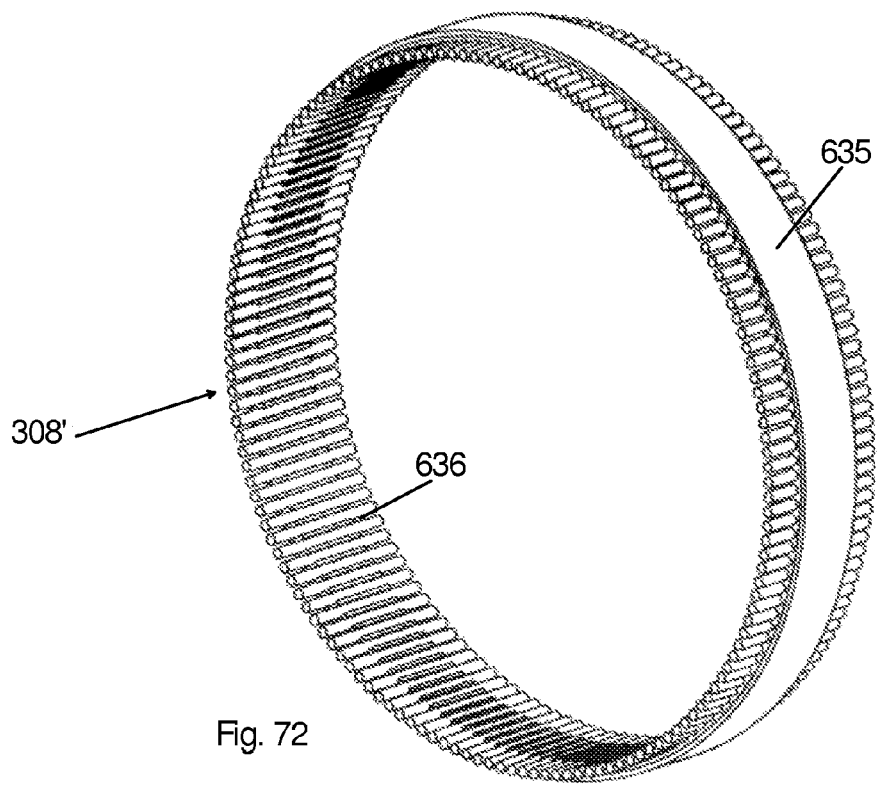
FIG. 72 shows a perspective view of the three-layer pin ring.

FIG. 72 shows a perspective view of the two-layer pin ring 308' of FIG. 71. The pins protrude on two opposite sides from the two-layer pin ring 308'. According to the application, the pin ring may be inserted into a harmonic pin drive in a symmetric arrangement in which each of the two protruding portion of the pin engages in a corresponding outer ring gear. This symmetric arrangement provides a balanced distribution of force.

In the pin rings of FIGS. 69, 70, 72 the round openings can be formed such that they are open towards the inside of the reception ring 636 such that they form an insertion slit on the inside of the reception ring. The width of the insertion ring is smaller than the diameter of the pins. The pins may be inserted or removed through the insertion slit by pressing or pulling them from the inside.

In a general sense, the pin ring corresponds to a traction means, the rotor corresponds to an input shaft, and the outer ring gear corresponds to an outer wheel. A transmission of the outer ring gear's rotation to the output shaft may be carried out via further transmission elements, such as overrunning clutches. The flexible means may be realized as flexible rods but other forms are possible as well, such as a resilient conical section, wherein the flexible means are provided as portions of the conical section, or as a conical section with resilient fingers.

Generally, the round openings of the multi-layer pin ring extend from one side of the pin ring to an opposite side and they form a tube-like opening in which pins can be inserted.

Specifically, the pins are often made from a durable metal such as steel.

The embodiments can also be described with the following lists of elements being organized into items. The respective combinations of features, which are disclosed in the item list, are regarded as independent subject matter, respectively, that can also be combined with other features of the application.

1. Gear comprising an input shaft and an output shaft, the gear further comprising the following elements:
   an outer wheel, an inner wheel which is positioned concentrically in relation to the outer wheel and a traction means extending between the outer wheel and the inner wheel, and
   at least one revolving transmitter which lifts the traction means from the outer periphery of the inner wheel and pushes it onto the inner periphery of the outer wheel.
2. Gear according to item 1,
   characterised in that
   the input shaft is connected to the transmitter.
3. Gear according to item 1,
   characterised in that
   the input shaft is connected to the outer wheel.
4. Gear according to item 1,
   characterised in that
   the input shaft is connected to the inner wheel.
5. Gear according to one of item 1 to 3,
   characterised in that
   the output shaft is connected to the inner wheel.
6. Gear according to one of items 1, 3 or 4,
   characterised in that
   the output shaft is connected to the transmitter.
7. Gear according to one of items 1 to 4,
   characterised in that
   the output shaft is connected to the outer wheel.
8. Gear according to one of the aforementioned items,
   characterised in that
   the traction means is provided as a chain of rotatably interconnected links.
9. Gear according to one of the item 1 to 7,
   characterised in that
   the traction means comprises at least one continuous elliptic traction element.

10. Gear according to item 9,
characterised in that
the traction element comprises a flexible belt.
11. Gear according to item 9,
characterised in that
the traction element comprises a flexible spline element
12. Gear according to item 11,
characterised in that
the flexible spline element comprises a multitude of pins that protrudes from at least one axial surface of the spline element and that are coaxially arranged with the flexible spline element.
13. Gear according to one of the aforementioned items,
characterised in that
the transmitter is positioned on a rotatable transmitter carrier.
14. Gear according to item 13,
characterised in that
the transmitter is fixed to the transmitter carrier wherein the traction means comprises a multitude of rotatable contact elements.
15. Gear according to item 13,
characterised in that
the transmitter is rotatably provided on the transmitter carrier.
16. Gear according to item 15,
characterised in that
the transmitter is provided eccentrically from the rotation axis of the transmitter carrier.
17. Gear according to item 15,
characterised in that
the rotation axis of the transmitter essentially coincides with the rotation axis of the transmitter carrier, wherein a contact surface of the transmitter facing towards the traction means is provided with an essentially elliptic shape.
18. Motor-gear unit with a gear according to one of the aforementioned items,
characterised in that
an electric motor is provided, a rotor of the electric motor being connected to the input shaft of the gear.
19. Motor-gear unit according to item 18,
characterised in that
the electric motor is a DC brushless motor with a radial gap.
20. Motor-gear unit with a gear according to one of items 1 to 17,
characterised in that
an internal combustion engine is provided, an output shaft of the engine being connected to the input shaft of the gear.
21. Vehicle comprising a motor-gear unit according to one of items 18 to 20,
characterised in that
at least one driven wheel of the vehicle is connected to the output shaft of the gear.
22. Electric generator with a drive unit and with a generator unit and with a gear according to one of items 1 to 17, an input shaft of the gear being connected to the drive unit and an output shaft of the gear being connected to an input shaft of the generator.
23. Transmitter assembly for contacting a traction means in a gear, the transmitter comprising a first transmitter element and a second transmitter element provided on a rotatable transmitter carrier, wherein the first transmitter element and the second transmitter element are rotatable on the transmitter carrier and wherein each transmitter element is provided eccentrically from the rotation axis of the transmitter carrier.
24. Transmitter assembly according to item 23,
characterised in that 1*a* guide for shifting the first transmitter element with respect to the second transmitter element is provided.
25. Transmitter according to item 24,
characterised in that
the first transmitter element and the second transmitter element each comprise at least one transmitter adjustment slit with a guiding element.
26. Gear comprising an input shaft and an output shaft, the gear further comprising the following features:
an outer wheel,
an inner wheel positioned concentrically in relation to the outer wheel,
a pressure means extending between the outer wheel and the inner wheel, and
at least one revolving transmitter which pushes the pressure means away from the inner periphery of the outer wheel and pushes the pressure means onto the outer periphery the inner wheel.
27. Flexible spline element for a gear, the spline element comprising
a multitude of pins that protrudes from at least one axial surface of the spline element and that are coaxially arranged with the flexible spline element.
28. Flexible spline element according to item 27,
characterised in that
the multitude of pins protrudes from both axial surfaces of the spline element.
29. Flexible spline element according to item 27 or 28,
characterised in that
the multitude of pins are provided in a multitude of axial cylindrical orifices.
30. Flexible spline element according to item 27 or 29,
characterised in that
the pins comprise hardened steel and that the spline element comprises aluminium.
31. Harmonic pin drive comprising
at least one outer ring gear with inner teeth that are adapted to the shape of pins of a pin ring,
a transmitter for connecting to a rotor of an electric motor,
a ball bearing that is supported on the transmitter,
an arrangement of flexible means, the flexible means being distributed essentially on the circumference of a radius and the flexible means being provided for attachment to a casing, wherein the flexible means comprise openings for inserting pins of the pin ring, and
an output shaft for receiving a rotation of the outer ring gear.
32. Harmonic pin drive according to item 31,
characterised in that
the transmitter comprises an oval shaped portion.
33. Harmonic pin drive according to item 31,
characterised in that
the transmitter comprises a circular portion that is eccentrically supported with respect to a rotation axis of the rotor.
34. Harmonic pin drive according to item 31,
characterised in that
the harmonic pin drive comprises two outer ring gears.
35. Harmonic pin gear comprising
at least one outer ring gear with inner teeth,
a transmitter for connecting to an input shaft,
a ball bearing that is supported on the transmitter, an arrangement of flexible means, the flexible means being distributed essentially on the circumference of a radius and the flexible means being provided for attachment to a casing of the harmonic pin drive, a pin ring with pins, the pins of the pin ring being connected to the flexible means and at least one of the pins engaging into an inner tooth of the outer ring gear, and an output shaft for receiving a rotation of the outer ring gear.

36. Harmonic pin gear according to item 35,
characterised in that
the transmitter comprises an oval shaped portion.

37. Harmonic pin gear according to item 35,
characterised in that
the transmitter comprises a circular portion that is eccentrically supported with respect to a rotation axis of the rotor.

38. Harmonic pin gear according to one of the items 35 to 37,
characterised in that
the harmonic pin drive comprises two outer ring gears.

39. Multi-layer pin ring for a harmonic pin drive, the multi-layer pin ring comprising
an outer steel ring and
a reception ring which is fixed to the outer steel ring, the reception ring being arranged radially inwards to the outer steel ring, wherein the reception ring comprises round openings which are adapted to take up pins.

40. Multi-layer pin ring according to item 39, the multi-layer pin ring further comprising an outer bearing surface for guiding balls of a ball bearing, wherein the outer bearing surface is arranged radially inwards to the reception ring and is fixed to the reception ring.

41. Multi-layer pin ring according to item 39 or item 40,
characterised in that
the round openings for taking up the pins are distributed at essentially equal distances along a circumference.

42. Multi-layer pin ring according to one of the items 39 to 41,
characterised in that
pins are provided in the openings of the reception ring, the pins protruding from the reception ring on two opposite sides.

43. Multi-layer pin ring according to one of items 39 to 42,
characterised in that
the round openings of the reception ring form an insertion slit on an inner side of the reception ring.

44. Motor-gear unit with a harmonic pin drive according to one of the items 31 to 34 or with a harmonic pin gear according to one of the item 35 to 38,
characterised in that
an electric motor is provided, a rotor of the electric motor being connected to the transmitter of the harmonic pin drive or of the harmonic pin gear via an input shaft.

45. Motor-gear unit according to item 44,
characterised in that
the electric motor is a DC brushless motor with a radial gap.

46. Motor-gear unit with a harmonic pin drive according to item 31 to 34 or with a harmonic pin gear according to one of items 35 to 38,
characterised in that
an internal combustion engine is provided, an output shaft of the engine being connected to the transmitter via an input shaft of the harmonic pin drive or of the harmonic pin gear.

47. Vehicle comprising a motor-gear unit according to one of the items 44 to 46,
characterised in that
at least one driven wheel of the vehicle is connected to the output shaft of the harmonic pin gear.

48. Electric generator with a drive unit, with a generator unit and with a harmonic pin drive according to one of the items 31 to 34 or with a harmonic pin gear according to one of the items claim 35 to 38, characterised in that the transmitter of the harmonic pin drive is connected to the drive unit via an input shaft and an output shaft of the harmonic pin drive is connected to an input shaft of the generator.

49. Inclination adjustment device comprising a first gear a cording to one of the items 1 to 17 and a second gear a cording to one of the items 1 to 17,
characterised in that
a first punched disk is connected to an output shaft of the first gear and a second punched disk is connected to an output shaft of the second gear and in that respective holes of the first punched disk and the second punched disk are adapted to take up a tube,
an input shaft of the first gear is connected to a motor and an input shaft of the second gear is connected to a motor.

50. Robot arm comprising a gear according to one of the items 1 to 17, characterised in that the gear is fixed to a first part of a joint of the robot arm and an output shaft of the gear is fixed to a second part of the joint of the robot arm, the second part of the joint being pivotable with respect to the first part, and in that an input shaft of the gear is connected to a motor.

51. Positioning device for a table comprising a gear according to one of the items 1 to 17, characterised in that the gear is fixed to a support, an input shaft of the gear is connected to a motor and an output shaft is connected to a wheel with a tooth ring, the wheel being provided for rotating a table.

52. Spindle drive comprising a gear according to one of the items 1 to 17, characterised in that
an input shaft of the gear is connected to a motor,
an output shaft of the gear is connected to a tooth wheel, the spindle drive further comprising
a hollow tooth wheel with a wedge shaped edge, the hollow tooth wheel engaging with the tooth wheel,
a shaft with a thread, the wedge shaped edge of the hollow tooth wheel engaging into the thread of a shaft.

Although the above description contains much specificity, this should not be construed as limiting the scope of the embodiments but merely providing illustration of the foreseeable embodiments. The above stated advantages of the embodiments should not be construed especially as limiting the scope of the embodiments but merely to explain possible achievements if the described embodiments are put into practice. Thus, the scope of the embodiments should be determined by the claims and their equivalents, rather than by the examples given.

That which is claimed is:

1. A harmonic pin drive comprising:
at least one outer ring gear with inner teeth that are adapted to the shape of pins of a pin ring;
a transmitter for connecting to a rotor of an electric motor,
a ball bearing that is supported on the transmitter;
an arrangement of flexible means, the flexible means being distributed essentially on the circumference of a radius and the flexible means being provided for attachment to a casing, wherein the flexible means comprise openings for inserting pins of the pin ring; and
an output shaft for receiving a rotation of the outer ring gear.

2. The harmonic pin drive of claim 1, wherein:
the transmitter comprises an oval shaped portion.

3. The harmonic pin drive of claim 1, wherein:
the transmitter comprises a circular portion that is eccentrically supported with respect to a rotation axis of the rotor.

4. The harmonic pin drive of claim 1, wherein:
the harmonic pin drive comprises two outer ring gears.

5. The motor-gear unit with the harmonic pin drive of claim 1, wherein:
an electric motor is provided, a rotor of the electric motor being connected to the transmitter of the harmonic pin drive via an input shaft.

6. The motor-gear unit of claim 5, wherein:
the electric motor is a DC brushless motor with a radial gap.

7. A vehicle comprising the motor-gear unit of claim 5, wherein:
at least one driven wheel of the vehicle is connected to the output shaft of the harmonic pin gear.

8. An electric generator with a drive unit, with a generator unit, and with the harmonic pin drive of claim 1, wherein:
the transmitter of the harmonic pin drive is connected to the drive unit via an input shaft and an output shaft of the harmonic pin drive is connected to an input shaft of the generator.

9. A harmonic pin gear comprising:
at least one outer ring gear with inner teeth;
a transmitter for connecting to an input shaft;
a ball bearing that is supported on the transmitter;
an arrangement of flexible means, the flexible means being distributed essentially on the circumference of a radius, and the flexible means being provided for attachment to a casing of the harmonic pin drive;
a pin ring with pins, the pins of the pin ring being connected to the flexible means and at least one of the pins engaging into an inner tooth of the outer ring gear; and an output shaft for receiving a rotation of the outer ring gear.

10. The harmonic pin gear of claim 9, wherein:
the transmitter comprises an oval shaped portion.

11. The harmonic pin gear of claim 9, wherein:
the transmitter comprises a circular portion that is eccentrically supported with respect to a rotation axis of the rotor.

12. The harmonic pin gear of claim 9, wherein:
the transmitter comprises a circular portion that is eccentrically supported with respect to a rotation axis of the rotor.

13. A motor-gear unit with the gear of claim 9, wherein:
an internal combustion engine is provided, an output shaft of the engine being connected to the transmitter via an input shaft of the harmonic pin gear.

14. A multi-layer pin ring for a harmonic pin drive, the multi-layer pin ring comprising:
an outer steel ring; and
a reception ring which is fixed to the outer steel ring, the reception ring being arranged radially inwards to the outer steel ring, wherein the reception ring comprises round openings which are adapted to take up pins, wherein the round openings of the reception ring form an insertion slit on an inner side of the reception ring.

15. The multi-layer pin ring of claim 14, the multi-layer pin ring further comprising:
an outer bearing surface for guiding balls of a ball bearing, wherein the outer bearing surface is arranged radially inwards to the reception ring and is fixed to the reception ring.

16. The multi-layer pin ring of claim 14, wherein:
the round openings for taking up the pins are distributed at essentially equal distances along a circumference.

17. The multi-layer pin ring of claim 14, wherein:
the pins are provided in the openings of the reception ring, the pins protruding from the reception ring on two opposite sides.

* * * * *